United States Patent [19]

Okada et al.

[11] Patent Number: 5,481,665
[45] Date of Patent: Jan. 2, 1996

[54] USER INTERFACE DEVICE FOR CREATING AN ENVIRONMENT OF MOVING PARTS WITH SELECTED FUNCTIONS

[75] Inventors: Kazuhisa Okada; Kazumi Matsuura; Nobuo Asahi, all of Kamakura, Japan

[73] Assignee: Institute for Personalized Information Environment, Tokyo, Japan

[21] Appl. No.: 913,304

[22] Filed: Jul. 14, 1992

[30] Foreign Application Priority Data

Jul. 15, 1991 [JP] Japan ................................. 3-173842

[51] Int. Cl.$^6$ ................................................. G06F 17/00
[52] U.S. Cl. ........................................ 395/155; 395/159
[58] Field of Search ................................ 395/155, 159, 395/160, 161, 62, 68, 77, 152; 364/948.2, 948.22, 977, 977.1, 977.2

[56] References Cited

U.S. PATENT DOCUMENTS

| | | | |
|---|---|---|---|
| 4,656,603 | 4/1987 | Dunn | 395/159 |
| 4,813,013 | 3/1989 | Dunn | 395/159 |
| 4,845,665 | 7/1989 | Heath et al. | 395/157 |
| 4,866,638 | 9/1989 | Cosentino et al. | 395/159 |
| 4,901,221 | 2/1990 | Kodosky et al. | 395/159 |
| 5,001,697 | 3/1991 | Torres | 395/139 |
| 5,041,992 | 8/1991 | Cunningham et al. | 395/135 |
| 5,103,498 | 4/1992 | Lanier et al. | 395/68 |
| 5,115,501 | 5/1992 | Kerr | 395/600 |

(List continued on next page.)

FOREIGN PATENT DOCUMENTS

| | | |
|---|---|---|
| 0367709 | 9/0548 | European Pat. Off. . |
| 2-266424 | 4/1990 | Japan . |
| 2266424 | 10/1990 | Japan . |

OTHER PUBLICATIONS

Y. Tanaka et al., "Intelligent Pad: A Hypermedia System Allowing Functional Compositions of Active Media Objects Through Direct Manipulations", Aug. 1989, Information Processing 89, Proceedings of the IFIP 11th World Computer Congress, pp. 541–546.

B. Myers, "Taxonomies of Visual Programming and Program Visualization", Journal of Visual Languages and Computing, vol. 1, No. 1, pp. 97–123, Mar. 1990.

M. Hirakawa et al., "An Iconic Programming System, HI–Visual", IEEE Transactions on Software Engineering, vol. 16, No. 10, Oct. 1990, pp. 1178–1184.

C. Crimi et al., "An Intelligent Iconic System to generate and interpret Visual Languages", 1989 IEEE Workshop on Visual Languages, pp. 144–149, Oct. 1989.

J. Kodosky and Rob Dye, "Programming with Pictures", Computer Language, Jan. 1989, pp. 61–69.

Research Disclosure No. 319, Nov. 1990 "User Specitiable Logically Organized Views in a Desktop Environment" Information Processing 89, pp. 541–546.

IEEE Software, "Intelligent Assistance for Software Development and Maintenance", Kaiser, Feiler & Popovich, vol. 5, No. 3, pp. 40–49, May 1988.

Primary Examiner—Heather R. Herndon
Assistant Examiner—Joseph R.. Burnell
Attorney, Agent, or Firm—Greenfield & Sacks Wolf

[57] ABSTRACT

An easy-to-use user interface device includes: parts forming means 13 for forming parts providing visual representations of functions of applications; parts storing means 1 for storing the information upon parts; operational environment constructing means 500 for constructing the operational environment by combining the parts together to construct operational environments; operational environment storing means 14 for storing the constructed operational environment; and operational environment using means for executing a task of an application via the operational environment read out from the operational environment storing means 14. The visual, semantic, and movement information upon the parts, representing the screen images, the associated functions, and movements thereof, etc., are stored and adjusted as the user uses the operational environment. The adjustments are effected automatically as far as feasible, thereby reducing the burden upon the user.

12 Claims, 48 Drawing Sheets

U.S. PATENT DOCUMENTS

| | | | |
|---|---|---|---|
| 5,235,679 | 8/1993 | Yoshizawa et al. | 395/156 |
| 5,261,041 | 11/1993 | Susman | 395/152 |
| 5,297,057 | 3/1994 | Kramer et al. | 364/512 |
| 5,301,301 | 4/1994 | Kodosky et al. | 395/161 |
| 5,347,628 | 9/1994 | Brewer et al. | 395/155 |
| 5,367,626 | 11/1994 | Morioka et al. | 395/159 |
| 5,388,203 | 2/1995 | Kaneko | 395/159 |

FIG. 9

503 — ( SCISSORS

36 — ( MATERIAL  IRON ) — 37
38 — ( USE  CUT ) — 39
40 — ( USE  THRUST ) — 41
42 — ( USE  PUT ) — 43
44 — ( COMPONENT PART  COMPONENT PART a ) — 45
46 — ( COMPONENT PART  COMPONENT PART b ) — 47
)

FIG. 10

( SCISSORS

48 — ( ROTATIONAL AXIS  POINT C ) — 49
50 — ( ROTATIONAL DIRECTION  (COMPONENT a CLOCKWISE ) ) — 51
52 — ( ROTATIONAL DIRECTION  (COMPONENT b COUNTERCLOCKWISE ) ) — 53
54 — ( MOVEMENT  ROTATION ) — 55
56 — ( MOVEMENT  TRANSLATION ) — 57
)

FIG. 11

| ITEM | CONTENT | COORDINATES |
|---|---|---|
| ROTATIONAL AXIS | C-C' ~59 | |
| POINT | a~60 | (62.5、100、50)~61 |
| | b~62 | (62.5、50、45)~63 |
| | c~64 | (50、50、50)~65 |
| | d | (44、25、45) |
| | e~66 | (37.5、0、40)~67 |
| | f | (30、25、45) |
| | g | (37.5、100、50) |
| | h | (37.5、50、45) |
| | i | (50、50、50) |
| | j | (66、25、45) |
| | k | (62.5、0、40) |
| | l | (70、25、45) |
| LINE | c — e ~68 | |
| | e — f | |
| | f — d | |
| | j — k | |
| | k — l | |
| | l — i | |
| SURFACE | a—b—c—a ~69 | |
| | g—h—j—g | |

FIG. 20
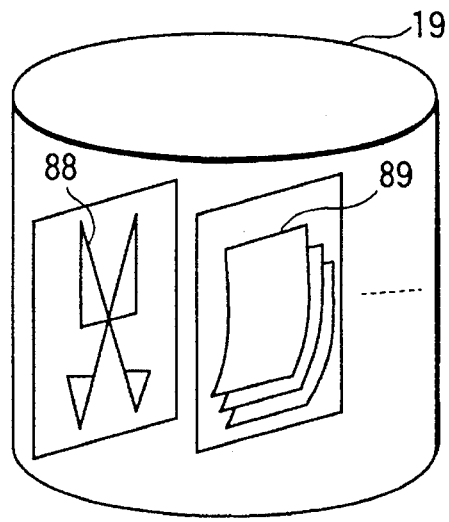
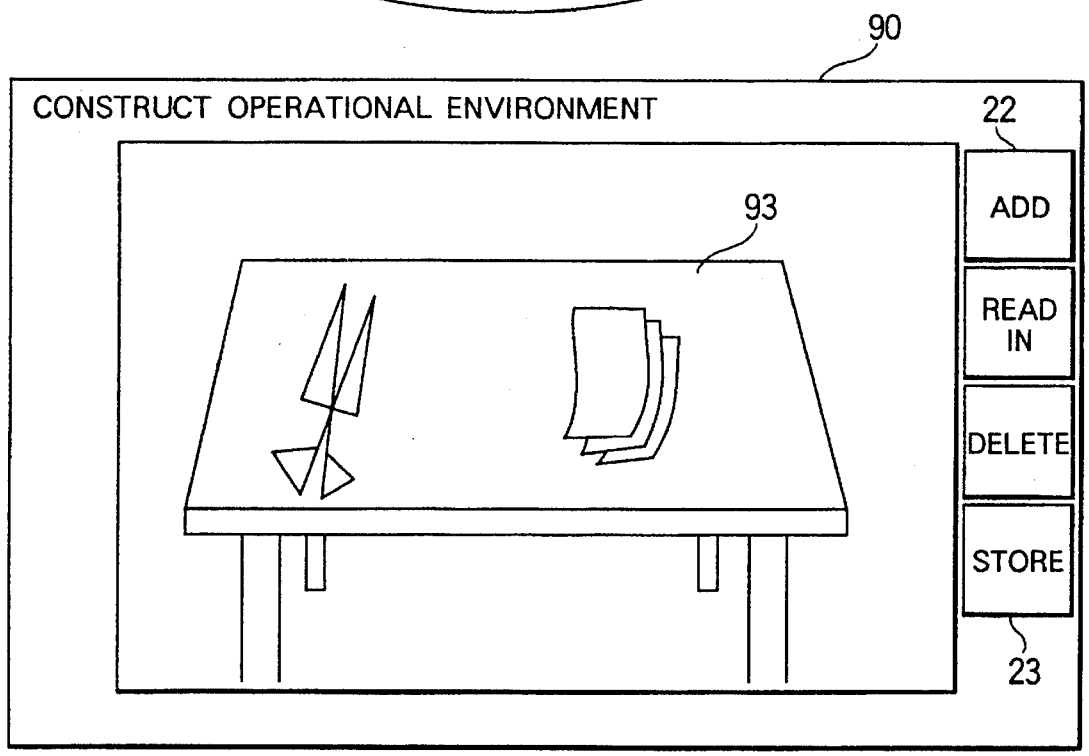
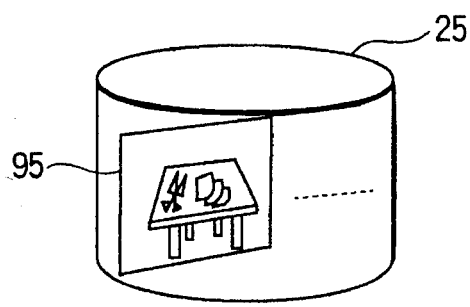

FIG. 22 a

- 73 —( PAPER
  - 74 —( USE    BURN )— 75
  - 74 —( USE    WRAP )— 77
  - 74 —( USE    WIPE )— 79
  - 74 —( USE    CRUMPLE UP )— 81
- )

FIG. 22 b

- 73 —( PAPER
  - 74 —( USE    WRAP )— 77
  - 74 —( USE    CRUMPLE UP )— 81
- )

FIG. 24

```
96—( SCISSORS
   97—( USE        CUT )—98
       ( USE        THRUST )
       ( USE        PUT )
       ( MATERIAL   IRON )
       ( COMPONENT  COMPONENT 1 )
       ( COMPONENT  COMPONENT 2 )
   )

99—( PAPER
  100—( USE        WRAP )—101
       ( USE        BURN )
       ( USE        STICK )
  102—( MATERIAL   PAPER )—103
   )
```

FIG. 25

127—( CUT
  128—( SEMANTIC RELATION
    129—( ACTOR
      130—( X           132
        131—( USE    CUT )))
    133—( OBJECT
      133a—( Y               133c
        133b—( MATERIAL    PAPER )))   135
      134—( START OF ACTION    CONTACT ))
  137—( MOVEMENT RELATION
    138—( X
      139—( TRANSLATION       141
        140—( START TIME    CONTACT )))
    142—( Y
      143—( SEVER            145
        144—( START TIME    CONTACT ))    147
        146—( SPEED    TRANSLATION SPEED OF X )))

FIG. 26

- 104—{ SCISSORS
  - 105—{ SEMANTIC RELATION
    - 106—{ PAPER
      - 107—{ CONTACT    CUT }—108
      - 109—{ CONTACT    THRUST }—110
      - 111—{ NON-CONTACT    NON-INTERFERENCE }}}—112
  - 113—{ MOVEMENT RELATION
    - 114—{ PAPER
      - 115—{ CUT
        - 116—{ FUNCTION    SEVER }—117
        - 118—{ START TIME    CONTACT }—119
        - 120—{ SPEED    TRANSLATION SPEED OF SCISSORS }}—121
      - 122—{ THRUST
        - 123—{ FUNCTION    FIX }—124
        - 125—{ START TIME    CONTACT }}}}—126

FIG. 27

148—( PAPER
  149—( SEMANTIC RELATION
    150—( SCISSORS
      151—( CONTACT     WRAP )—152
      153—( NON-CONTACT     NON-INTERFERENCE )))
  155—( MOVEMENT RELATION                 154
    156—( SCISSORS
      157—( WRAP
        158—( FUNCTION     COVER )—159
        160—( START TIME     CONTACT )))))
                                    161

( BRUSH ~165
 ( USE ~204   166   ( BRUSH ~165
  ( WRITE WITH BRUSH →   ( USE WRITE ))
206~( OBJECT LETTER )~207   213 540
208~( OBJECT PICTURE )~209
210~( TYPE FACE WRITTEN WITH BRUSH ))~211

( SCISSORS ~800   → ( SCISSORS ~800
542~( USE CUT ))    ( USE CUT ))
   802   545   801

( TRASH BOX    802~( TRASH BOX
 ( USE DISPOSE )) → ( USE REMOVE ))
  216 803  218   804

FIG. 39
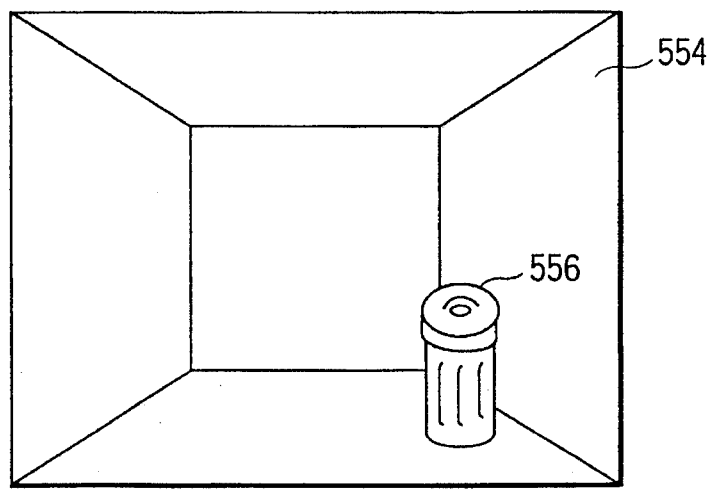
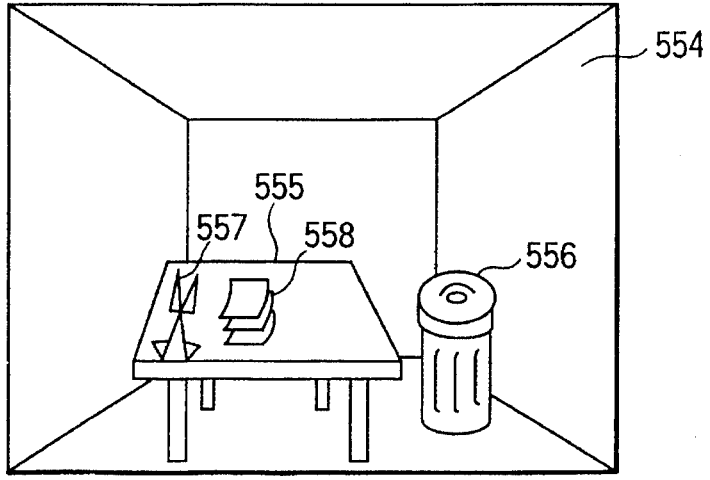
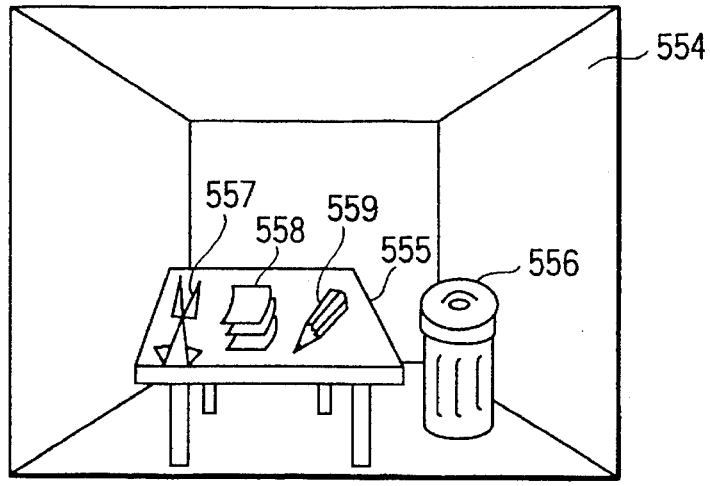

FIG. 45

540 — WRITE

- WRITE IN BLACK GOTHIC —— BLACK PENCIL
- WRITE IN RED GOTHIC —— RED PENCIL
- WRITE WITH BRUSH —— BRUSH — 165
- 166
- WRITE IN ROMAN —— FOUNTAIN PEN
- NOTEBOOK
- WRITE ON MEMO —— MEMO PAD
- DRAW LINE —— RULE
- PRINT OUT —— PRINTER

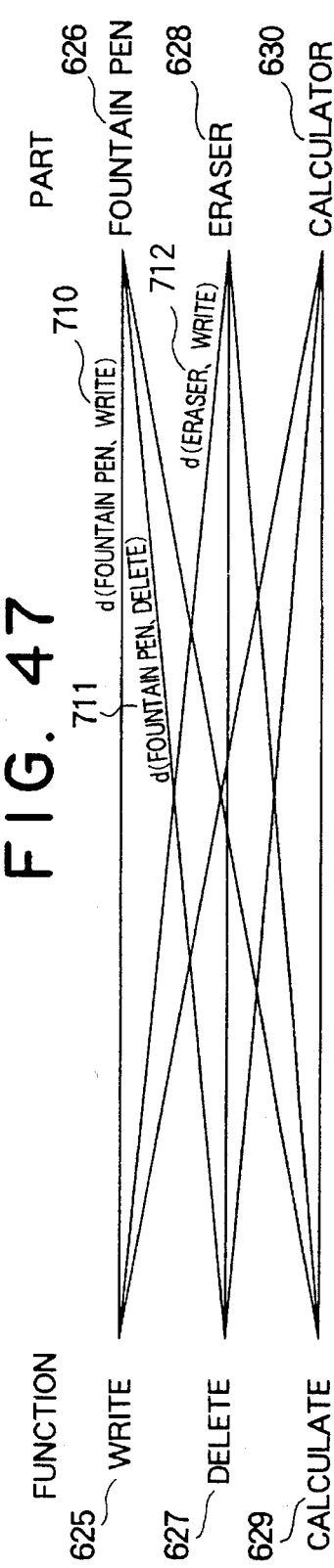

FIG. 46a

| FUNCTION OF APPLICATION | PART |
|---|---|
| WRITE — 251 | FOUNTAIN PEN — 254 |
| DELETE — 252 | ERASER — 255 |
| CALCULATE — 253 | CALCULATOR — 256 |

FIG. 46b

| COMBINATIONS OF FUNCTION & PART | SUM OF DISTANCES |
|---|---|
| 259 — WRITE — FOUNTAIN PEN (2), DELETE — ERASER (3), CALCULATE — CALCULATOR (2) | 7 — 260 |
| WRITE — FOUNTAIN PEN (2), DELETE — CALCULATOR (4), CALCULATE — ERASER (4) | 9 |
| WRITE — ERASER (4), DELETE — FOUNTAIN PEN (4), CALCULATE — CALCULATOR (2) | 10 |
| 261 — WRITE — ERASER (4), DELETE — CALCULATOR (4), CALCULATE — FOUNTAIN PEN (4) | 12 — 262 |
| WRITE — CALCULATOR (4), DELETE — FOUNTAIN PEN (4), CALCULATE — ERASER (4) | 12 |
| WRITE — CALCULATOR (4), DELETE — ERASER (3), CALCULATE — FOUNTAIN PEN (4) | 11 |

| NO. | OPERATION | OBJECT |
|---|---|---|
| 4 | DRAG | SCISSORS |
| 3 | TYPE | KEYBOARD |
| 2 | CLICK | PAPER |
| 1 | CLICK | PEN |

280 — 4, 281 — DRAG, 282 — SCISSORS
283 — 3, 284 — TYPE, 285 — KEYBOARD
286 — 2, 287 — CLICK, 288 — PAPER
289 — 1, 290 — CLICK, 291 — PEN

FIG. 51

| TASK (292) | FUNCTION (293) | PART (294) |
|---|---|---|
| PREPARE DOCUMENTS (259) | 1) DESCRIPTION (296) | KEYBOARD (297) |
|  |  | PEN (298) |
|  |  | PAPER (299) |
|  | 2) CUT & PASTE (300) | SCISSORS (301) |
|  |  | PAPER (302) |

USE OPERATIONAL ENVIRONMENT

FIG. 54

| | | | |
|---|---|---|---|
| COMMON 640 | AVERAGE RESPONSE SPEED 318 | MORE THAN 10 SECONDS | BEGINNER — 319a |
| | | MORE THAN 5 SECONDS | INTERMEDIATE |
| | | LESS THAN 5 SECONDS | ADVANCED |
| | KEYBOARD TYPING RATE 320 | SLOW — 321 | BEGINNER — 321a |
| | | AVERAGE | INTERMEDIATE |
| | | RAPID | ADVANCED |
| | CORRECTION RATE 322 | MORE THAN 10% — 323 | BEGINNER — 323a |
| | | MORE THAN 5% | INTERMEDIATE |
| | | LESS THAN 5% | ADVANCED |
| A 641 | AVERAGE RESPONSE SPEED — 303 | 20 SECONDS — 304 | |
| | ORDER OF DESIGNATION — 305 | FUNCTION – OBJECT — 306 | |
| | KEYBOARD TYPING RATE — 307 | SLOW — 308 | |
| | CORRECTION RATE — 309 | 30 % — 310 | |
| | FUNCTION OF SCISSORS — 311 | THRUST — 312 | |
| B 642 | AVERAGE RESPONSE SPEED | 4 SECONDS | |
| | ORDER OF DESIGNATION | OBJECT – FUNCTION | |
| | KEYBOARD TYPING RATE | RAPID | |
| | CORRECTION RATE | 3 % | |
| | FUNCTION OF SCISSORS | CUT | |

| MODIFIED ITEMS | MODIFICATION CONTENT |
|---|---|
| 326 — HELP GUIDANCE | BEGINNER LEVEL — 327 |
| 328 — FINENESS OF MOVEMENT | REFINE — 329 |
| 330 — SPEED OF MOVEMENT | REDUCE — 331 |

FIG. 58

| LEVEL | DISPLAY CONTENT |
|---|---|
| BEGINNER 583 | USES OF PARTS — 584 |
| | MATERIALS OF OBJECT PARTS — 585 |
| | CONFIRM CONTINUATION — 586 |
| 587 — INTERMEDIATE | CONFIRM CONTINUATION — 588 |
| 589 — ADVANCED | NO DISPLAY — 590 |

USER INTERFACE DEVICE FOR CREATING AN ENVIRONMENT OF MOVING PARTS WITH SELECTED FUNCTIONS

BACKGROUND OF THE INVENTION

This invention relates to user interface devices for information systems, etc., which provide efficient and easy-to-use user interface for applications etc.

FIG. 2 is a diagram showing the structure of a conventional user interface device, which is disclosed, for example, in Japanese Laid-Open Patent (Kokai) No. 2-266424. A parts storing means 1 stores the parts defined by means of visual data and action description data. An operational environment description means 2 describes the interchanges of the signals between the parts in the operational environment, for those parts stored in the parts storing means 1. An operational environment synthesizing means 3 synthesizes the program of the operational environment on the basis of the definitions of the parts stored in the parts storing means 1 and the interchanges of the signals between the parts described by the operational environment description means 2.

FIG. 3 is a diagram explaining the operation of the conventional user interface device of FIG. 2. A software button 4 outputs a signal from the output terminal when a mouse is clicked with a pointer within a designated area upon the screen. A repetition control part 5 has two inputs: a positive input terminal 8 and a negative input terminal 9 for starting and interrupting the repetition processes thereof, respectively. The repetition control part 5 controls the repetitions of the processes in response to the signals inputted thereto. A window part 6 is a part which outputs a signal from the output terminal thereof in response to the input from a user. A filter part 7 selects predetermined ones from among the signals received on the input terminal thereof and outputs the selected signals from the output terminal thereof.

Next the operation of the above conventional device is described. The parts storing means 1 stores the software button 4, the repetition control part 5, the window part 6, and the filter part 7. Each of the parts 4 through 7 consists of the visual data for representing the meaning of the part and the action description data describing the action thereof.

The operational environment description means 2 reads in or loads the software button 4, the repetition control part 5, the window part 6 and the filter part 7 stored in the parts storing means 1, and, by connecting the parts together, sets the interchange of the signals between the software button 4 and the repetition control part 5, between the repetition control part 5 and the filter part 7, and between the filter part 7 and the window part 6.

The operational environment synthesizing means 3 synthsizes the program of the operational environment on the basis of the signal interchange among the parts described by the operational environment description means 2. The repetition control part 5 within the synthsized program controls the execution of the fuctions of an application that is executed. The software button 4 and the window part 6 receive the inputs from the user. The filter part 7 selects predetermined signals from among the inputs from the window part 6, and outputs only the selected signals to the repetition control part 5.

Due to its structure, the above conventional user interface device has the following disadvantage. Namely, the user interface device is incapable of forming new parts or modifying the existing parts. Further, since the contents (the kinds and numbers) of the input/output signals are distinct and different from each other for respective signals, free combinations of the parts are difficult. Furthermore, for the purpose of combining the parts together, it is necessary that the user of the operational environment should explicitly designate the relationships between the parts. Thus, the user must possess the knowledge upon the contents of the signals or the data structures within the parts. In addition, the user interface device is incapable of inferring the intention of the user and adapting the operational environment thereto.

SUMMARY OF THE INVENTION

It is therefore an object of this invention to provide a user interface device for an information or computer system by which the parts, visually representing the functions to be performed within the operational environment upon the screen, can be formed and modified easily, and by which the parts can be combined freely, the relations therebetween being automatically formed. Further, this invention aims at providing such an user interface device by which the level and the intention of the user, etc., are inferred and the operational environment is automatically adapted to the individual user.

The above object is accomplished in accordance with the principle of this invention by a user interface device for an information system including a screen device for displaying an operational environment for a user, the user interface device which comprises (1) part forming means for formin parts for an operational environment, the parts providing graphical representations of functions of a program in the operational environment; (2) part storing means for storing information on the parts formed by the part forming means; (3) operational environment constructing means for constructing an operational environment by combining the parts stored in the part storing means; (4) operational environment storing means for storing the operational environments constructed by the operational environment constructing means; and (5) operational environment using means for executing a task of a program via an operational environment stored in the operational environment storing means.

Preferably, the user interface device includes: (1) semantic information forming means for forming semantic information of the parts, the semantic information including information upon functions corresponding to the parts; (2) movement information forming means for forming information upon movements of the parts; and (3) visual information forming means for forming visual information of parts representing visual screen images of the parts as aggregates of pixels.

Still preferably, the operational environment constructing means comprises: (1) semantic relation forming means for forming semantic relations between parts existing in the operational environment, on the basis of information on the parts formed by the part forming means; (2) movement relation forming means for forming movement relations between parts existing in the operational environment, on the basis of information on the parts formed by the part forming means; and (3) visual information relation forming means for forming visual information relations between parts existing in the operational environment, on the basis of information on the parts formed by the part forming means.

It is further preferred that the operational environments construced by the operational environment constructing means have hierarcy structures.

Furthermore it is preferred that the operational environment using means comprises: (1) operation history storing means for storing operation history of users utilizing the operational environment; (2) user information storing means for storing information upon levels and habits of users utilizing the operational environment; and at least one selected from the following (3) through (6): (3) intention analysis means for analyzing an intention of a user on the basis of at least an item of information selected from: information on the operational environment stored in the operational environment storing means, operation history of the user stored in the operation history storing means, and user information stored in the user information storing means; (4) individual adaptation means for automatically adapting the operational environment in accordance with a user currently using the operational environment, on the basis of at least an item of information selected from: information on the operational environment stored in the operational environment storing means, operation history of the user stored in the operation history storing means, and user information stored in the user information storing means; (5) movement generation means for generating movements of the parts in the operational environment, on the basis of at least an item of information selected from: information on the operational environment stored in the operational environment storing means, operation history of the user stored in the operation history storing means, and user information stored in the user information storing means; and (6) operational environment managing means for managing the operational environment by controlling respective means in the operational environment using means.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 9 shows a list describing the semantic information on the scissors formed in the semantic information forming window 34;

FIG. 10 shows a list describing the movement information upon the scissors formed by the movement information forming means 30;

FIG. 11 is a table showing the structure of the visual information of the part scissors formed by the visual information forming means 31;

FIG. 20 is a diagram showing the operations of the semantic relational information forming means 71 and the movement relational information forming means 72;

FIG. 22a shows the attribute list of a part, paper, before the execution of the procedure of FIG. 21;

FIG. 22b shows the attribute list of a part, paper, after the execution of the procedure of FIG. 21;

FIG. 24 shows lists representing the semantic information of the parts before being read into the operational environment;

FIG. 25 shows a list representing the information with respect to the action "cut";

FIG. 26 shows a list representing the information upon the semantic and movement relations of the part "scissors", serving as the actor of the action "cut", after the construction of the operational environment;

FIG. 27 shows a list representing the information upon the semantic and movement relations of the part "paper", serving as the actor of the action "wrap", after the construction of the operational environment;

FIG. 38 is a diagram showing hierarcy structures of operational environments, wherein FIG. 38a shows the hierarcy structure of the operational environment before a child operational environment is added; FIG. 38b shows the hierarcy structure of the operational environment after the addition of a child operational environment; and FIG. 38c shows the hierarcy structure of the operational environment after further addition of child parts;

FIG. 39 is a diagram showing the screen images corresponding to the hierarcy structures of FIG. 38;

FIG. 40 is a diagram showing hierarcy structures of operational environments, wherein FIG. 40a shows the hierarcy structure of the operational environment before a child operational environment is deleted; and FIG. 40b shows the hierarcy structure of the operational environment after the deletion of a child operational environment;

FIG. 45 is an enlarged diagram showing a portion of the semantic hierarcy structure of the meanings of parts and the realized functions as shown in FIG. 29;

FIG. 46a is a table showing the correlation or correspondence between the functions of an application and the parts;

FIG. 46b is a table showing the correspondence between combinations of the functions of application and the parts (shown at the left column) and the sum of distances corresponding thereto (shown at the right column);

FIG. 47 is a diagram showing the distances between the parts and the functions of an application;

FIG. 50 is a table showing the operation history of the user stored in the operation history storing means;

FIG. 51 is a table showing the tabular information, the task model, on the basis of which the functions and the tasks desired by the user are inferred from the inputs (operations) and the parts used/by the user;

FIG. 54 is arable containing the user information;

FIG. 57 is a table showing the correspondence between the modified items and the modification contents;

FIG. 58 is a table showing the correspondence between the user levels and the display contents.

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

FIRST EMBODIMENT

Under this heading, the overall structure of the user interface device according to this invention is described.

Figure 1:
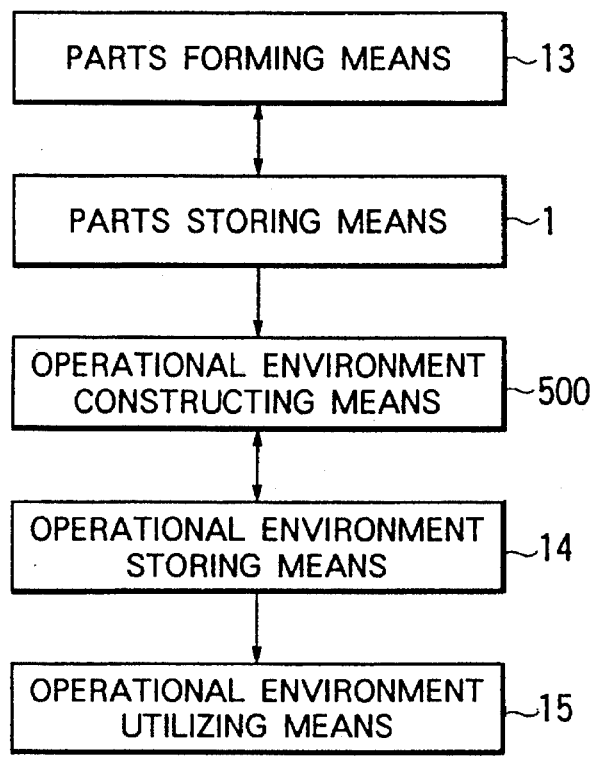
FIG. 1 is a diagram showing the overall structure of an user interface device according to this invention.
Figure 2:
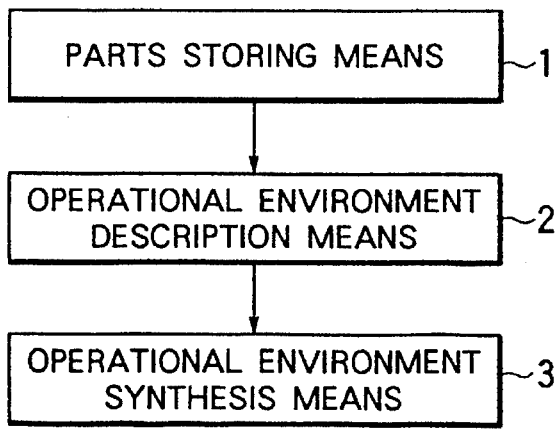
FIG. 2 is a diagram showing the of a structure conventional user interface device.
Figure 3:
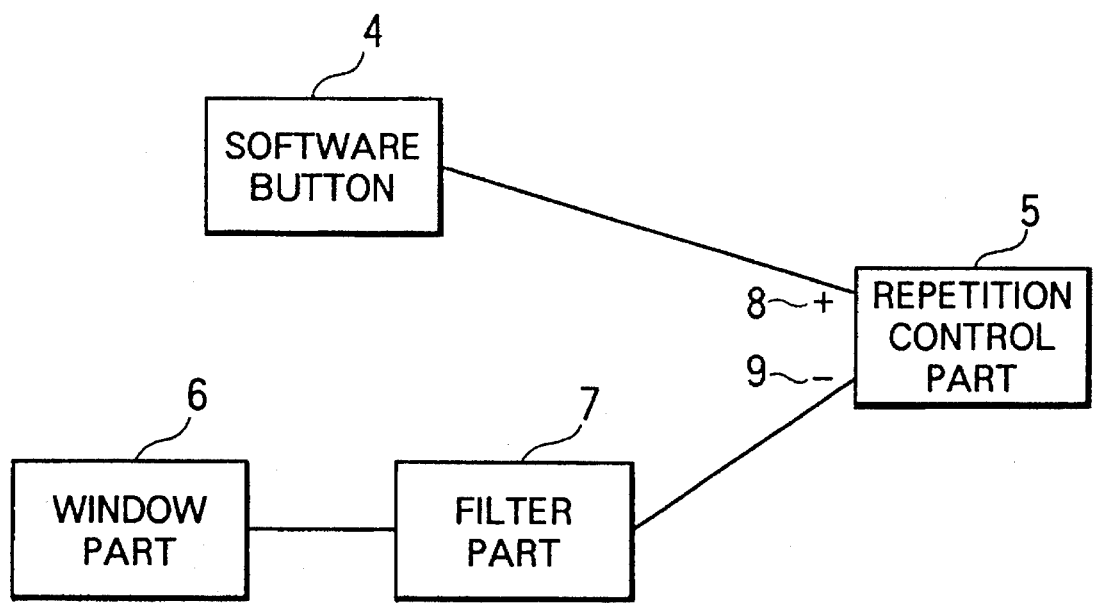
FIG. 3 is a diagram explaining the operation of the conventional user interface device of FIG. 2.

FIG. 1 is a diagram showing the overall structure of an user interface device according to this invention. Thus, parts forming means 13 forms the parts which represent the functions to be performed in the operational environment upon the screen of an computer or in system. The parts storing means 1 stores the parts formed by the parts forming means 13 within the operational environment. An operational environment constructing means 500 combines the parts stored via the parts storing means 1 to construct the operational environment. An operational environment storing means 14 stores the operational environment constructed by the operational environment constructing means 500. An operational environment using means 15 executes the tasks of applications via the operational environment loaded from the operational environment storing means 14, utilizing the parts included in the operational environment.

Figure 4:
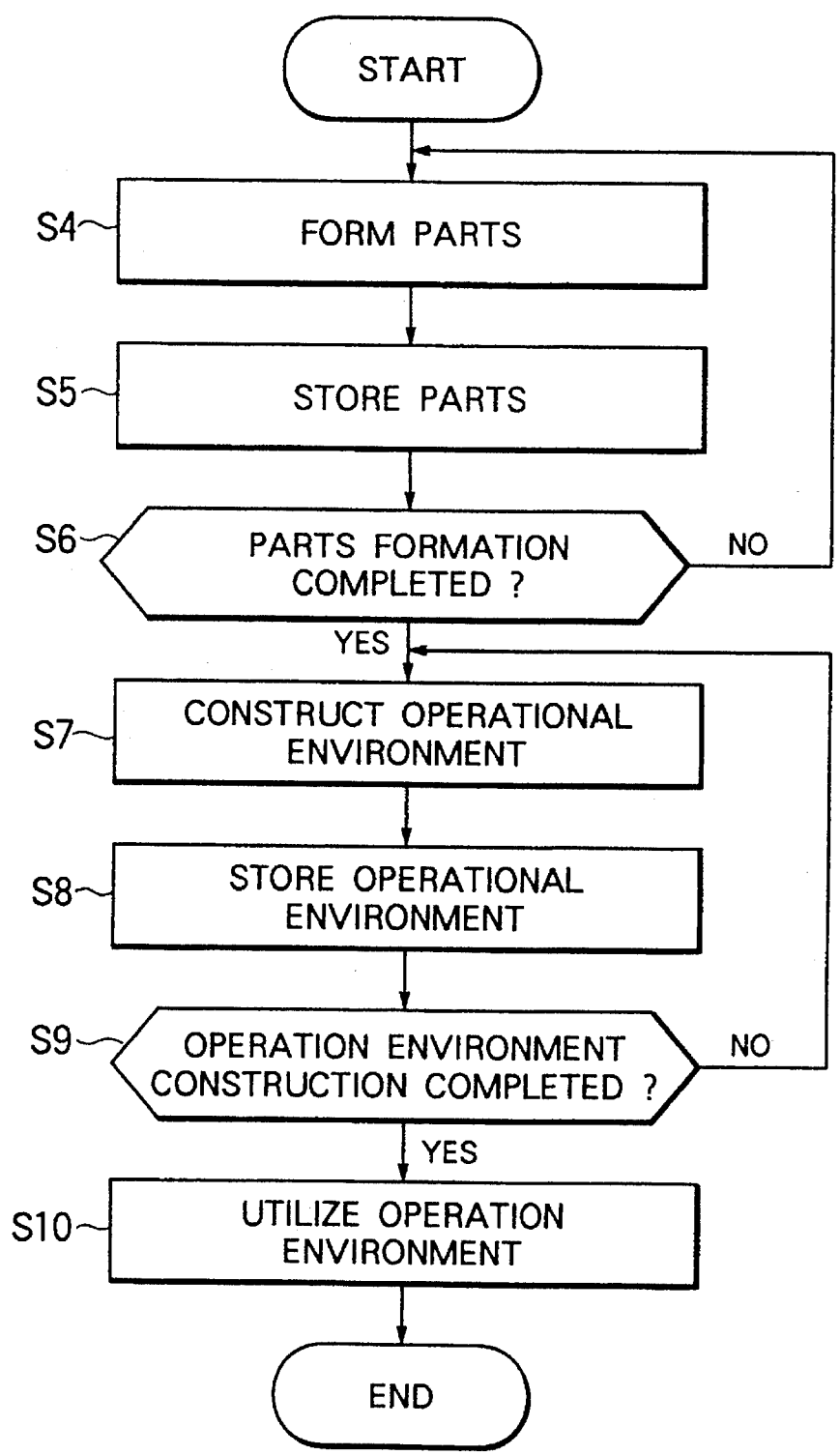
FIG. 4 is a flowchart showing the overall operation of the user interface device according to this invention.

FIG. 4 is a flowchart showing the overall operation of the user interface device according to this invention. At step S4, the parts utilized in the operational environment are formed by the user. At step S5, the parts formed at step S4 are stored. Next at step S6 it is judged whether or not the parts forming procedure is completed. If the parts forming procedure is not completed, the execution returns to step S4. On the other hand, if the formation is complete, the execution proceeds to step S7. At step S7, the parts stored at step S5 are loaded into the operational environment and combined to construct the operational environment. At step S8, the operational environment constructed at step S7 is stored. Next at step S9, it is judged whether or not the operational environment construction is completed. If the judgment at step S9 is negative, the execution returns to step S8 to complete the construction of the operational environment. On the other hand, if the judgment at step S9 is affirmative, the execution proceeds to step S10, where an operational environment stored at step S8 is read out and loaded such that a task of an application is executed via the operational environment.

Figure 5:
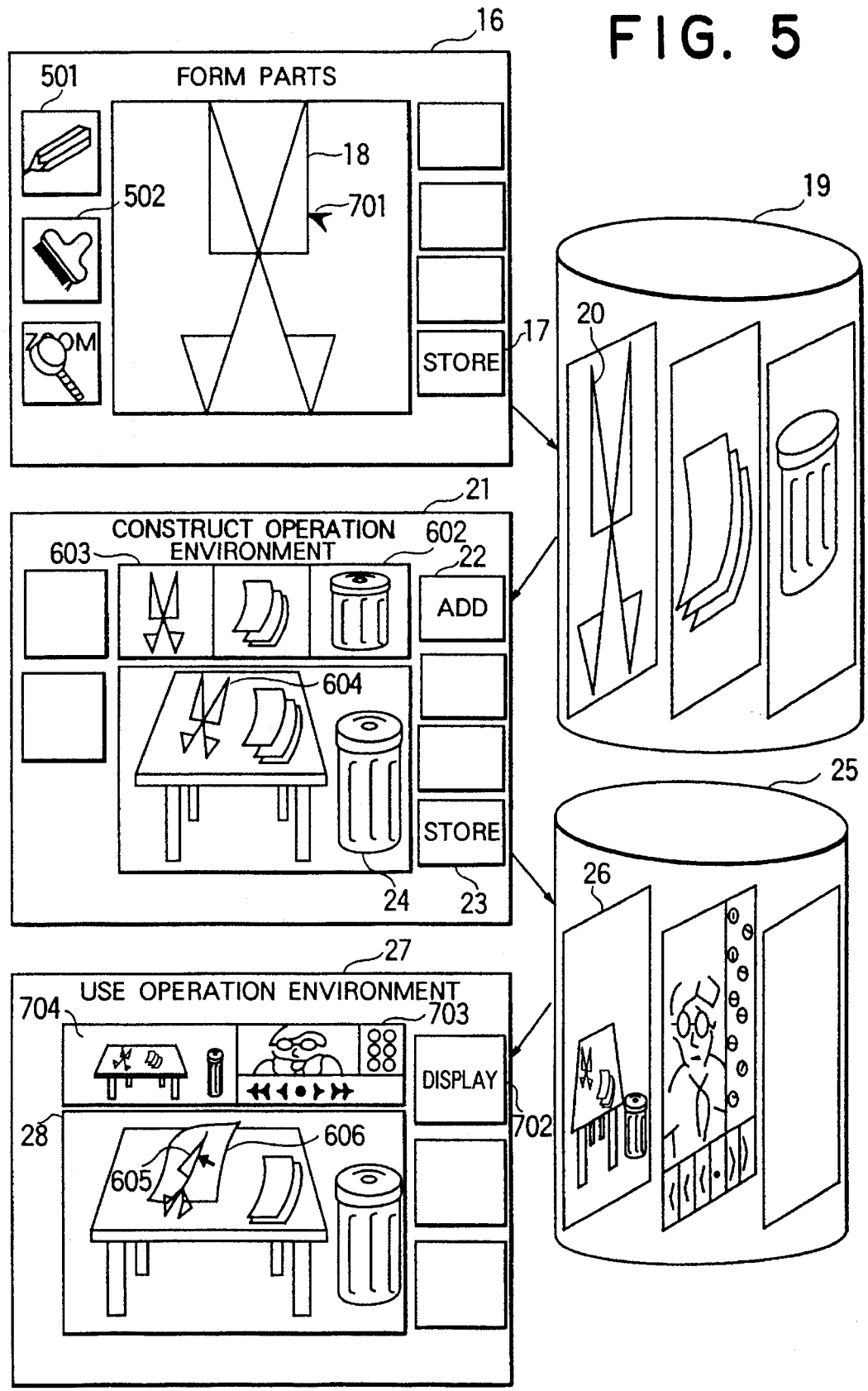
FIG. 5 is a diagram showing the overall operation the user interface device according to this invention.

FIG. 5 is a diagram showing the overall operation the user interface device according to this invention. As shown at the top in FIG. 5, the parts forming window 16 is displayed on the screen of the computer or information system upon calling and executing the parts forming means 13. The sides of the parts forming window 16 includes several icons: a pencil icon 501 for drawing lines via the parts forming means 13; a brush icon 502 for painting surfaces via the parts forming means 13; and a parts storing icon 17 for storing the formed parts in a parts library 19. Scissors 18 which is currently formed by the user via the parts forming means 13 is shown in the parts forming window 16. A cursor 71 is manipulated by the user to draw the outlines of the scissors 18 and thereby define the visual information thereof.

As shown at the middle in FIG. 5, an operational environment constructing window 21 is displayed on the screen upon execution of the operational environment constructing means 500, which constructs the operational environment by combining the parts stored in the parts library 19. By clicking the parts addition icon 22 via a mouse, etc., the parts stored in the parts library 19 are added to the operational environment which is being constructed by operational environment constructing means 500. An operational environment storing icon 23 is clicked to store the operational environment in an operational environment database 25. Parts display block 602 displays the parts read out from the parts library 19 into the operational environment constructing means. A pair of scissors 603 are shown in the parts display block 602. An operational environment or an office 24 is under construction via the operational environment constructing means 500. A pair of scissors 604 read into the office 24 is shown therein. The operational environment database 25 stores the operational environment: office 26 constructed by the operational environment constructing means 500.

As shown at the bottom in FIG. 5, an operational environment utilizing window 27 is displayed on the screen upon execution of the operational environment using means 15 for executing tasks of an application in the operational environment. By clicking a display icon 702 there is displayed an operational environment stored in the operational environment database 25 via the operational environment storing means 14. An operational environment display block 703 displays the operational environments stored in the operational environment database 25. The operational environment display block 703 currently includes the operational environment: office 704. An operational environment block 28 displays the operational environment which is currently used. A pair of scissors 605 and a piece of paper 606 are shown within the operational environment block 28.

Next, the operation of the first embodiment, or the general method of operation of the user interface device according to this invention, is described.

When the parts forming means 13 is activated, the parts forming window 16 is displayed on the screen. Then, the pencil icon 501 is selected (pointed and clicked via the mouse, etc) to draw lines, such that upon movement of the cursor 701, the outlines of the scissors 18 are drawn on the screen. Next, to paint surface areas of the scissors 18, the brush icon 502 is selected, such that upon movement of the cursor 701 within the areas enclosed within the lines drawn via the pencil icon 501, the surface areas of the scissors 18 are painted and the visual image of the scissors 18 is thereby formed.

Next, by selecting the parts storing icon 17 of the parts storing means 1, the scissors 18 formed by the parts forming means 13 are stored in the parts library 19 as scissors 20. The visual information of the other parts are formed and stored likewise. The semantic information, or the information on the functions of the parts within the operational environment, and the movement information of the parts may also formed and stored in the parts library 19 together with the visual information, as described below.

Next, when the operational environment constructing means 500 is activated, the operational environment constructing window 21 is displayed on the screen. Then, by selecting the parts addition icon 22, the parts display block 602 is opened, and the parts stored in the parts library 19 are read into the parts display block 602. By selecting the scissors 603, for example, within the parts display block 602, the scissors 604 are read into the operational environment: office 24 and included therein. The operational environment: office 24 is thus construced which includes several parts. By selecting the operational environment storing icon 23, the construced office 24 is stored in the operational environment database 25. By selecting the operational environment storing icon 23 of the operational environment storing means 14, the office 24 constructed via the operational environment constructing means 500 is stored in the operational environment using means 15 as the office 26.

Next, when the operational environment using means 15 is activated the operational environment utilizing window 27 is displayed on the screen. Then, by selecting the display icon 702, the operational environment display block 703 is opened and the operational environments stored in the operational environment database 25 are read into the operational environment display block 703. By selecting the office 704, for example, within the operational environment display block 703, the office 26 is read into the operational environment block 28, such that the utilization of the office operational environment becomes possible. Thus, the user can use functions of the parts in the office operational environment. For example, by moving the scissors 605 (the cursor) by means of the mouse, the user cut the paper 606 by means of the scissors 605.

SECOND EMBODIMENT

Next, referring to FIGS. 6 through 14, a second embodiment is described. In the case of the first embodiment described above, the information on the parts formed by the parts forming means 13 is similar to that of the conventional user interface device. According to this second embodiment, the parts forming means 13 includes a means for forming visual information, a means for forming semantic information, and a means for movement information.

Figure 6:
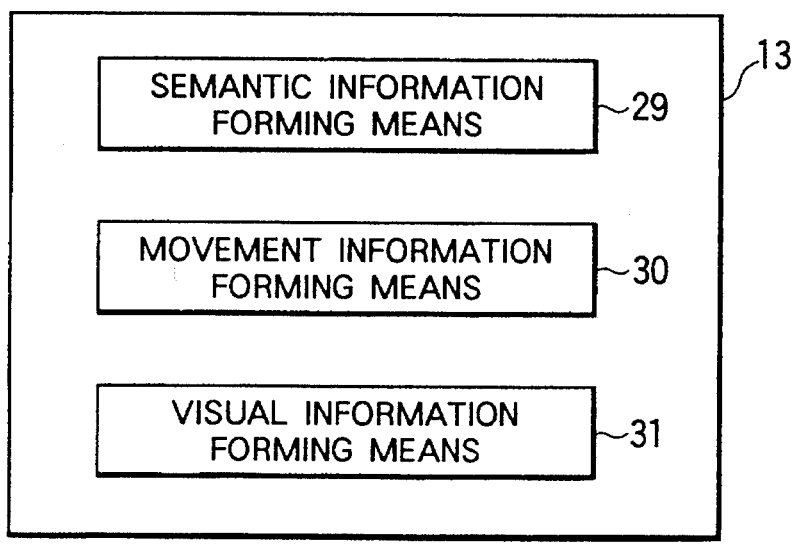
FIG. 6 is a diagram showing the structure of the parts forming means 13 of the second embodiment according to this invention.

FIG. 6 is a diagram showing the structure of the parts forming means 13 of the second embodiment according to this invention. The parts forming means 13 includes: a semantic information forming means 29 which forms the semantic information to define the functions, etc., of the parts; a movement information forming means 30 which forms the movements information to define the movements of the parts; and a visual information forming means 31 which forms the visual information to define the visual images of the parts displayed upon the screen.

Figure 7:
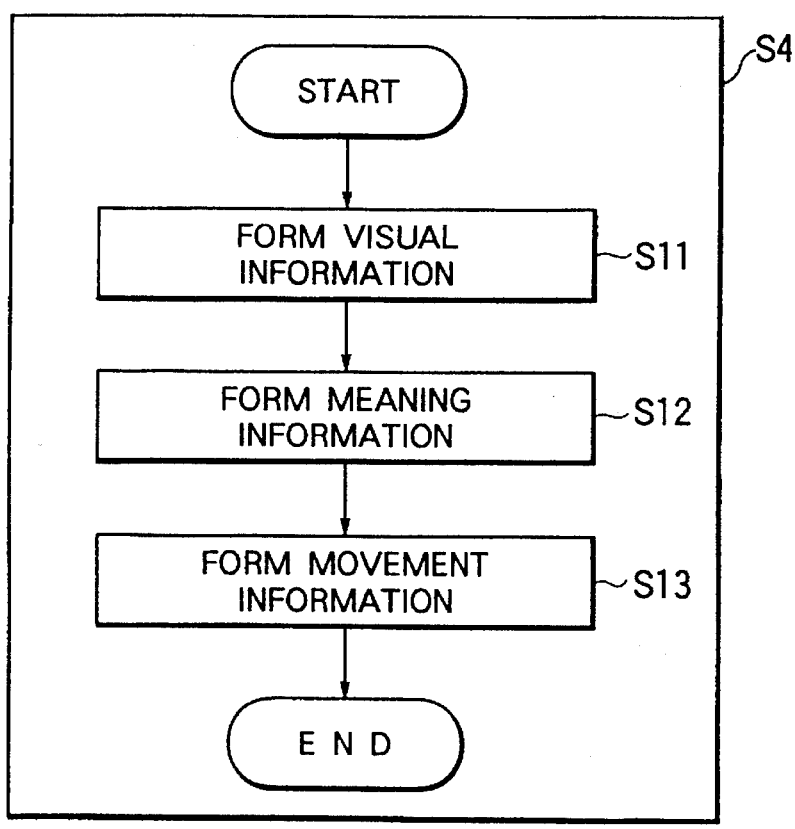
FIG. 7 is a flowchart showing the details of the parts forming step according to the second embodiment of this invention.

FIG. 7 is a flowchart showing the details of the parts forming step according to the second embodiment of this invention. The procedure of FIG. 7 corresponds to the parts forming step S4 of FIG. 4. At step S11, the visual information upon the screen images of the parts is formed. Next, at step S12, the semantic information of the parts, namely, the information upon the uses and the materials of the parts, is formed. Further, at step S13 the information upon the movements of the parts, such as the cutting movements or the translational movements thereof is formed.

Figure 8:
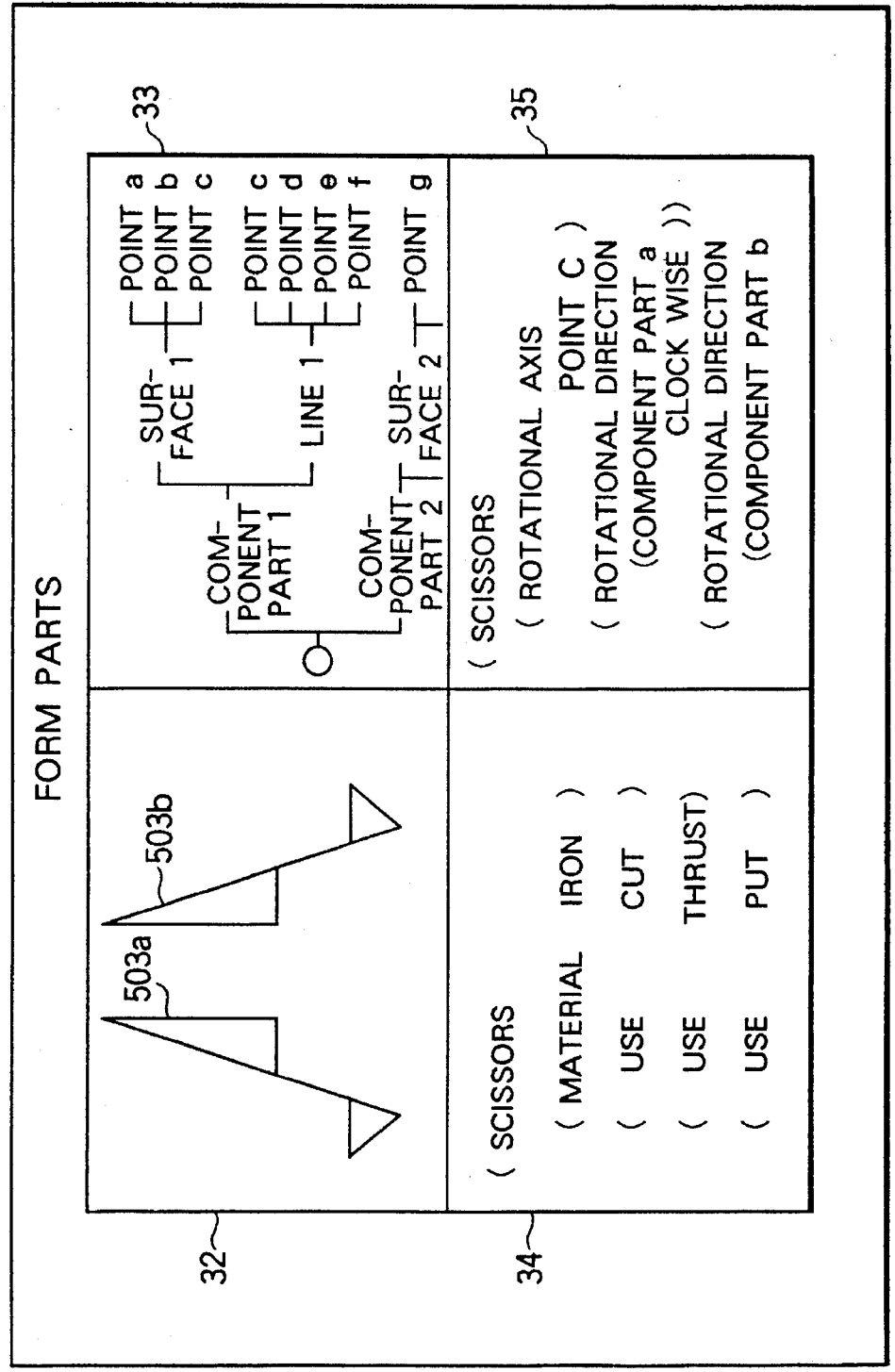
FIG. 8 shows the parts forming window in which scissors formed by the parts forming means 13 according to the second embodiment is shown.

FIG. 8 shows the parts forming window in which scissors formed by the parts forming means 13 according to the second embodiment is shown. In FIG. 8, the window includes four blocks: a visual information forming block 32 for forming the visual information of a part, such as a pair of scissors having two component parts 503a and 503b, which is being formed on the 3-dimensional modelling; a visual information structuring block 33 showing the hierarchical structure of the visual information of the part (the scissors) formed in the visual information forming block 32; a semantic information forming window 34 for forming the semantic information of the scissors; and a movement information forming window 35 for forming the information on the movements of the scissors.

FIG. 9 shows a list describing the semantic information on the scissors formed in the semantic information forming window 34. In FIG. 9, the first element of the list identifies the name of the part: the scissors 503. Next come sublists describing the semantic information of the part, each sublist consisting of an attribute key of the part and a value thereof. The first sublist consists of the attribute key "material" 36 and the attribute value "iron" 37, and shows that the scissors is made of iron. The second sublist consists of the attribute key "use" 38 and the attribute value "cut" 39, and shows that the scissors is used for cutting. The third sublist consists of the attribute key "use" 40 and the attribute value "thrust" 41, and shows that the scissors is used for thrusting. The fourth sublist consists of the attribute key "use" 42 and the attribute value "put" 43, and shows that the scissors may be put or placed. The fifth sublist consists of the attribute key "component part" 44 and the attribute value "component part a" 45, and the sixth sublist consists of the attribute key "component part" 46 and the attribute value "component part b" 47. The fifth and the sixth sublists show that the scissors includes the component part a and component part b.

FIG. 10 shows a list describing the movement information upon the scissors formed by the movement information forming means 30. The first element of the list identifies the name of the part: the scissors. Next come sublists describing the movement information of the part, each sublist consisting of an attribute key of the part and a value thereof. The first sublist consists of the attribute key "rotational axis" 48 and the attribute value "point C" 49, and shows that the scissors is capable of ratating around the point C. The second sublist consists of the attribute key "rotational direction" 50 and the attribute value nested sublist: (component a clockwise) 51, and shows that the component a of the scissors rotates in the clockwise direction. The third sublist consists of the attribute key "rotational direction" 52 and the attribute value nested sublist: (component b counterclockwise) 53, and shows that the component b of the scissors rotates in the counterclockwise direction. The fourth sublist consists of the attribute key "movement" 54 and the attribute value "rotation" 55, and the fifth sublist consists of the attribute key "movement" 56 and the attribute value "translation" 57. The fourth and the fifth sublists show that the rotation and the translation are registered as the movements of the scissors.

FIG. 11 is a table showing the structure of the visual information of the part scissors formed by the visual information forming means 31. In FIG. 11, the rotational axis C-C' is shown at reference numeral 59. To the points a, b, c, e, shown at reference numerals 60, 62, 64, and 66, respectively, correspond the coordinates: (62.5,100, 50), (62.5, 50, 45), (50, 50, 50), and (37.5, 0, 40), respectively, upon the screen, as shown at reference numerals 61, 63, 65, and 67, respectively. The line c-e is shown at reference numeral 68, while the surface a-b-c-a is shown at reference numeral 69.

The rotational axis c-c' 59 represents that the part "scissors" rotates around the line c-c' 59 as the rotational axis. The line c-e 68 represents the two end points of the line connecting the points c and e. The surface a-b-c-a 69 represents the polygonal region Formed by the lines connecting the points a, b, and c.

Figure 12:
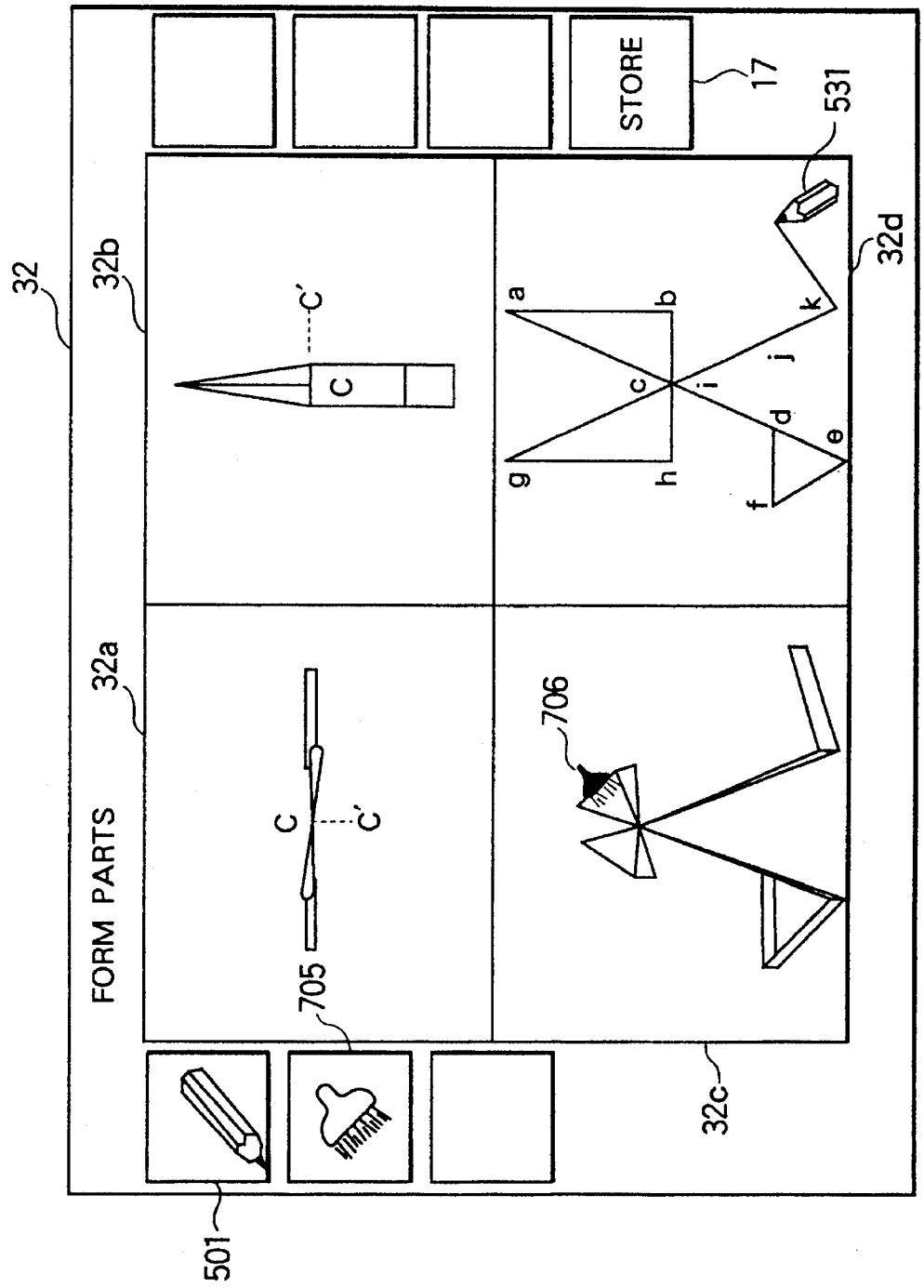
FIG. 12 is a diagram showing the operation of the visual information forming means 31 during the forming of the part "scissors"

FIG. 12 is a diagram showing the operation of the visual information forming means 31 during the forming of the part "scissors". In FIG. 12, the part "scissors" is formed by means of the visual information forming means 31 upon the three-dimensional model within the visual information forming block 32, which is currently occupying the whole screen. The visual information forming block 32 includes four blocks: a block 32a for displaying the front view of the part; a block 32b for displaying the side view of the part; a block 32c for displaying the perspective view of the part; and a block 32d for displaying the plan view of the part. Further, within the visual information forming block 32 are shown: a pencil icon 501 for drawing lines; a brush icon 705 for painting surface areas; a parts storing icon 17 for storing the parts into the parts library 19 of the parts storing means 1. A pencil cursor 531 shown within the block 32d is used for drawing outlines of the part shown therein. A brush cursor 706 shown within the block 32c is used for painting surface areas of the part. By the way, the points a, b, - - - , k of FIG. 11 are represented at the corresponding points on the scissors shown within the block 32d in FIG. 12.

Next the method of forming parts is described. When the pencil icon 501 is selected, the system displays the pencil cursor 531. Then, the user moves the pencil cursor 531 to draw the outlines of the part. Next, upon selecting the brush icon 705, the system displays the brush cursor 706. Then, the user moves the brush cursor 706 to paint surface areas of the part. When the part forming operation is finished, the formed part (in this case the scissors) is stored in the parts library 19 by clicking the parts storing icon 17. The drawing of lines and the painting of surface areas by means of the pencil cursor 531 and the brush cursor 706, respectively, can be effected within the blocks 32a, 32b, and 32c as well as within the block 32d.

Figure 13:
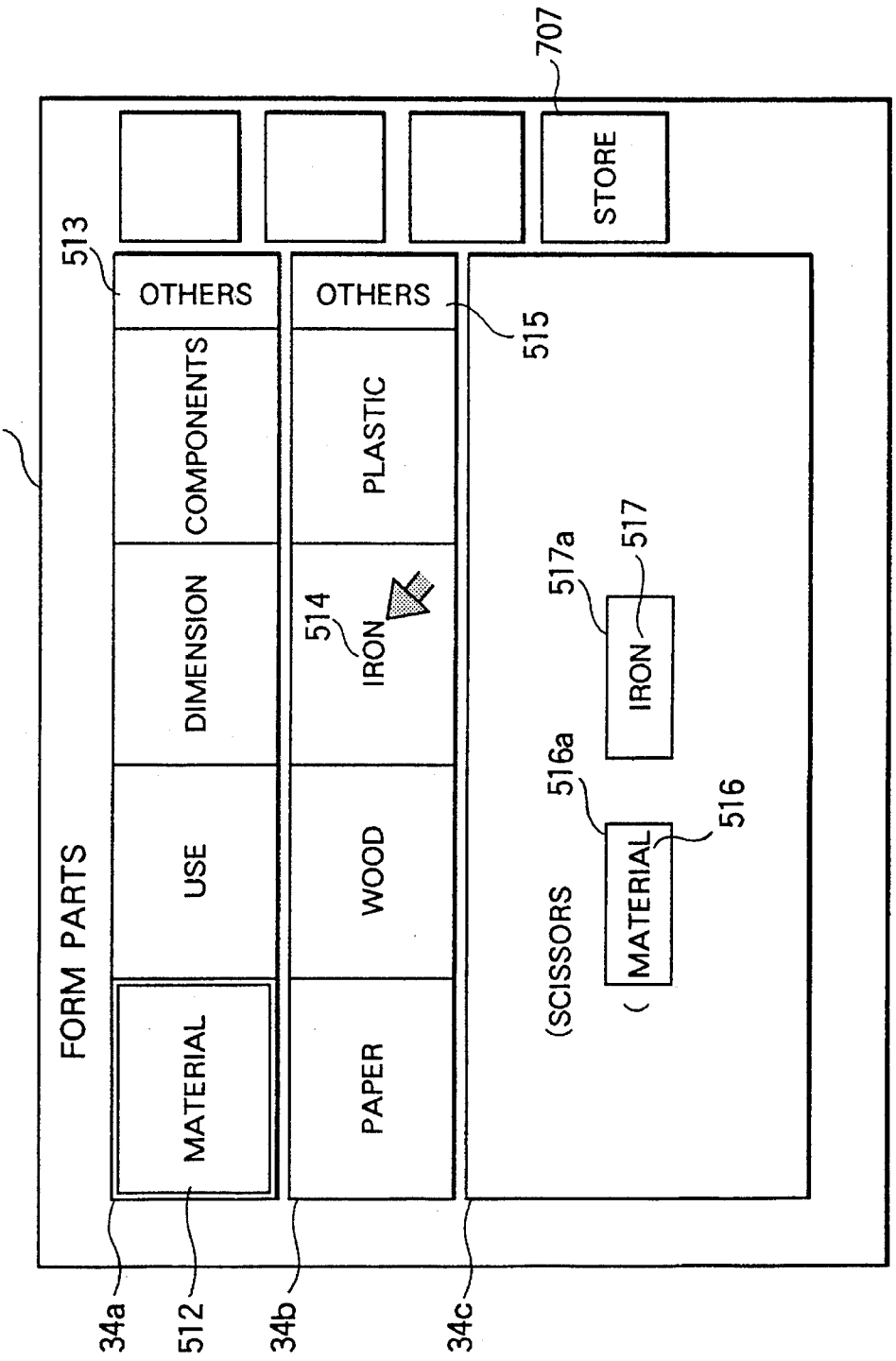
FIG. 13 is a diagram showing the operation of the semantic information forming means 29 during the forming of the part "scissors"

FIG. 13 is a diagram showing the operation of the semantic information forming means 29 during the forming of the part "scissors". In FIG. 13, the semantic information forming window 34 for forming the semantic information of the semantic information forming means 29 includes: an attribute key display block 34a; an attribute value display block 34b; and a part forming block 34c for displaying the semantic information of the part "scissors" which is being formed. The attribute key display block 34a includes an icon 512 for the attribute key, material, which is now selected. The semantic information forming window 34 includes further the icons for other attribute keys: use, dimension, and components, as well as an icon 513 for selecting attribute keys other than those presently shown in the attribute key display block 34a. Within the attribute value display block 34b are displayed the icons for the attribute values, such as iron 514, of the currently selected attribute key, material. The icon 515 at the right end of the attribute value display block 34b is used to select attribute values other than those presently shown therein. Upon selection of an attribute key, a frame 516a is displayed within the part forming block 34c and the selected attribute key, material 516, is displayed therein. Further, upon selection of an attribute value, a frame 517a is displayed within the part forming block 34c and the selected attribute value, iron 517, is displayed therein. The storage icon 707 is used (clicked) for storing into the parts library 19 the semantic information of the part formed by means of the semantic information forming window 34.

Next the method of forming the semantic information of a part is described. First, the icon 512 for the material, for example, is selected within the attribute key display block 34a as the attribute key of the part, scissors, which is being formed. If the attribute key to be selected is not shown within the attribute key display block 34a, the icon 513 for other attribute keys is selected and the necessary attribute key is input. Upon selection of the icon 512 for the attribute key material, the attribute key: material 516, is displayed in the frame 516a within the part forming block 34c, and the attribute values corresponding to the selected attribute key: material, 512 are displayed in the attribute value display block 34b. Since the part "scissors" is made of iron, the icon 514 for the attribute value iron is selected. Upon selection of the icon 514 for the iron, the attribute value: iron 517 is displayed in the frame 517a within the part forming block 34c. When the attribute value to be selected is not displayed in the attribute value display block 34b, the icon 515 for other attribute values is selected and the necessary attribute value is input. Other attribute keys and the attribute values corresponding thereto are selected in a similar manner. The semantic information of the part "scissors" thus formed as shown in FIG. 9 is stored in the parts library 19 by selecting the storing icon 707.

Figure 14:
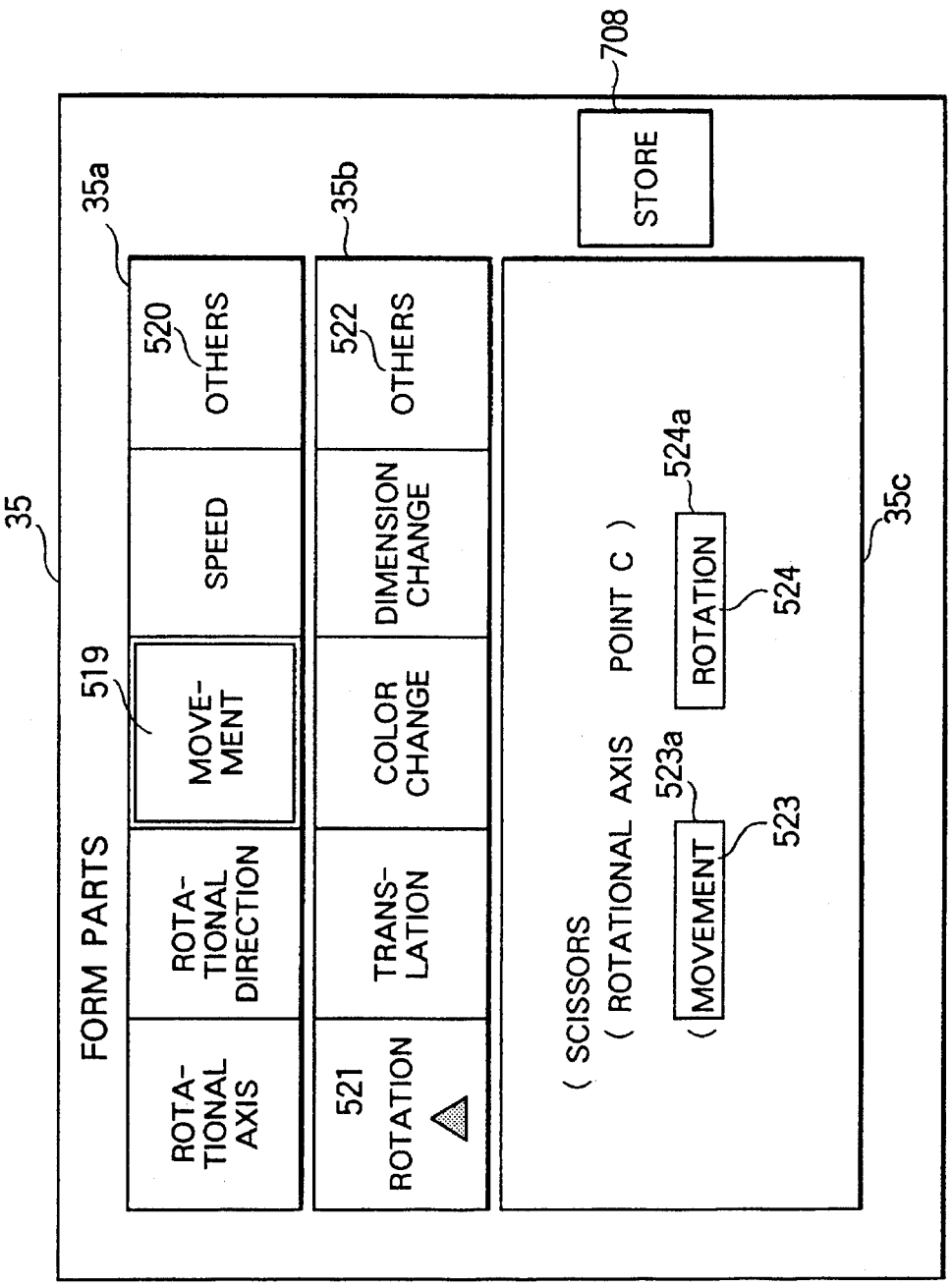
FIG. 14 is a diagram showing the operation of the movement information forming means 30 during the forming operation of the part "scissors"

FIG. 14 is a diagram showing the operation of the movement information forming means 30 during the forming operation of the part "scissors". In FIG. 14, the movement information forming window 35 includes: an attribute key display block 35a; an attribute value display block 35b; and a part forming block 35c. Within the attribute key display block 35a is shown the icon for the attribute key: movement 519, which is being selected, and the icon 520 for selecting attribute keys other than those currently displayed in the attribute key display block 35a. Within the attribute value display block 35b are displayed the attribute values corresponding to the selected attribute key, movement 519. Among the displayed attribute values, the icon for the attribute value: rotation 521 is being selected by the cursor. The icon 522 at the right end is used for inputting the attribute values other than those displayed within the attribute value display block 35b. The frame 523a is displayed within the part Forming block 35c upon selection of an attribute key, and the selected attribute key, movement 523, is displayed therein. The frame 524a is displayed within the part forming block 35c upon selection of an attribute value, and the selected attribute value, rotation 524, is displayed therein. The icon 707 is used for storing the movement information of the part formed in the part forming block 35c into the parts library 19.

Next, the method of forming the movement information of a part is described. First, the icon 619 for movement, for example, is selected, as the attribute key of the part: scissors, within the attribute key display block 35a. If the attribute key to be selected is not displayed, the icon 820 for other attribute keys is selected and the necessary attribute key is input. Upon selecting the icon 519 for the attribute key: movement, the attribute key movement 523 is displayed in the frame 523a within the part forming block 35c, and the attribute values corresponding to the selected attribute key, movement, are displayed in the attribute value display block 35b. Next, since the movements of the part: scissors include rotation, the icon 521 for the rotation is selected. Upon selection of the icon 521 for the rotation, the attribute value: rotation 524 is displayed in the frame 524a within the part forming block 35c. When an attribute value other than those displayed in the attribute value display block 35b is to be selected, the icon 522 for other attribute values is selected and the necessary attribute value is input. The other pairs of attribute keys and the attribute values corresponding thereto are formed in a similar manner, to form the movement information as shown in FIG. 10. The movement information of the part thus formed is stored in the parts library 19 by selecting the storing icon 708.

THIRD EMBODIMENT

Referring next to FIGS. 15 through 31, a third embodiment of this invention is described. In the case of the above embodiments, the relations between the parts constructed by the operational environment constructing means 500 are similar to those for the conventional user interface device. However, according to to this embodiment, the operational environment constructing means 500 includes: a means for constructing visual relations between the parts; a means for constructcing the semantic relations between the parts; and a means for constructing the movement relations between the parts.

Figure 15:
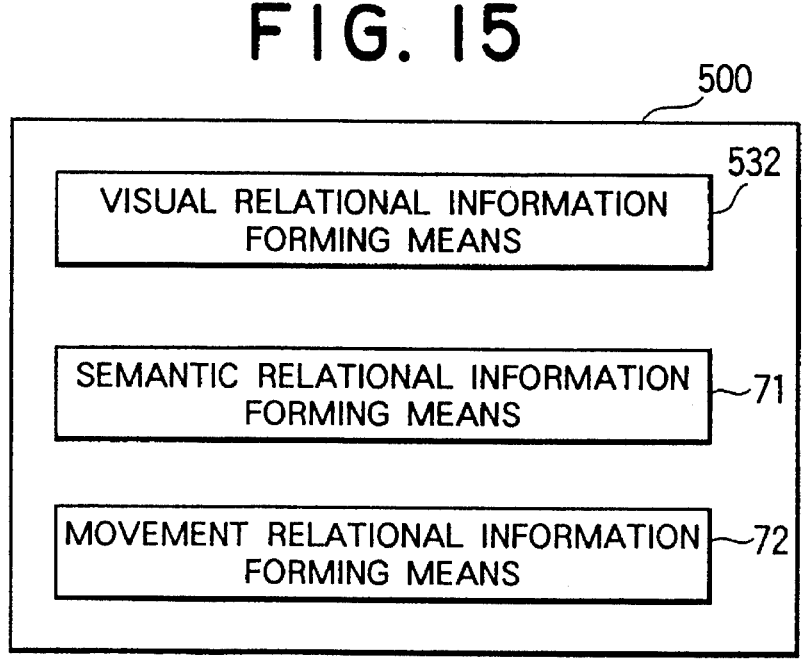
FIG. 15 is a block diagram showing the structure of the operational environment constructing means 500 for constructing the operational environment according to the third embodiment.

FIG. 15 is a block diagram showing the structure of the operational environment constructing means 500 for constructing the operational environment according to the third embodiment. The operational environment constructing means 500 thus includes: a visual relational information forming means 532 for forming the visual relations between the parts read into the operational environment; a semantic relational information forming means 71 for forming the semantic relations between the parts read into the operational environment; and a movement relational information forming means 72 for forming the movement relations between the parts read into the operational environment.

Figure 16:
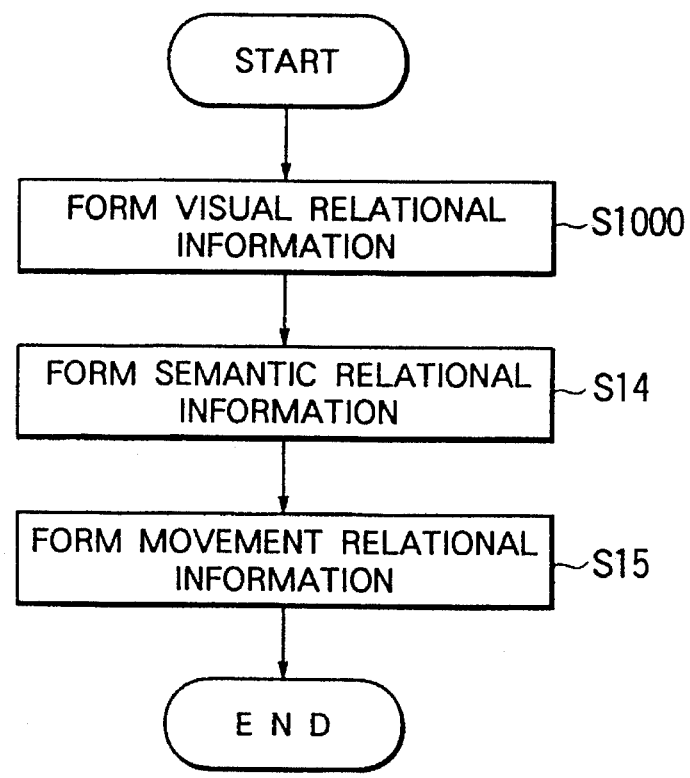
FIG. 16 is a flowchart showing the operational environment constructing procedure according to the third embodiment.

FIG. 16 is a flowchart showing the operational environment constructing procedure according to the third embodiment. At step S100, the visual relations between the parts are formed. Next at step S14, the semantic relations between the parts are formed. Further, at step S15, the relations with respect to the movements of the parts are formed.

Figure 17A:
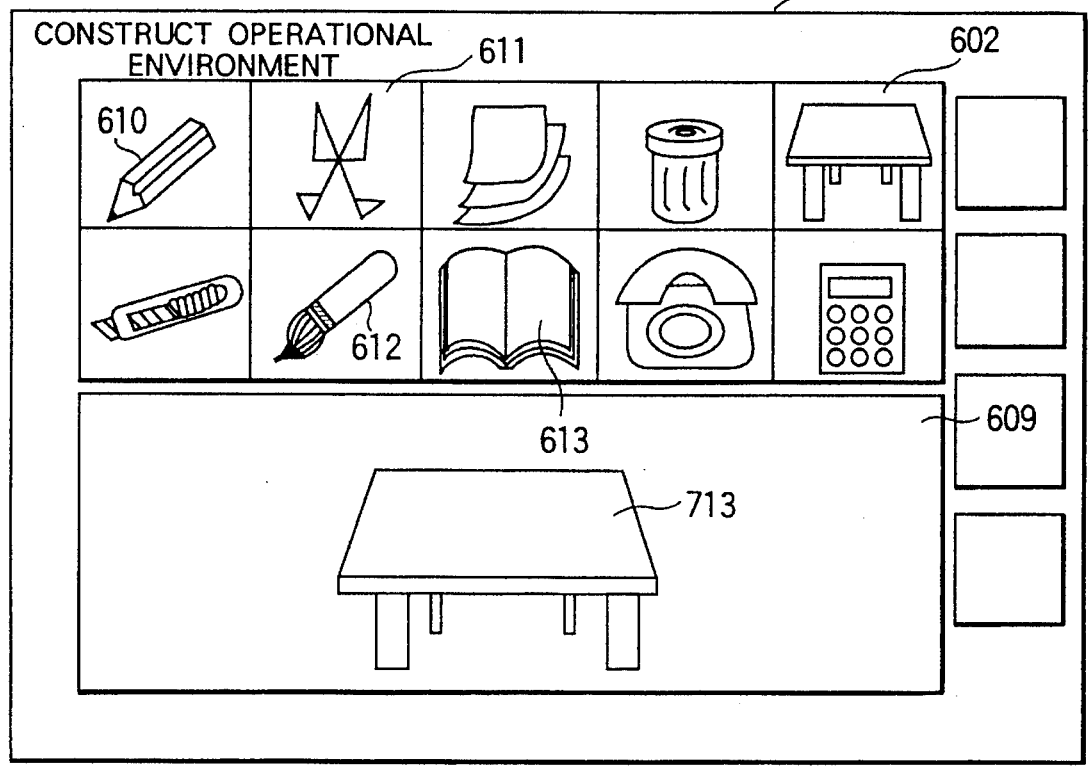
FIG. 17a is a diagram showing the operational environment constructing window 21 before reading (loading) the parts therein.
Figure 17B:
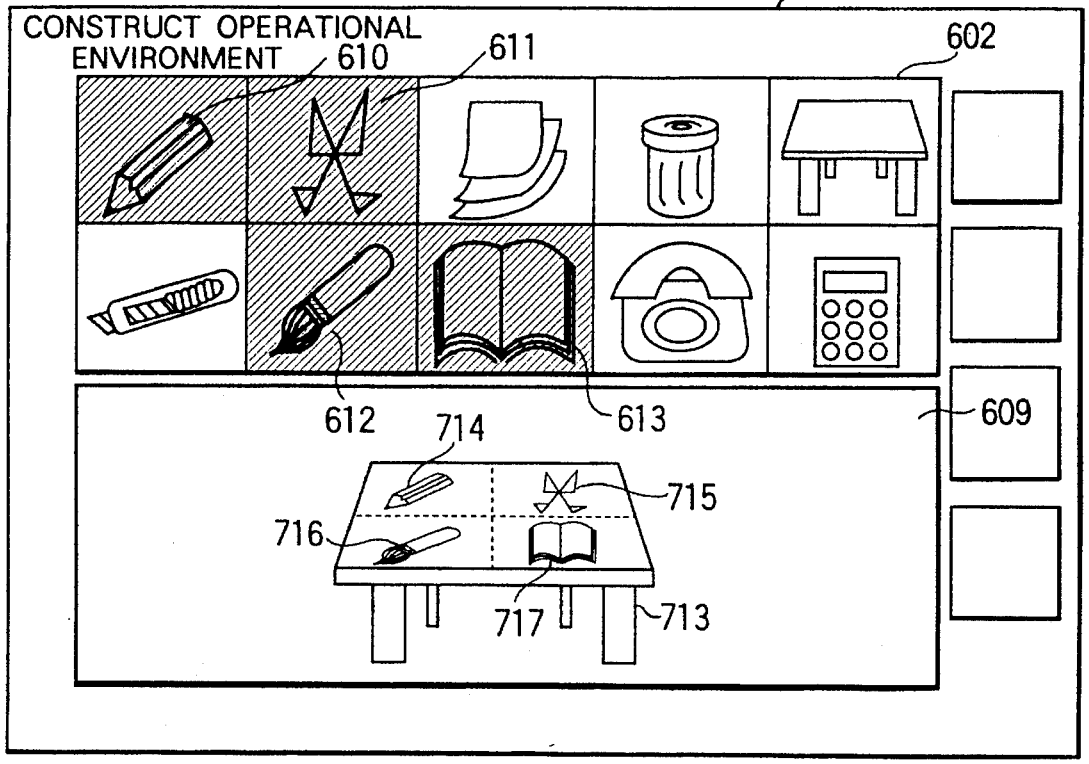
FIG. 17b is a diagram showing the operational environment constructing window 21 after reading the parts into the operational environment, desk top.

FIG. 17a is a diagram showing the operational environment constructing window 21 before reading (loading) the parts therein, and FIG. 17b is a diagram showing the operational environment constructing window 21 after reading the parts into the operational environment, desk top. The operational environment constructing window 21 for constructing the operational environment includes: a parts display block 602 for displaying the parts; and an operational environment constructing block 609 in which an operational environment, desk top 713, is displayed. The parts display block 602 includes a plurality of parts, such as: a pencil 610, a scissors 611, a brush 612, and a book 613. In FIG. 17b, the pencil 714, the scissors 715, the brush 716, and the book 717 are shown upon the desk top 713 within the operational environment constructing block 609.

Next, the method of constructing the operational environment is described. First, as shown in FIG. 17a, the parts stored in the parts library 19 are read into the parts display block 602 by means of the operational environment constructing means 500. Next, the parts displayed in the parts display block 602 are selected, to read the selected parts into the operational environment, desk top 713. The selected parts are displayed in reverse video, as shown by hatches in FIG. 17b, and are placed upon the desk top 713. When the parts are placed upon the operational environment, desk top 713, the visual relations between the parts and the operational environment are changed. In the case illustrated in FIG. 17b, the number of the parts disposed upon the desk top 713 is four. Thus, the dimensional ratio of the desk top 713 to the selected parts is automatically changed to 4 to 1. Thus, the visual relations between the operational environment and the parts are changed. In addition, it is possible to change the visual relations among the parts. For example, the scissors 715 should be substantially smaller than the book 717. Thus, by establishing information upon the visual relations between the parts, the visual relations among the parts may be adjusted, for example, by the user. For example, by describing the dimensional ratio of the pencil 714 to the book 717 at 1 to 5, the dimension of the pencil 714 is set at one fifth of that of the book 717.

Figure 18:
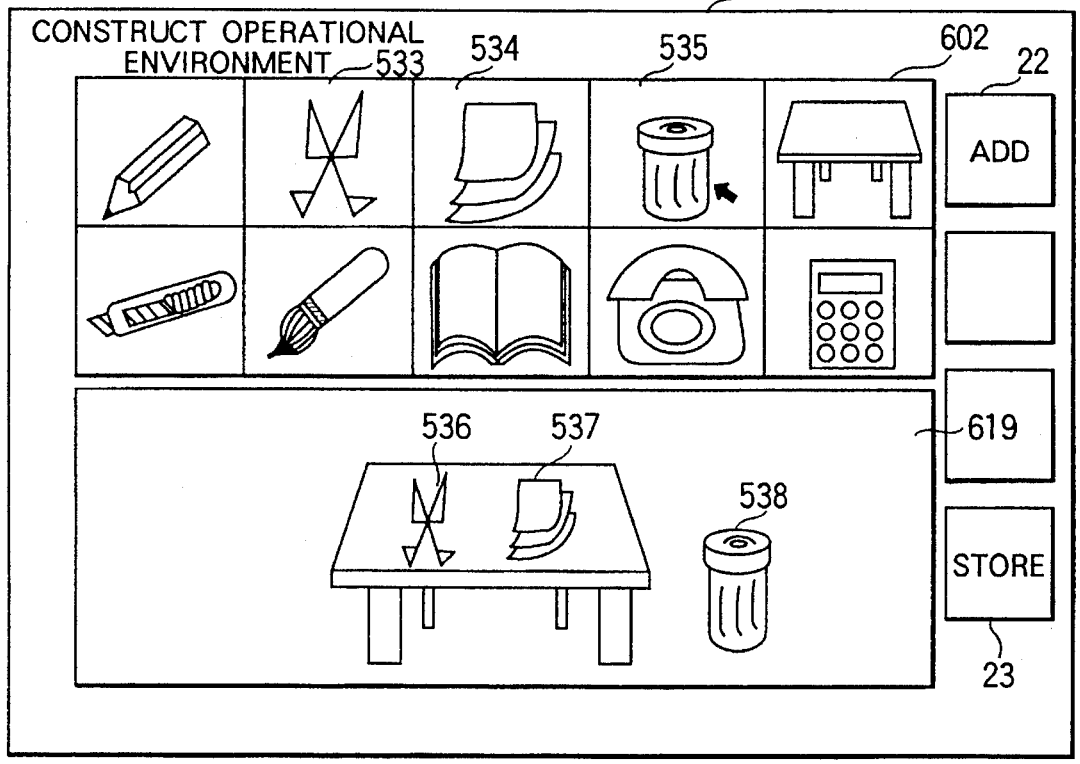
FIG. 18 is a diagram showing the relational information forming window 532a for the operational environment constructing means 500 according to the third embodiment.

FIG. 18 is a diagram showing the relational information forming window 532a for the operational environment constructing means 500 according to the third embodiment. The relational information forming window 532a of the operational environment constructing means 500 includes: a parts display block 602 for displaying the parts read in from the parts library 19; and a operational environment 619 for constructing the operational environment by means of the operational environment constructing means 500. The parts display block 602 includes the parts read in, such as: a scissors 533, a paper 534, and a trash box 535. Within the operational environment 619 are displayed the scissors 536, the paper 537, and the trash box 538. When clicked by means of a mouse, for example, the operational environment storing icon 23 of the operational environment storing means 14 stores the constructed operational environment in the operational environment database 25.

Next, the operation is described. By selecting, for example, the scissors 533, the paper 534, and the trash box 535 within the parts display block 602, the scissors 536, the paper 537 and the trash box 538 are read into the operational environment 619. Then, by means of the semantic relational information forming means 71 and the movement relational information forming means 72 (see FIG. 15), respectively, the semantic and movement relations between the parts read into the operational environment 619 are constructed. The operational environment 619 after construction is stored in the operational environment database 25 by pointing and clicking the operational environment storing icon 23 via the mouse.

Figure 19:
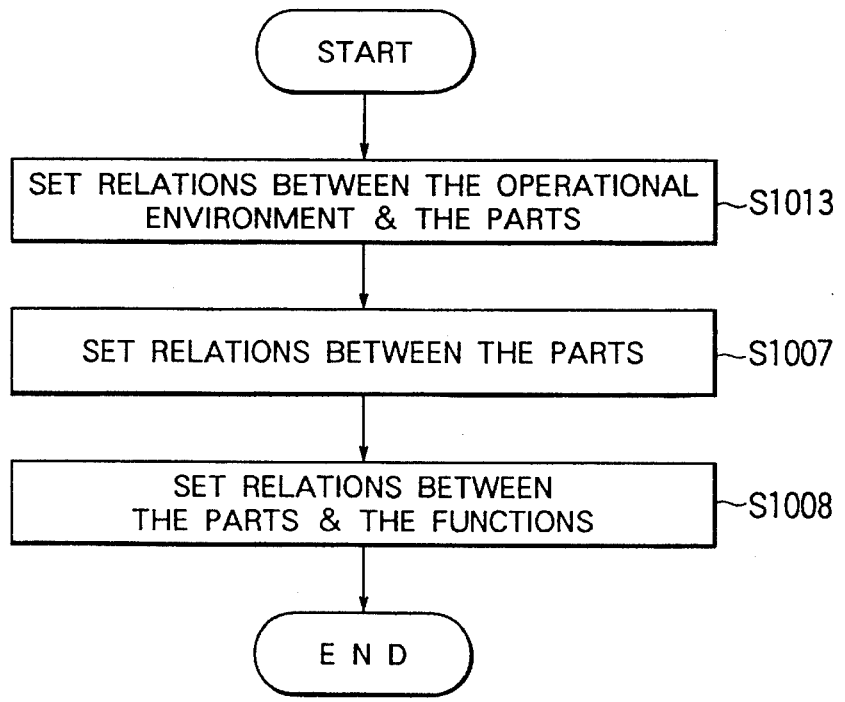
FIG. 19 is a flowchart showing the operations of the semantic relational information forming means 71 and the movement relational information forming means 72.

FIG. 19 is a flowchart shwoing the operations of the semantic relational information forming means 71 and the movement relational information forming means 72. First, at step S1013, the semantic and movement relations between the operational environment and the parts are set. Next, at step S1007, the semantic and movement relations among the parts are set. Further at step S1008, the semantic relations between the parts and the realized functions are set. The semantic relational information forming means 71 is involved in the steps: S1013, S1007, and S1008. The movement relational information forming means 72 is involved in the steps: S1013 and S1007.

FIG. 20 is a diagram showing the operations of the semantic relational information forming means 71 and the movement relational information forming means 72. The parts library 19 stores scissors 88 and paper 89 therein. The operational environment constructing window 90 includes icons such as: the parts addition icon 22 for adding parts to the operational environment, and the operational environment storing icon 23 for storing the operational environment into the operational environment database 25. A desk top 95 is stored in the operational environment database 25. Within the operational environment constructing window 90 is shown an operational environment, desk top 93, constructed by means of the operational environment constructing means 500.

The method of operation is described by reference to FIG. 19. The scissors 88 and the paper 89 stored in the parts library 19 are read into the operational environment by selecting the parts addition icon 22. Next, the at step S1013, the relations between the operational environment and the parts thus read in are set. At step S1007, the relations among the parts are set. Further, at step S1008, the relations between the parts and the functions are set. Thereafter, by selecting the operational environment storing icon 23, the desk top 93 constructed in the operational environment constructing window 90 is stored in the operational environment database 25 as the desk top 95.

Figure 21:
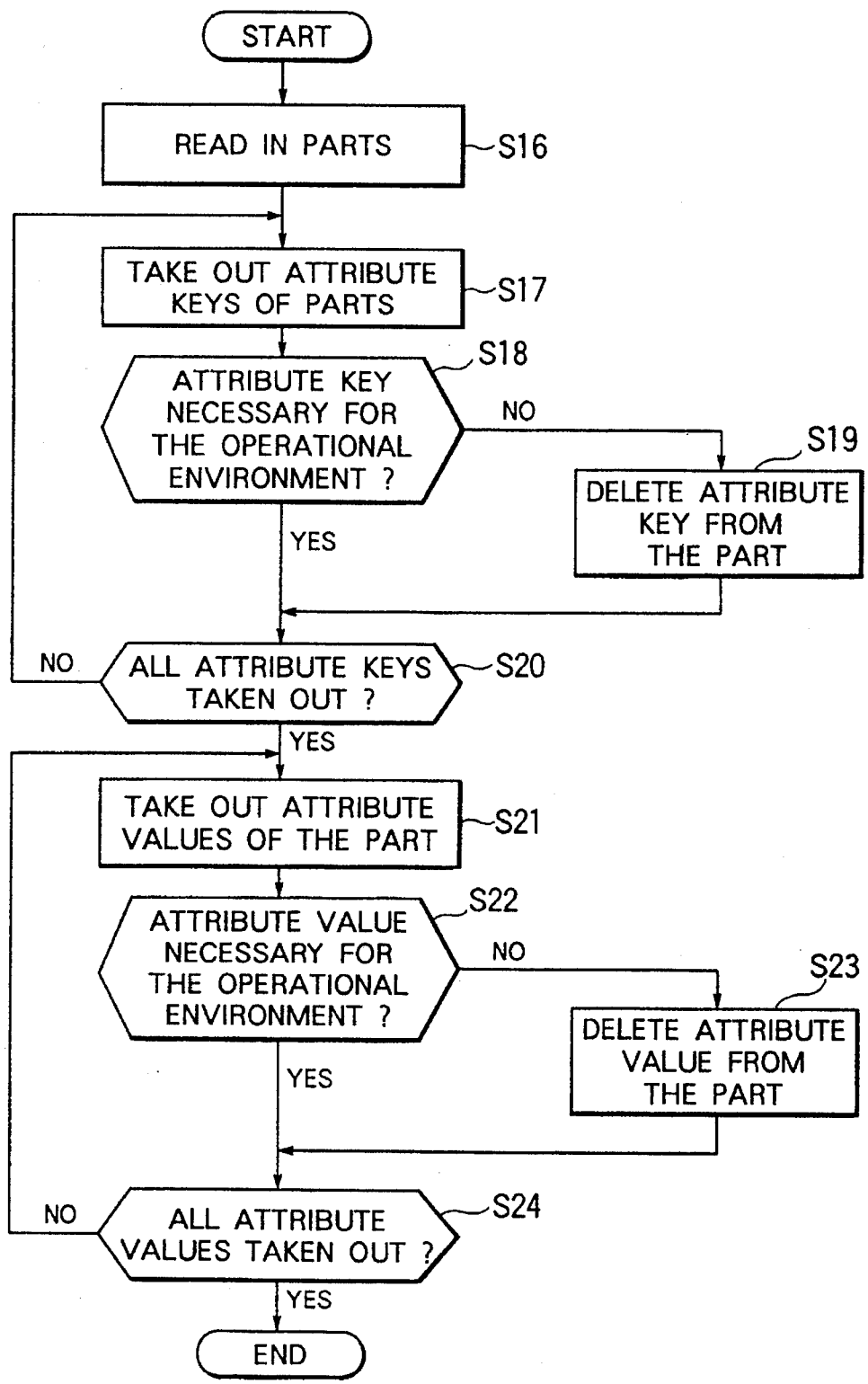
FIG. 21 is a flowchart showing the details of the procedure of setting the relations between the operational environment and the parts.

FIG. 21 is a flowchart showing the details of the procedure of setting the relations between the operational environment and the parts. At step S16 in each execution cycle of the procedure shown in FIG. 21, a part (incuding information upon attributes thereto) is read into the operational environment constructing window 90 of the operational environment constructing means 500 from the parts library 19 of the parts storing means 1. Next at step S17, the attribute keys of the part read in at step S16 is taken out. Further, at step S18, it is judged whether or not the attribute keys taken out at step S17 are necessary for the current operational environment. If judgment is affirmative at step S18, namely, if the attribute keys are necessary, the execution proceeds to step S20. If the judgement is negative at step S18, namely, if the attribute keys are not necessary, the execution proceeds to step S19, where the attribute keys are deleted from the attribute list of the part. At step S20, it is judged whether or not all the attribute keys have been taken out. If the judgment is affirmative at step S20, the execution proceeds to the next step S21. On the other hand, if the judgement is negative at step S20, the execution returns to step S17 to repeat the steps S17 through step S20.

Each time at step S21, an attribute value corresponding to each attribute key of the part is taken out. At step S22, it is judged whether or not the attribute value taken out at step S21 is necessary for the current operational environment. If the judgment is affirmative at step S22 the execution proceeds to step S24. Otherwise the execution proceeds to step S23, where the attribute value is deleted from the attribute list of the part. At step S24, it is judged whether or not all the attribute values have been taken out. If the judgment is affirmative at step S24, the procedure of FIG. 21 is terminated for the part read in at step S16. Otherwise, the execution returns to step S21 to repeat the steps S21 through step S24.

FIG. 22a shows the attribute list of a part, paper, before the execution of the procedure of FIG. 21, and FIG. 22b shows the attribute list of a part, paper, after the execution of the procedure of FIG. 21. As shown in FIG. 22a, the original attribute list first names the part, paper 73. Next follow the sublists each consisting of an attribute key, use 74, and a corresponding attribute value, such as burn 75, wrap 77 wipe 78, and crumple up 81.

Next the procedure of FIG. 21 is described in detail by reference to FIGS. 22a and 22b. First, at step S16, the attribute list for the part paper 73 is read into an operational environment, desk top. Next, at step S17, an attribute key, use 74, is taken out. At step S18, it is judged whether or not the attribute key, use 74, taken out at step S17 is necessary for the operational environment desk top. Under this circumstance, the attribute key use 74 is a necessary attribute key for the operational environment desk top. Thus, the execution proceeds to step S20 where it is judged whether or not all the attribute keys have been taken out. Under this circumstance, the use 74 is the sole attribute key, and hence the judgment is affirmative at step S20. Thus, the execution proceeds to step S21.

At step S21, the attribute value, burn 75, is taken out. At subsequent step S22, it is judged whether or not the attribute value burn 75 taken out at step S21 is a necessary attribute value. Under this circumstance, the attribute value burn is not necessary for the operational environment desk top. Thus, the execution proceeds t,o step S23, where the sublist containing attribute burn 75 is deleted from the attribute list of FIG. 22a. Next at step S24, it is judged whether or not all the attribute values have been taken out. Under this circumstance, there remain attribute values that are not yet taken out. Thus, the execution returns to step S21, where the next attribute value, wrap 77, is taken out from the attribute list. At step S22, it is judged whether or not the attribute value wrap 77 is a necessary attribute value for the operational environment desk top. Since the attribute value wrap 77 is a necessay attribute for the operational environment desk top, the execution proceeds to step S24, where it is judged again whether or not all the attribute values have been taken out. Since there remains attribute values that are not taken out yet, the execution returns to step S21 to repeat the steps step S21 through step S24.

As described above, all the remaining attribute values are succesively taken out from the attribute list of the part; it is judged whether or not the attribute values are necessary for the operational environment; and the attribute values which are not necessary for the operational environment are deleted from the attribute list of the part. As a result, in the case of the attribute list of FIG. 22a, the attribute values: burn 75 and wipe 79, are deleted, while the attribute values: wrap 77 and crumple 81, are left on the list. By reading the attribute list of the part paper 73 into the operational environment desk top, the semantic description of the part paper is adjusted. By the way, the judgment as to whether the attribute keys and the attribute values are necessary for the operational environment or not is made by describing the necessary attribute keys and the attribute values in the operational environment desk top, for example, and referencing the description in the operational environment desk top to determine whether the attribute keys and the attribute values are necessary for the operational environment or not. Thus, the procedure of FIG. 21 can be effected automatically.

Figure 23:
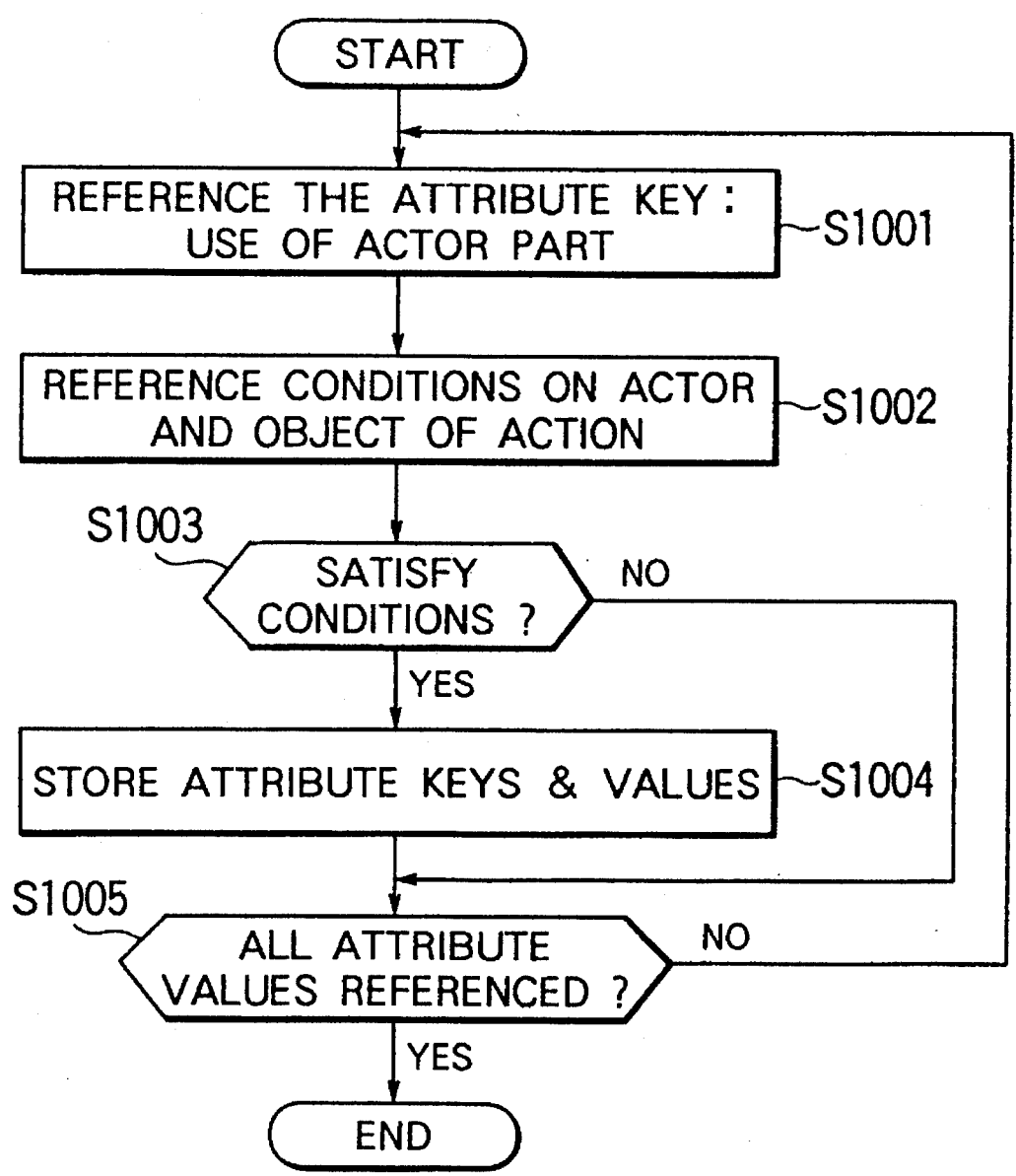
FIG. 23 is a flowchart showing the procedure by which the relations among the parts are set according to the third embodiment.

FIG. 23 is a flowchart showing the procedure by which the relations among the parts are set according to the third embodiment. First at step S1001, the attribute key, use, of the part functioning as an actor is referenced. Next at step S1002, the conditions of the actor and the object of the action corresponding to the attribute key use is referenced. Further at step S1003, it is judged whether or not the parts serving as the actor and the object of the action satisfy the conditions of the action. If the judgment is affirmative at step S1003, the execution proceeds to the next step S1004; otherwise the execution proceeds to step S1005. At step S1004, the attribute keys and the attribute values are stored. At step S1005, it is judged whether or not all the attribute values corresponding to the attribute key, use, have been referenced. If the judgment is affirmative at step S1005, the procedure is terminated; on the other hand, if the judgement is negative at step S1005, the execution returns to step S1003 to repeat the steps S1001 through S1005.

FIGS. 24 through 27 illustrates the lists utilized for setting the relations among the parts, wherein FIG. 24 shows lists representing the semantic information of the parts before being read into the operational environment. In FIG. 24, the first list represents the semantic information of the part scissors. Thus the first element thereof names the part, scissors 96, and there follow a plurality of sublists representing the attribute keys and the attribute values corresponding thereto. The first sublist, for example, consists of the attribute key use 97 and the attribute value cut 98 corresponding thereto. The second list represents the semantic information of the part, paper 99. Thus the first element thereof names the part, paper 99, and there follow a plurality of sublists representing the attribute keys and the attribute values corresponding thereto. The first sublist, for example, consists of the attribute key use 100 and the attribute value wrap 101 corresponding thereto. Further, the last sublist consists of the attribute key material 102 and the attribute value paper 103 corresponding thereto.

FIG. 25 shows a list representing the information with respect to the action "cut". In FIG. 25, the list consists of: the first element naming the action: cut; the second element or the first sublist for the attribute key: semantic relation 128; and the second sublist for the attribute key: movement relation 137.

The first sublist having semantic relation 128 as the first element or the attribute key thereof further includes three sublists representing the semantic relation 128 of the cut 127: the first sublist relating to the actor 129; the second sublist relating to the object 133; and the third sublist relating to the start of action 134. The first sublist for the actor 129 includes a nested sublist with a variable X 130 representing the actor and a sublist consisting of: the attribute key "use" 131 and the attribute value "cut" 132 corresponding thereto. The second sublist for the object 133 further includes a nested sublist with a variable Y 133a representing the object and a sublist consisting of: the attribute key "material" 33b and the attribute value "paper" 133c corresponding thereto. The third sublist consists of the attribute key: start of action 134, and the attribute value: contact 135.

The second sublist of the top level list relating to the movement relation 137 includes two sublists with the variables X 138 and Y 142 as the first elements thereof. The first sublist with the variable X 138 representing the actor includes a nested sublist with the attribute key: translation 139 as the first element and a sublist consisting of the attribute key: start time 140 and the attribute value: contact 141 corresponding thereto. The second sublist with the variable Y 142 representing the object includes two nested sublists: the first consisting of the attribute key "cut" 143 and a sublist consisting of the attribute key "start time" 144 and the attribute value "contact" 145 corresponding thereto; the second consisting of the attribute key: speed 146 and the attribute value: translation speed of X 147.

Thus, the top level second sublist for the movement relation 137 describes the information upon the movement of the parts for executing the action: cut 127. Namely, the sublist represents the fact that the actor 129 assigned to the variable X 138 is in translation 139, wherein the start time 140 of cut is at the time of contact 141. Further, the sublist represents that the object 133 assigned to the variable Y 142 is subject to the action: cut 143, and the start time 144 thereof is at the contact 145 with the actor, the speed 146 of action being the translation speed of X 147 where X is assigned the value of the actor 129.

FIG. 26 shows a list representing the information upon the semantic and movement relations of the part "scissors", serving as the actor of the action "cut", after the construction of the operational environment. The list, naming the part "scissors" 104 as the first element thereof, includes two sublists for the semantic relation 105 and the movment relation 113.

The sublist for the semantic relation 105 includes a nested sublist naming the paper 106 as the object of action. The sublist headed by paper 106 includes nested sublists representing the relations between scissors 104 and paper 106: a first sublist consisting of the attribute key "contact" 107 and the attribute value "cut" corresponding thereto; a second sublist consisting of the attribute key "contact" 109 and the attribute value "thrust" 110 corresponding thereto; and a third sublist consisting of the attribute key "non-contact" 111 and the attribute value "non-interference" corresponding thereto.

The sublist for the movement relation 113 includes a nested sublist naming paper 114 as the object of action. The sublist headed by paper 114 includes further nested sublists representing the relationships between the scissors and paper: a first sublist for the attribute key "cut" 118 and a seocnd sublist for the attribute key "thurst" 122".

The sublist naming "cut" 115 as the first element thereof further includes: a first nested sublist consisting of the attribute key "function" 116 and the attribute value "sever" 117 corresponding thereto; a second nested sublist consisting of the attribute key "start time" 118 and the attribute value "contact" 119 corresponding thereto; and a third nested sublist consisting of the attribute key "speed" 120 and the attribute value "translation speed of scissors" 121 corresponding thereto.

The sublist naming "thrust" 122 as the first element thereof further includes: a first nested sublist consisting of the attribute key "function" 123 and the attribute value "fix" 124 corresponding thereto; and a second nested sublist consisting of the attribute key "start time" 125 and the attribute value "contact" 126 corresponding thereto.

The first top level sublist for the semantic relation 105 describes the semantic relational information of the scissors 104. Thus, the second level sublist thereof first names paper 106 with which a relation is established. Further, the first nested sublist consisting of contact 107 and cut 108 represents the fact that upon contact 107 of the scissors 104 with the paper 106, the paper 106 is subjected to the cut 108 action. The second nested sublist consisting of contact 109 and cut 110 represents the fact that upon contact 107 of the scissors 104 with the paper 106, the paper 106 is subjected to the thrust 110 action. The third nested sublist consisting of non-contact 111 and non-interference 112 represents the fact that when the scissors 104 is in a non-contact 112 state with the paper 106, non-interference 112 prevails between the two.

The second top level sublist for the movement relation 113 describes the movement relational information of the scissors 104. Thus, the second level sublist thereof first names paper 114 with which a relation is established. Further, the first nested sublist for the cut 115 movement represents the fact that the function 116 thereof is to sever 117, that the start time 118 thereof is at contact 119, and that the speed 120 thereof is the translation speed of the scissors 121. Furthermore, the second nested sublist for the thrust 122 movement represents the fact that the function 123 thereof is to fix 124 (the paper), and that the start time 125 thereof is at contact 126.

FIG. 27 shows a list representing the information upon the semantic and movement relations of the part "paper", serving as the actor of the action "wrap", after the construction of the operational environment. The list, naming the part "paper" 148 as the first element thereof, further includes two sublists for the semantic relation 149 and the movment relation 155.

The sublist for the semantic relation 149 includes a nested sublist naming the scissors 150 as the object of action and including further sublists representing the mutual relationships: a first sublist consisting of the attribute key "contact" 151 and the attribute value "wrap" corresponding thereto; and a second sublist consisting of the attribute key "non-contact" 153 and the attribute value "non-interference" 154 corresponding thereto.

The sublist for the movement relation 155 includes a nested sublist naming the scissors 156 as the object of action and including a further nested sublist representing the mutual relationships. The nested sublist first names "wrap" 157 as action, and further includes sublists consisting of: the attribute key "function" 158 and the attribute value "cover" 159 corresponding thereto; and the attribute key "start time" 160 and the attribute value "contact" 161 corresponding thereto.

The first top level sublist for the semantic relation 149 describes the semantic relational information of the paper 148. Thus, the second level sublist thereof first names scissors 150 with which a relation is established. Further, the first nested sublist consisting of contact 151 and wrap 152 represents the fact that, upon contact 151 of the paper 148 with the scissors 150, the scissors 150 is subjected to an action: wrap 152. The second nested sublist consisting of non-contact 153 and non-interference 154 represents the fact that when the paper 148 and the scissors 150 are in a non-contact 154 state, non-interference 154 is established.

The second top level sublist for the movement relation 155 describes the movement relational information of the paper 148. Thus, the second level sublist thereof first names scissors 156 with which a relation is established. Further, the nested sublist first names the kind of movement: wrap 157, and represents the fact that the function 158 thereof is to cover 159, and that the start time 160 thereof is at contact 161.

Next, the procedure of FIG. 23 is described by reference to the case illustrated in FIGS. 24 through 27.

First at step S1001, the attribute key, use 97, of the part: scissors 96 serving as an actor is referenced in the list of FIG. 24, and the attribute value, cut 98, corresponding thereto is obtained.

Next at step S1002, the conditions of the actor and the object of the action corresponding to the attribute key use 97 is referenced in the list of FIG. 25. Since the attribute value corresponding to the attribute key use 9 is cut 98, the attribute value cut 132 corresponding to the attribute key use 131, and the attribute value paper 133c corresponding to the attribute key material 133b are referenced as the conditions.

Further at step S1003, it is judged whether or not the parts serving as the actor and the object satisfy the conditions of the action. The first list of FIG. 24 specifies that scissors 96 has the attribute value cut 98 for the attribute key use 97. The second list speficfies that paper 99 has the attribute value paper 103 for the attribute key material 102. Thus the conditions are satisified, and hence the execution proceeds to the next step S1004.

At step S1004, the attribute keys and the attribute values are stored in respective lists for the scissors and the paper. Thus, in the case of the list for the scissors 104, there is stored in the sublist for the semantic relation 105 a nested sublist first naming paper 106 as the object of action and further including: the attribute key "contact" 107 and the attribute value "cut" 108 corresponding thereto; and the attribute key "non-contact" 111 and the attribute value "non-interference" corresponding thereto. Further, in the sublist for the movement relation 113 is stored a nested sublist first naming paper 114 as the object of action and including a still nested sublist which first names the action, cut 115, and includes: a sublist consisting of the attribute key "function" 116 and the attribute value "sever" 117 corresponding thereto; a sublist consisting of the attribute key "start time" 118 and the attribute value "contact" 117 corresponding thereto; and a sublist consisting of the attribute key "speed" 120 and the attribute value "translation speed of the scissors" 121 corresponding thereto. It is noted that the variables X and Y in FIG. 25 are assigned the value of scissors and paper, respectively.

At step S1005, it is judged whether or not all the attribute values corresponding to the attribute key, use, have been referenced. If the judgement is negative, the execution returns to step S1001 to repeat the steps S1001 through S1005, such that the other attribute values such as "thrust" corresponding to the attribute key use in FIG. 24 are referenced and the attribute keys and the attribute values therefor are stored in the list for the scissors 104. When the judgment finally becomes affirmative at step S1005 and the procedure is terminated, the relational information list for the scissors 104 as shown in FIG. 26 is obtained. Similarly, by selecting paper as the part serving as the actor in the procudure of FIG. 23, the relational information list for the paper 148 as shown in FIG. 27 is obtained.

Figure 28:
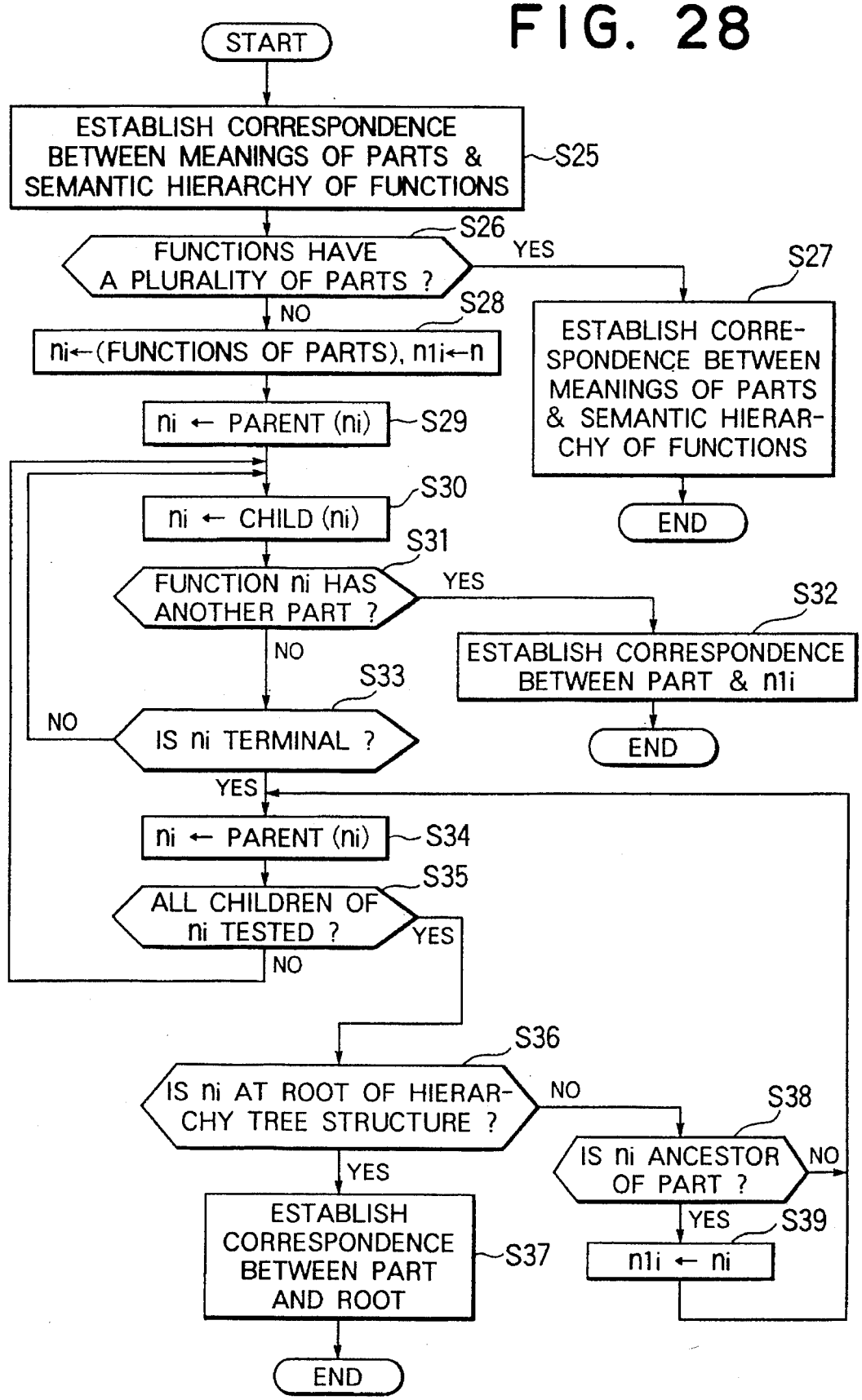
FIG. 28 is a flowchart showing the procedure for setting the relations between the parts and the functions.

FIG. 28 is a flowchart showing the procedure for setting the relations between the parts and the functions, which corresponds to step S1008 of FIG. 19. First at step S25, correspondences between the meanings or functions of the parts and the semantic hierarchy of functions are established. Next at step S26, it is judged whether or not the functions correspond to a plurality of parts. If the judgement is negative at step S26, the execution proceeds to step S28. On the other hand, if the judgment is affirmative, the execution proceeds to step S27, where correspondence between the parts and the child functions of the semantic hierarchy of the functions is established, and the execution is terminated.

At step S28, the functions of the parts are assigned to the variables ni and n1i. Next at step S29, the parent functions of the functions currently assigned to the variable ni are assigned to the variable ni. Further at step S30, respective child functions of the functions assigned to the variable ni are assigned to the variable ni.

At step S31, it is judged whether or not the function assigned to the variable ni corresponds to another part. If the judgement is negative at step S31, the execution proceeds to step S33; otherwise the execution proceeds to step S32, where the part is correlated to the function assigned to the variable n1i, and the execution is terminated.

At step S33, it is judged whether or not the function assigned to the variable ni is a terminal (leaf) in the semantic hierarchy tree of functions. If the judgement is negative at step S33, the execution returns to step S30 to repeat the steps S31 through S33. Otherwise, the execution proceeds to step S34, where the parent function of the function assigned to the variable ni is assigned to the variable ni.

Next at step S35, it is judged whether or not all the child functions of the function assigned to the variable ni have been tested in the semantic hierarchy of the functions. If the judgement is negative at step S35, the execution returns to step S30. Otherwise the execution proceeds step S36, where it is judged whether or not the function assigned to the variable ni is at the root of the tree structure of the semantic hierarcy of functions. If the judgment is affirmative at step S36, the part is correlated to the root function of the semantic hierarcy of the functions. Otherwise, the execution proceeds to step S38, where it is judged whether or not the function assigned to the variable ni is an ancestor of the part. If the judgement is negative at step S38, the execution returns to step S34. Otherwise, the execution proceeds to step S39, where the function assigned to the variable ni is assigned to variable n1i, and then the execution returns to step S34.

When the number of parts read into the operational environment is large, the meanings between the parts tend to be concentrated or closely resembling to each other. On the other hand, when the number of parts is small, the meanings of the parts tend to become rarefied or remotely resembling to each other. Thus, when the number of parts is large, the closely resembling meanings (functions) of the parts are to be described more specifically by moving away from the root of the tree structure of the semantic hierarcy. When, on the other hand, the number of parts is small, the meanings (functions) of the parts are to be described more abstractly by moving toward the root of the tree structure of the semantic hierarcy.

Figure 29:
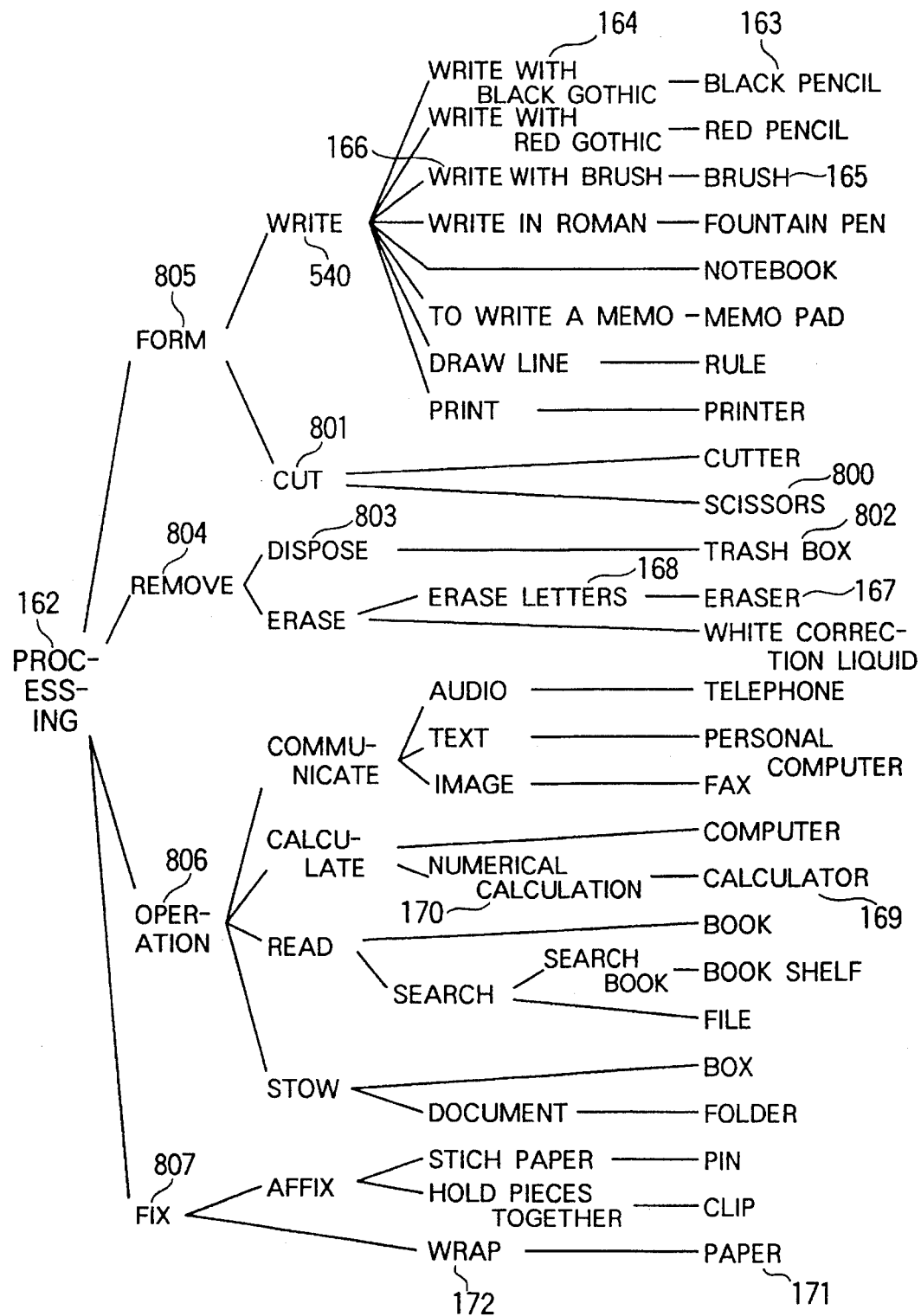
FIG. 29 is a diagram showing the semantic hierarcy tree structure of realized functions, together with the correspondence between the parts and the functions.

FIG. 29 is a diagram showing the semantic hierarcy tree structure of realized functions, together with the correspondence between the parts and the functions. The hierarcy structure shows the realized functions, in particular those that are to be used in the desk top operational environment. At the root of the hierarcy is the general function category, processing 162, from which branch four child or sibling realized functions: to form 805, to remove 804, operation 806, and to fix 807. These child realized functions again have their child realized functions, such that the realized functions become more specific (narrower) as one moves away from the root toward the leaves of the tree structure. For example, the realized function form 805 is classified into two child realized functions: write 540 and cut 801. In its turn, the realized function write 540 has the child realized function, write in black gothic 164, to which the part, black pencil 163, corresponds. The realized function 164 is a terminal realized realized function (leaf) by which the letters are writen in black with the gothic type face. Another terminal realized function, write with a brush 166, corresponds to the part brush 165 branch from the realized function write 540. The realized function cut 801 is also a terminal realized function, to which the part scissors 800 and cutter correspond.

The sub-tree with the realized function remove 804 at the root thereof includes a terminal realized function dispose 803, to which the part trash box 802 corresponds. Further, another terminal realized function erase letters 168 corresponds the part eraser 167.

The sub-tree with the realized function operation 806 at the root thereof includes a terminal realized function numerical calculation 170, to which the part calculator 169 corresponds. Further, the sub-tree with the realized function fix 807 at the root thereof includes a terminal realized function wrap 172, to which the part paper 171 corresponds.

The functions directly connected by a branch are related via a child-parent relationship. The realized functions form a hierarcy structure. The ancestor functions, to be reached by traversing the tree toward the root via the branches, are more abstract. The decendent functions, to be reached by traversing toward the leaves via the branches, are more specific.

When correspondence is established between a part and a function closer to the root, the part has a more abstract function. On the other hand, when correspondence is established between a part and a function closer to the terminal, the part has a more specific function.

Figure 30:
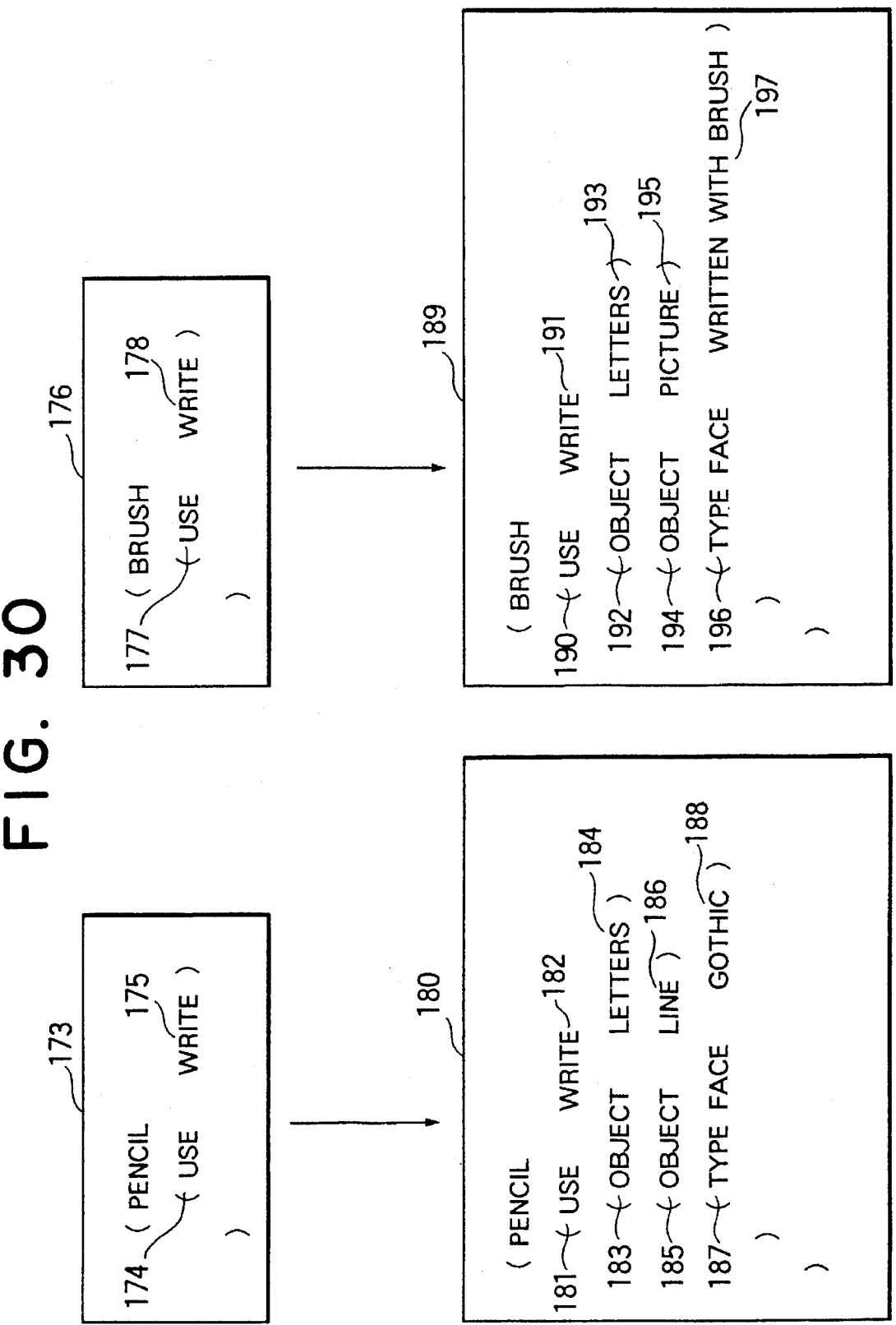
FIG. 30 is a diagram showing the process by which the concentration of the semantic information among the parts is resolved.

FIG. 30 is a diagram showing the process by which the concentration of the semantic information among the parts is resolved. Namely, when the pieces of semantic information among the parts are concentrated (i.e., close to, and hence indistinguishable from, each other), the semantic information is modified or re-constructed: the lists representing the semantic information of the parts shown at the top are modified to those shown at the bottom of FIG. 30.

Thus, the list 173 for the part pencil before the construction (re-construction) includes only one sublist consisting of the attribute key use 174 and the attribute value write 175 corresponding thereto. The list 176 for the part brush before the construction includes only one sublist consisting of the attribute key use 177 and the attribute value write 178 corresponding thereto.

On the other hand, the list 180 for the part pencil after the construction includes a sublist consisting of the attribute key "use" 181 and the attribute value "write" 182 corresponding thereto and three sublists giving specific information with respect to the function "wirte": a sublist consisting of the attribute key "object" 183 and the attribute value "letters" 184 corresponding thereto; a sublist consisting of the attribute key "object" 185 and the attribute value "lines" 186 corresponding thereto; and a sublist consisting of the attribute key "type face" 187 and the attribute value "gothic" 188 corresponding thereto. Similarly, the list 189 for the part: brush after the construction includes a sublist consisting of the attribute key "use" 190 and the attribute value "write" 191 corresponding thereto and three sublists giving specific information with respect to the function "write: a sublist consisting of the attribute key "object" 192 and the attribute value "letters" 195 corresponding thereto; a sublist consisting of the attribute key "object" 194 and the attribute value "picture" 195 corresponding thereto; and a sublist consisting of the attribute key "type face" 196 and the attribute value "written with brush" 197 corresponding thereto.

The lists for pencil 173 and brush 176 before construction have the same attribute key, use 174 and 177, and the attribute value, write 175 and 178. Thus, it is necessary to give more specific information upon the functions of the two parts if they are read into and used in an eo simultaneously. Thus, via the application of the procedure of FIG. 28 with reference to the hierarcy semantic structure of FIG. 29, the lists 173 and 176 shown at the top in FIG. 30 are rewritten and more detailed lists 180 and 189 are obtained. Next a specific example of the procedure of FIG. 28 is described by reference to FIGS. 29 and 30.

First at step S25, correspondences between the meanings or functions of the parts and the semantic hierarchy of functions are established. It is assumed that the two parts, the pencil and the brush, are read into the operational environment. Thus, the functions, write 175 and 178, of pencil 173 and brush 176 are located in the semantic hierarcy of functions of FIG. 29.

Next at step S26, it is judged whether or not the functions located within the hierarcy tree of FIG. 28 correspond to a plurality of parts included in those read into the operational environment. In this case, the function write corresponds to a plurality of parts, pencil 173 and brush 176. Thus, the execution proceeds to step S27.

At step S27, correspondences between the parts and the child functions of the function write 540 located at step S25 within the semantic hierarchy of the functions are established. Namely, pencil 173 is correlated to the child function, write with black gothic 164. Brush 176 is correlated to the child function, write with brush 165. Thereafter, the procedure is terminated. As a result, pencil 180 and brush 189 are correlated to more specific functions: write with black gothic 164 and write with brush 166. The lists giving the specific information shown at the bottom of FIG. 30 are thus obtained.

Figures 31, 32:
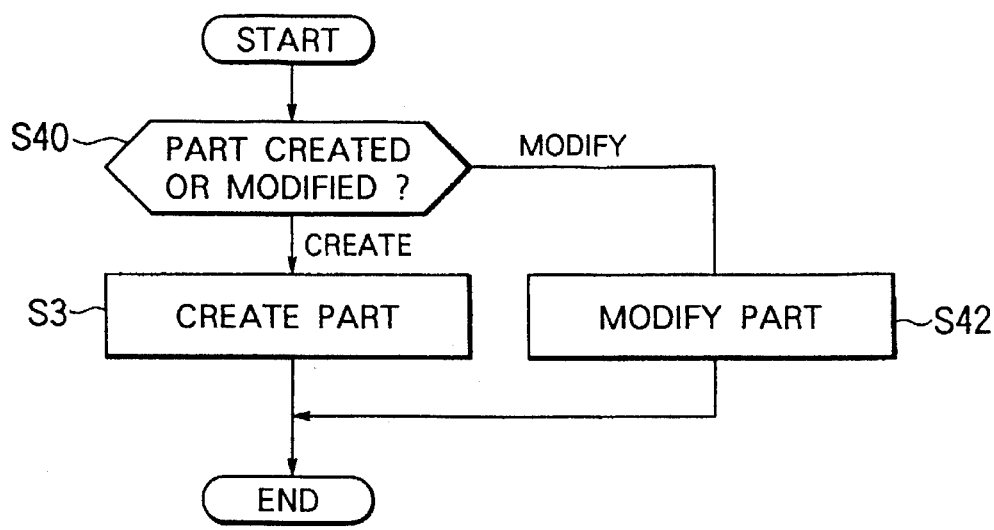
FIG. 31 is a diagram showing the process by which the rarefaction of the semantic information among the parts is resolved via abstraction.
FIG. 32 is a flowchart showing the part forming procedure including the steps for modifying existing parts.

FIG. 31 is a diagram showing the process by which the rarefaction of the semantic information among the parts is resolved via abstraction. The lists for the parts: brush, scissors, and trash box, before the construction (before read into the operational environment) are shown at the left. The corresponding list after the construction (after read into the operational environment and modified therein) are shown at the right.

Before the construciton (i.e., re-construction), the list for brush 165 includes a sublist consisting of an attribute key "use" 204 and the attribute value "write with brush" 166 corresponding thereto, which in turn is the first element of the sublist specifying: the attribute key "object" 206 and the attribute value "letters" 207 corresponding thereto; the attribute key "object" 208 and the attribute value "pictures" 209 corresponding thereto; and the attribute key "type face" 210 and the attribute value "written with brush" 211 corresponding thereto. After the construction, the list For brush 165 includes only one sublist consisting of an attribute key "use" 213 and the attribute value "write" 540 corresponding thereto.

Both before and after the construciton, the list for scissors 800 includes a sublist consisting of an attribute key "use" 542 and the attribute value "cut" 801 corresponding thereto, Before the construciton, the list for trash box 802 includes a sublist consisting of an attribute key "use" 216 and the attribute value "dispose" 803 corresponding thereto. After the construction, the list for trash box 802 includes a sublist consisting of an attribute key "use" 218 and the attribute value "remove" 804 corresponding thereto, If only the three parts whose information lists are shown in FIG. 31 are used simultaneously within an operational environment, the lists for brush 165 and trash box 802 are too specific. Thus, the meanings or functions of these parts are rendered more absract via the procedure of FIG. 28. Next a specific example of the procedure of FIG. 28 by which the function lists representing the semantic information of the parts are rendered more general and abstract is described by reference to FIGS. 29 and 30. It is assumed that only the three parts: the brush, the scissors, and the trash box whose semantic lists are shown in FIG. 31, are read into the operational environment.

First at step S25, correspondences between the meanings or realized functions of the parts and the semantic hierarchy of realized functions are established. Namely, the realized functions: write with brush 166, cut 801, and dispose 803 of brush 165, scissors 801, and trash box 802, respectively, are located in the semantic hierarcy of realized functions of FIG. 29.

Next at step S26, it is judged whether or not the realized functions located within the hierarcy tree of FIG. 28 correspond to a plurality of parts among those three parts read into the operational environment. In this case, the realized functions do not correspond to a plurality of parts. Thus, the execution proceeds step S28.

At step S28, the realized functions: write with brush 166, cut 801, and dispose 803, within the hierarcy tree of FIG. 29, which are correlated to the parts: brush 165, scissors 800, and trash box 802, respectively, of the lists of FIG. 31, are assigned to the variables n1i and ni.

Next at step S29, the parent realized functions: write 540, form 805, and remove 804, within the hierarcy tree of FIG. 29, of the respective realized functions: write with brush 166, cut 801, and dispose 803 currently assigned to the variable ni are assigned to the variable ni.

Further at step S30, respective child realized functions: write with black gothic 164, cut 801, and dispose 803, of the realized functions currently assigned to the variable ni are assigned to the variable ni. Where there are a plurality of of child realized functions for a parent realized function, as in the case of the realized function: write 540, a child realized function: write with gothic 164, is selected from among the children thereof.

At step S31, it is judged whether or not the realized functions assigned to the variable ni correspond to another part among the three read into the operational environment. In this case, the realized functions: write with black gothic 164, cut 801, and dispose 803, assigned to the variable ni have no other parts. Thus, the execution proceeds to step S33.

At step S33, it is judged whether or not the realized functions: write with black gothic 164, cut 801, and dispose 803, assigned to the variable ni are terminal realized functions in the hierarcy tree of FIG. 29. The judgment is affirmative in this case. Thus the execution proceeds to step S34.

At step S34, the parent realized functions: write 540, form 805, and remove 804 of the respective realized functions: write with black gothic 164, cut 801, and dispose 803 currently assigned to the variable ni are assigned to the variable ni.

At step S35, it is judged whether or not all the child realized functions of the respective realized functions assigned to the variable ni are processed. In this case, the judgement is negative at the first execution cycle. Thus, the execution returns to step S30, and the steps S30 through S35 are repeated.

In the above, the description has been made as if all the three parts are processed simultaneouly. However, the procedure of FIG. 28 is easier to understand if the parts are processed sequentially, one at a time. Thus, in the following desciption of the procedure of FIG. 28, which continues the above description, each part is discussed separately.

In the case of of the part brush 165, the steps S30 through S35 are repeated until finally all the child realized functions of the realized function write 540 are searched and tested. Then the execution proceeds to step 236 add thence to step S38 and step S39, where the variable n1i is assigned the realized function write 540 assigned to the variable ni. Upon examining the parts corresponding to the decendent realized functions of the parent realized function form 805 of the realized function write 540 at step S31, it is determined that the realized function cut 801 corresponds to another part scissors 800 appearing in the lists of FIG. 31. Thus, the execution proceeds to step S32, where the part brush 165 is correlated to the realized function write 540 assigned to the variable n1i at step S39, and the procedure of FIG. 28 for the part brush 165 is terminated.

In the case of scissors 800, the realized function cut 801 is assigned to the variables ni and n1i at step S28 during the first execution cycle of the procedure of FIG. 28. At step S29, the parent realized function form 805 of the realized function cut 801 currently assigned to the variable ni is assingned to the variable ni. Thus, in the execution cycle in which the child realized function write 540 is assinged to ni at step S30, it is determined at step S31 that the realized function write 540 assigned to variable ni corresponds to another part brush 165 appearing in the lists of FIG. 31. Thus, the judgment at step S31 is affirmative, and the execution proceeds to step S32, where the part scissors 800 is correlated to the realized function cut 801 assigned to the variable n1i at step S28, and the procedure of FIG. 28 for the part scissors 800 is terminated.

In the case of trash box 802, the realized function dispose 803 is assigned to the variables ni and n1i at step S28 during the first execution cycle of the procedure of FIG. 28. At step S29, the parent realized function remove 804 of the realized function dispose 803 currently assigned to the variable ni is assingned to the variable ni. Thereafter, the steps S31 through S35 are repeated. However, the decendent realized functions of the realized function remove 804, assigned to the variable ni at step S34 in each execution cycle, do not correspond to a part other than trash box appearing in the lists of FIG. 31. Thus, finally the execution proceeds to step S36 and thence to step S38 and step S39, where the realized function remove 804 is assigned to the variable n1i. Thereafter, the execution returns to step S34, to repeat the steps S30 through step S35. This time, however, the variable ni is assigned the root function processing 162 at step S34 in each execution cycle. Thus upon examining the decendent realized functions of the root realized function processing 162 at step S31, it is determined that the function assigned to the variable ni at step S30, namely, form 805, corresponds to the parts: brush 165 and scissors 800, appearing in the lists of FIG. 31. Thus, the judgment at step S31 becomes affirmative, and the execution proceeds to step S32, where the part trash box 802 is correlated to the realized function remove 804 assigned to the variable n1i at step S39, and the procedure of FIG. 28 for the part trash box 802 is terminated.

As a result of the above procedure of FIG. 28, the lists shown at the right in FIG. 31 for the respective parts are obtained.

FOURTH EMBODIMENT

Next, a fourth embodiment according to this invention is described by reference to FIGS. 32 through 34.

In the case of the above embodiments, the parts forming step S4 includes only the procedure by which parts are created. According to this fourth embodiment, the parts forming step step S4 includes steps by which existing parts are modified.

FIG. 32 is a flowchart showing the part forming procedure including the steps for modifying existing parts. First, at step S40, it is judged whether the part is created or modified. When the part is to be created, the execution proceeds to step S4, where the part is created (that is, formed anew). The step S4 is similar to step S4 in FIG. 4. On the other hand, if the part is to be modified, the execution proceeds to step S42, where the part is modified (that is, a already exsiting part is modified and updated).

Figure 33:
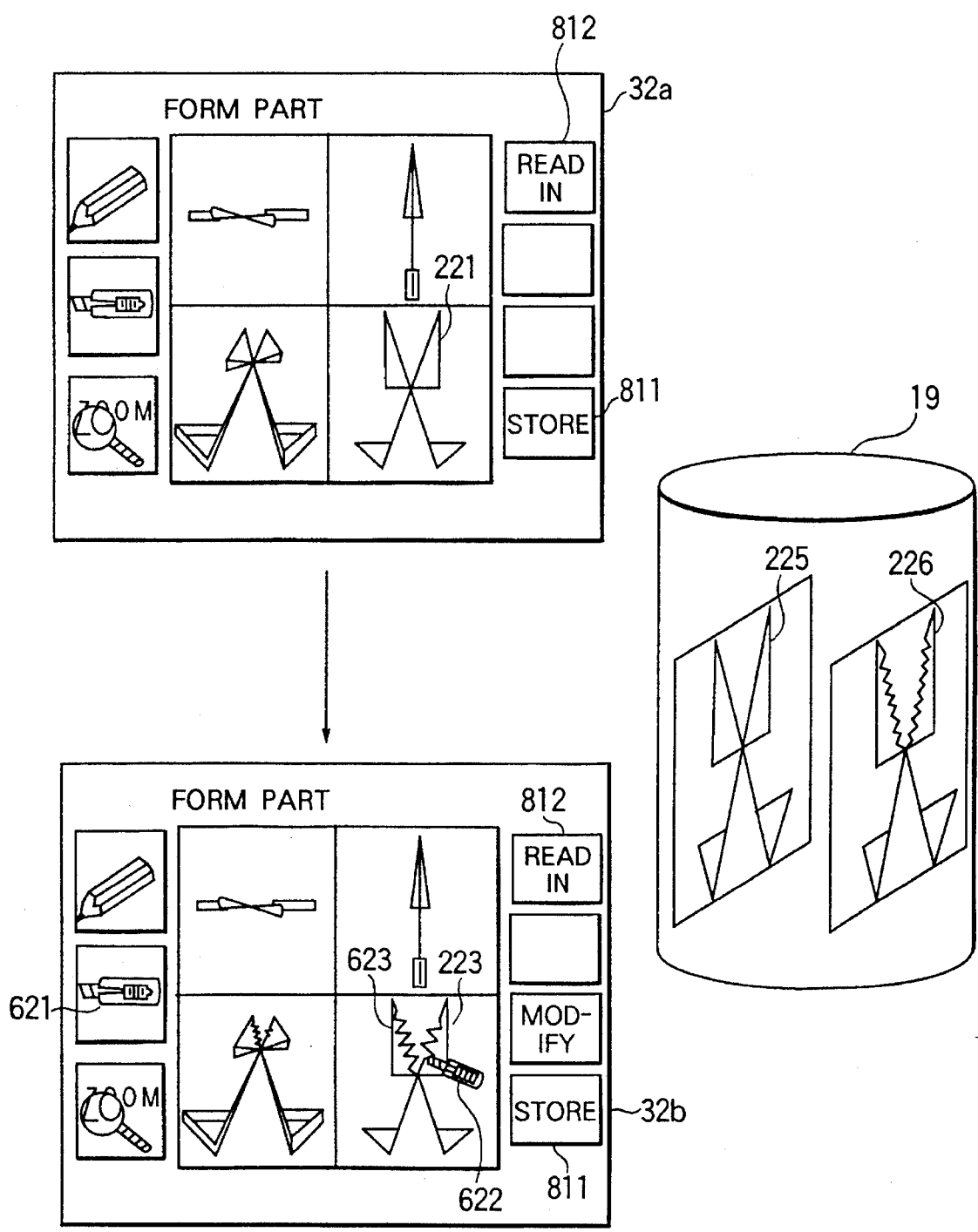
FIG. 33 is a diagram illustrating the part modification step of FIG. 32.

FIG. 33 is a diagram illustrating the part modification step of FIG. 32. The part forming window 32a before the modification step includes a pair of scissors 221. The part forming window 32b after the modification step includes a scissors 223. A storage icon 811 is used for storing the created or modified parts into the parts library 19.

The method of modification of the visual information of a part is as follows: First the exsisting pair of scissors 221 are stored into the parts library 19 as the scissors 225 by means of the storage icon 811. Next, by selecting the read-in (load) icon 812, the scissors 225 is read into the part forming window 32b. Further, the cutter icon 621 is selected to display and activate a cutter cursor 622. By moving the cutter cursor 622 at the edges of the scissors 223, edges 623 of the scissors 223 are cut into saw-tooth edges. Then, by selecting the storage icon 811, the scissors 223, whose visual information is thus modified, are stored into the parts library 19 as the scissors 226.

Figure 34:
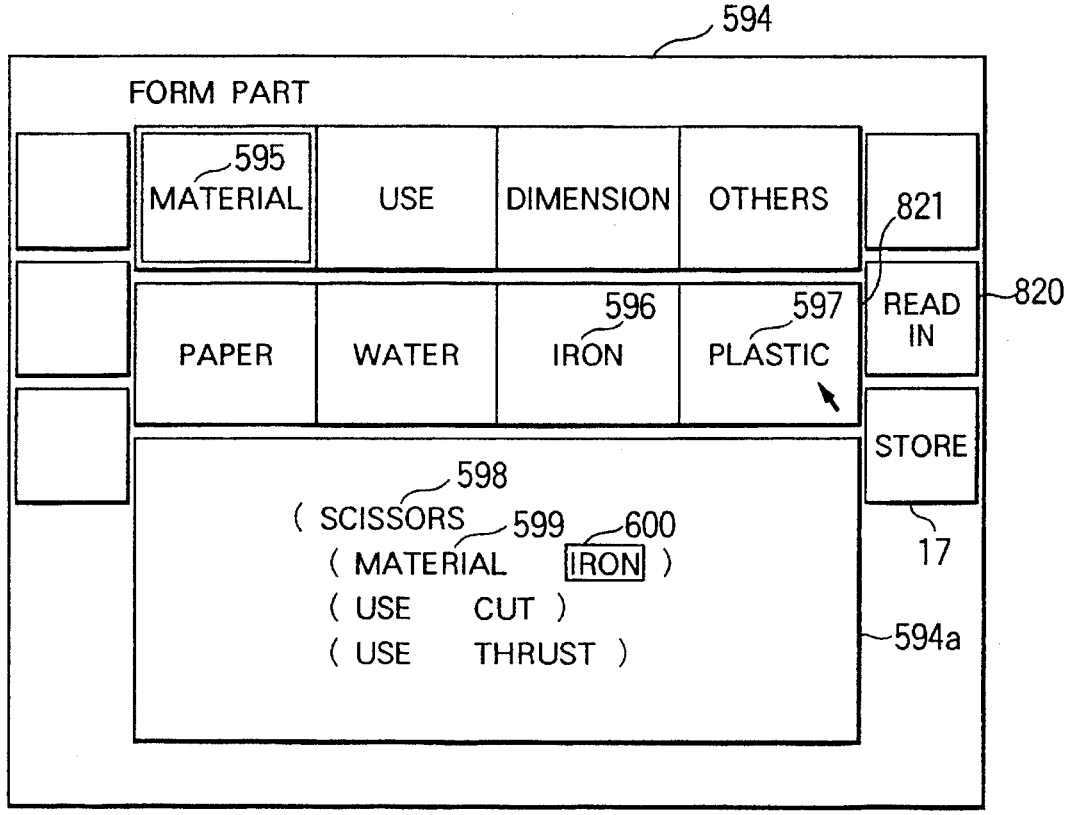
FIG. 34 is a diagram illustrating the part modification step by which the semantic information of parts is modified.

FIG. 34 is a diagram illustrating the part modification step by which the semantic information of parts is modified. The procedure is carried out by the semantic information forming means 29. The semantic information modification is effected via the semantic information forming window 594 including the semantic information forming block 594a, in which the semantic information of an existing part, such as a scissors 598, can be modified. The modification of the semantic information of the scissors 592, for example, stored in the parts library 19 is effected at the part modification step step S42 of FIG. 32 as follows.

The semantic information of the scissors 592 is stored in the parts library 19 together with the visual information thereof. By selecting the read-in icon 820, the semantic information of scissors 592 is read into the window 594, such that the list containing the semantic information of the scissors 598 is displayed in the part forming block 594a. The list for scissors 598 includes a sublist consisting of a attribute key material 599 and the attribute value iron corresponding thereto. If the material 599 of scissors 598 is to be changed, the attribute value iron 600 is selected. Upon selection of the attribute value iron 600, the attribute values corresponding to the attribute key material 599 for the selected attribute value iron 600 are displayed in the attribute display block 821. Among the displayed attribute values are, for example, iron 596 and plastic 597. The attribute key material 595 is displayed at the left top corner of the the block 821. If the material of scissors 598 is to be modified from iron to plastic, the attribute value plastic 597 is selected. As a result., the attribute value corresponding to the attribute key material 599 is modified to plastic 624. When the parts storing icon 17 is selected upon completion of the modification, the semantic information or the attribute list of the part scissors is stored in the parts library 19 as the modified scissors 593. The movement information of parts, implemented likewise as lists, can be modified in a similar manner.

By including the step for modifying the already existing parts, the procedure of forming necessary parts is facilitated and rendered more efficient.

FIFTH EMBODIMENT

Next, a fifth embodiment is described by reference to FIGS. 35 through 37. According to the above embodiments, the operational environment is constructed anew by reading in and combining the parts at the operational environment constructing step step S7 of FIG. 4. The user interface device according to this embodiment includes, in addition to the operational environment constructing step by which the operational environment is created, the operational environment modification steps by which the operational environment is modifed by adding and deleting parts to the exisiting operational environments.

Figure 35:
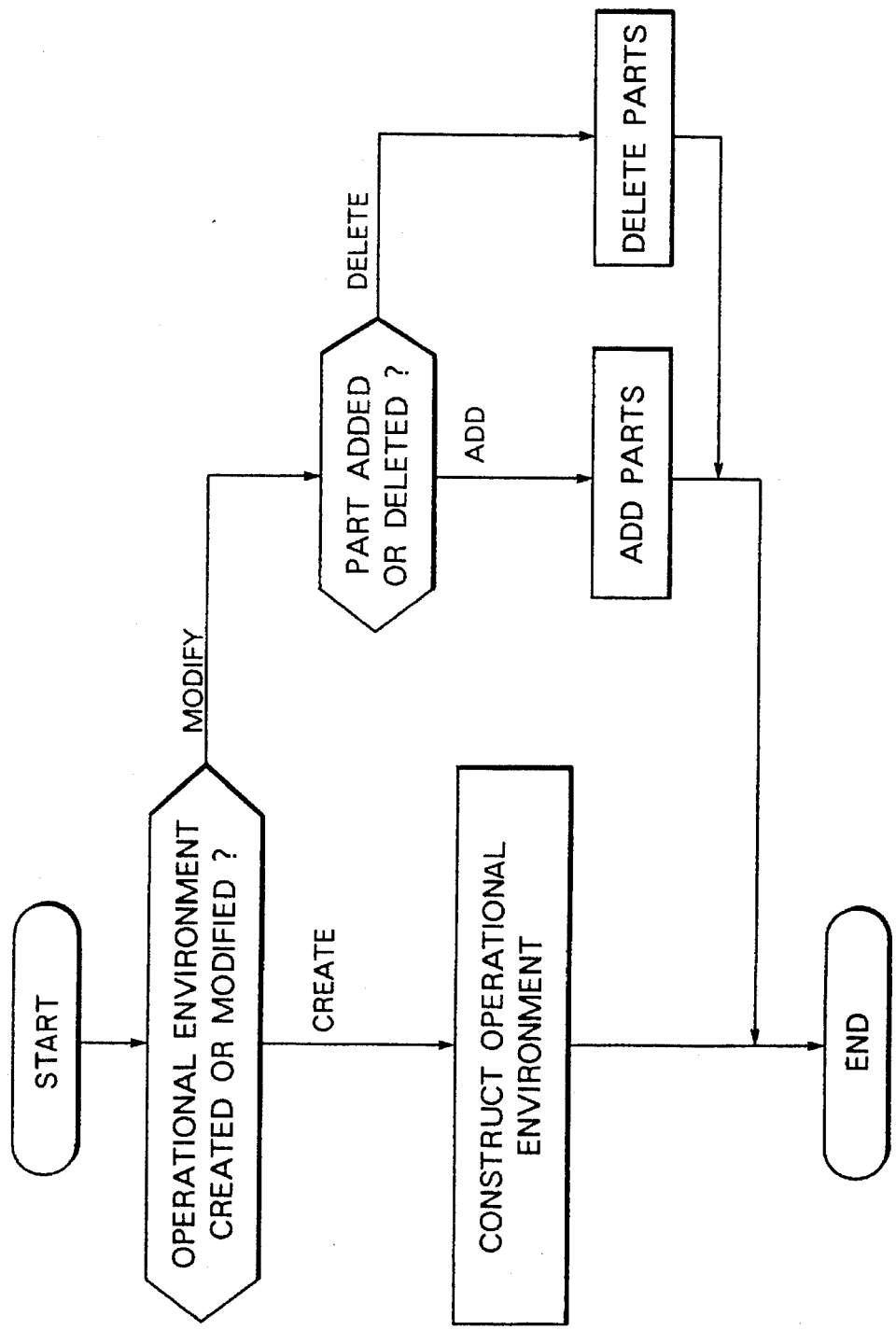
FIG. 35 is a flowchart showing the operational environment construting procedure including the steps for modifying already existing operational environments.

FIG. 35 is a flowchart showing the operational environment construting procedure including the steps for modifying already existing operational environments. At step S43, it is judged whether the operational environment is created or modified. If the operational environment is to be created (that is, constructed anew), the execution proceeds to step S7, where the operational environment is constructed anew. The step S7 of FIG. 35 is similar to step S7 of FIG. 4. If it is determined at step S43 that an already exsisting operational environment is to be modified, the execution proceeds to step S45, where it is judged whether parts are added or deleted from the operational environment. If the parts are to be added, the execution proceeds to step S46, where parts are added. If the parts are to be deleted, the execution proceeds to step S47, where parts are deleted.

Figure 36:
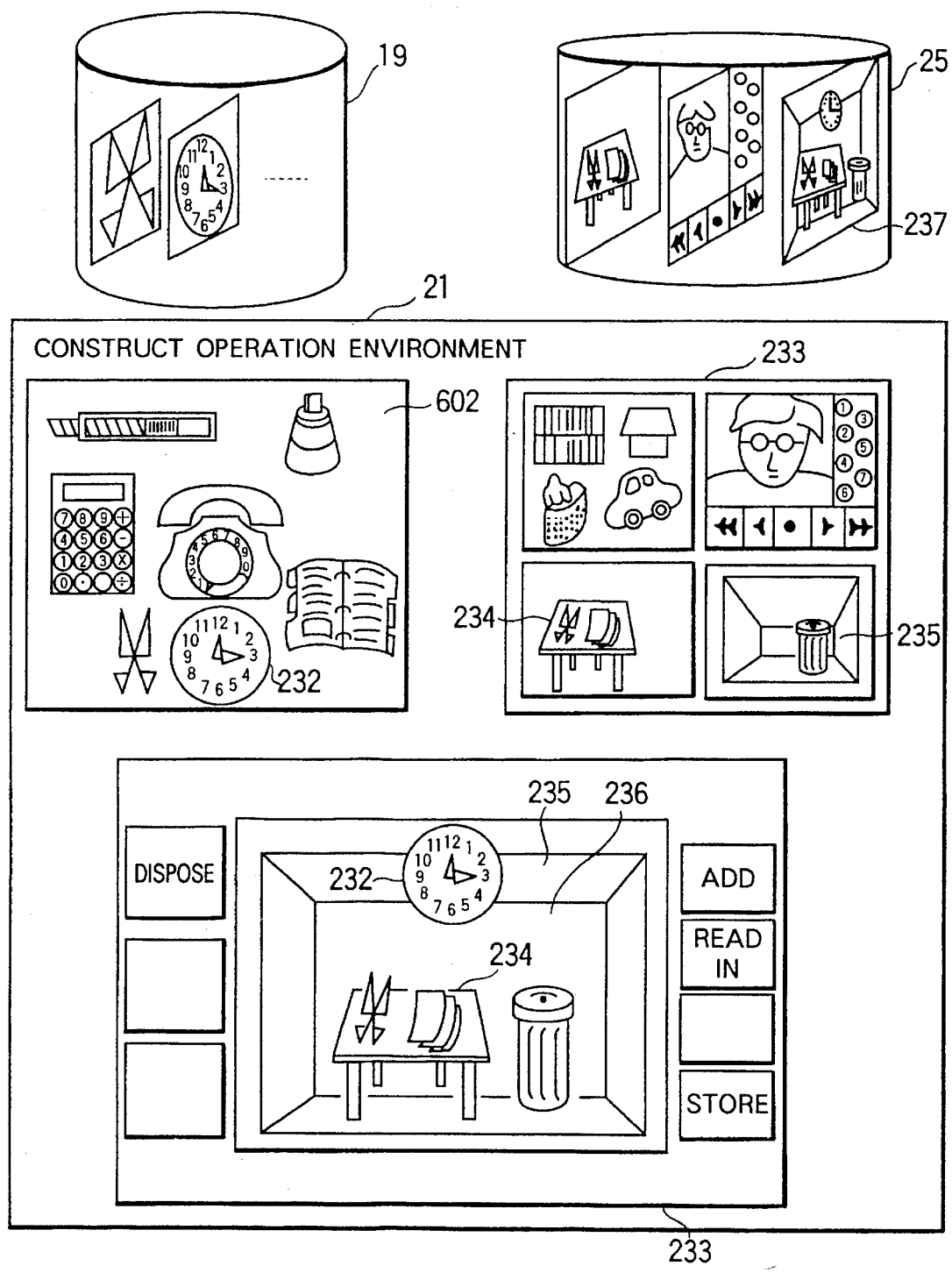
FIG. 36 is a diagram illustrating the parts adding step of FIG. 35.

FIG. 36 is a diagram illustrating the parts adding step of FIG. 35. The parts library 19 stores information on parts. The operational environment database 25 stores constructed operational environments, such as office 237. The operational environment constructing window 21, displayed during the operational environment constructing and modifying procedure, includes: an operational environment display block 233 for displaying the operational environments, such as the desktop 234 and the room 235, read out from the operational environment database 25; a parts display block 602 for displaying the parts, such as a clock 232, read out from the parts library 19; and operational environment display block 233 displaying the operational environment under modification.

Next, the details of the part adding step step S46 of FIG. 35 is described by reference to FIG. 36. The parts to be added, such as clock 23Z, are loaded from the parts library 19 into the parts display block 602. Further, the operational environments such as the desktop 234 and the room 235 are loaded from the operational environment database 25 into the operational environment display block 233. Then the desktop 234 and the room 235 are selected in the block 233 such that composite operational environment, office 236, consisting of the desktop 234 and the room 235 is displayed is the operational environment constructing block 233. Next, the clock 232, for example, is selected in the block 602, such that the clock 232 is added to the operational environment. Further, the operational environment office 236 is constructed by describing the relations between the operational environment and the parts within the operational environment constructing block 233. After the relations between the parts and the operational environment and the relations among the parts are re-constructed, the operational environment office 236 is stored in the operational environment database 25 as the office 237.

Figure 37:
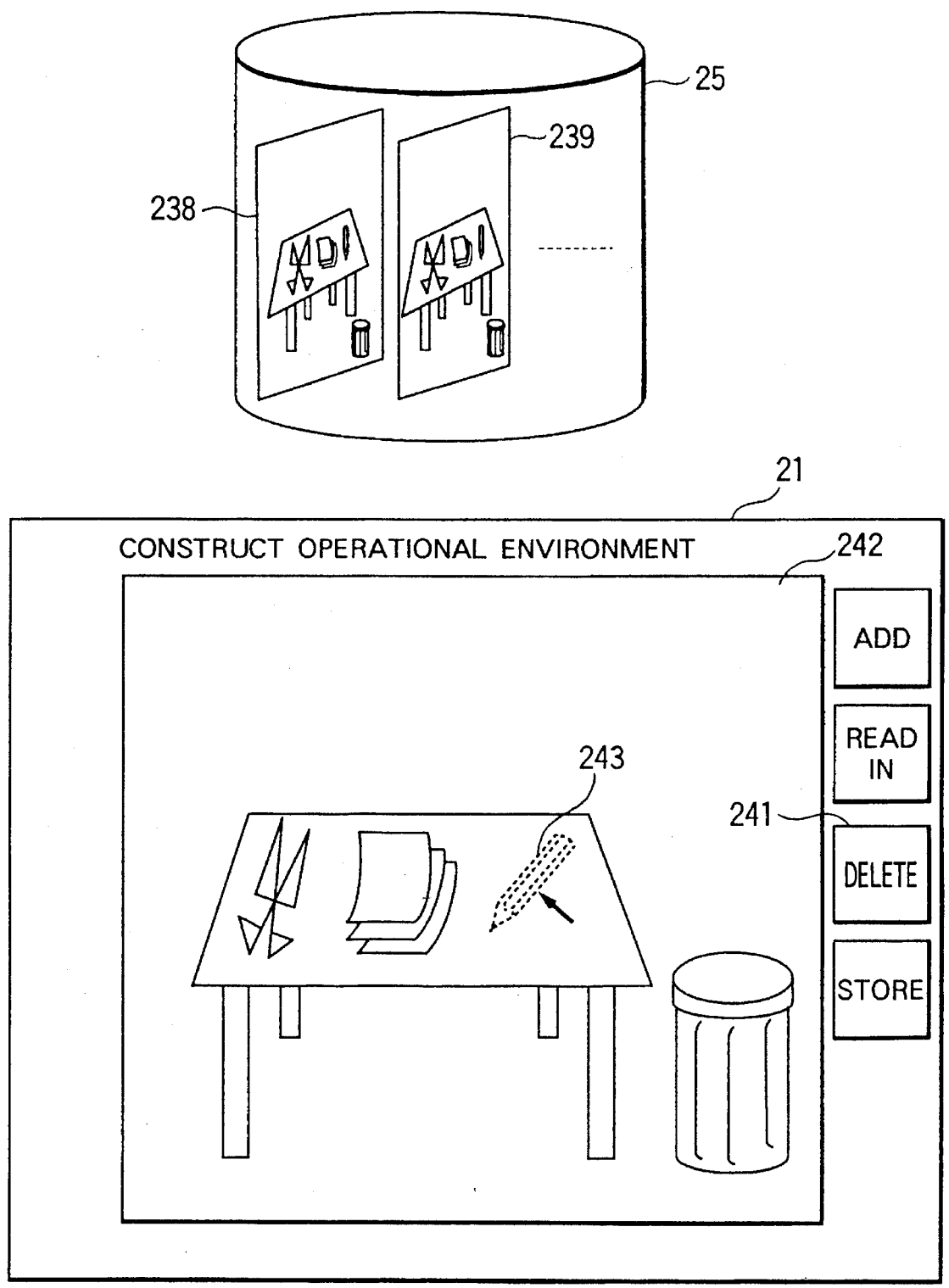
FIG. 37 is a diagram illustrating the parts deleting step of FIG. 35.

FIG. 37 is a diagram illustrating the parts deleting step of FIG. 35. The operational environment database 25 stores the operational environments such as office 238 before the deletion step and office 239 after the deletion step. The operational environment constructing window 21 displays the operational environment of the operational environment constructing means 500. The operational environment office 242 under modifiation is displayed in the operational environment constructing window 21. The part pencil 243 is to be deleted from the office 242 by means of the parts deleting icon 241.

Next, the parts deleting step step S47 of FIG. 85 is described by reference to FIG. 37. First, the operational environment office 238 to be modified is loaded from the operational environment database 25 into the operational environment constructing window 21 of the operational environment constructing means 500. Then, after selecting the parts deleting icon 241, the part pencil 243 to be deleted from the operational environment office 242is designated by means of the cursor. Pencil 243 is thus deleted from office 242. After reconstructing the relations between the parts and the operational environment and the relations among the parts, the modified office 242 is stored in the operational environment database 25 as the office 239.

As described above, according to this embodiment, already existing operational environments can be re-used to construct new operational environments. Thus, the construction of the operational environments is facilitated and rendered more efficient.

SIXTH EMBODIMENT

Next, a sixth embodiment is described by reference to FIGS. 38 through 41. According to this sixth embodiment, the operational environments and parts are arranged in hierarcy structures by the operational environment constructing means 500.

Figure 38:
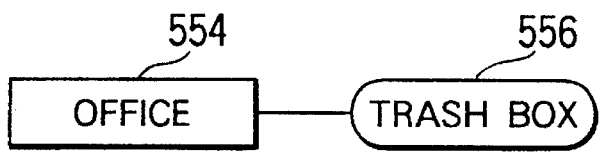
Figure 38:
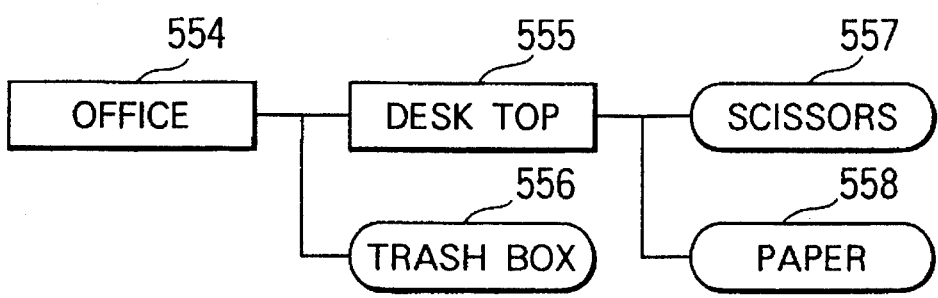
Figure 38:
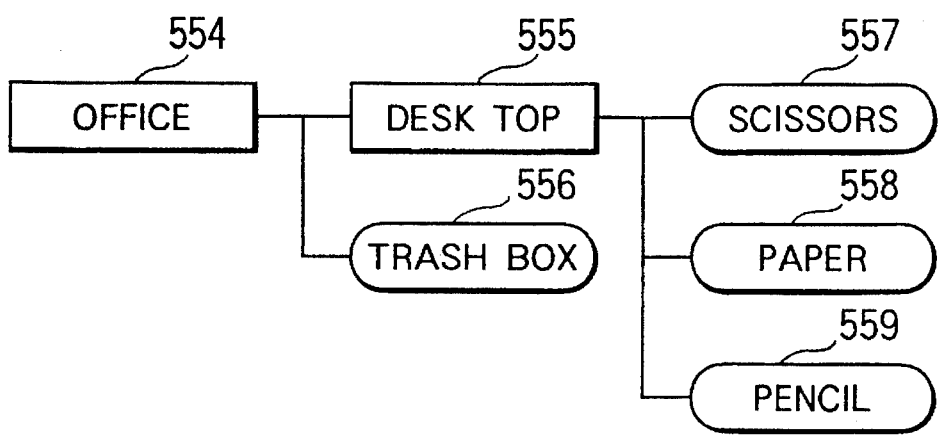

The procedure of adding child operational environments and parts is described by reference to FIGS. 38 and 39. FIG. 38 is a diagram showing hierarcy structures of operational environments, wherein FIG. 38a shows the hierarcy structure of the operational environment before a child operational environment is added; FIG. 38b shows the hierarcy structure of the operational environment after the addition of a child operational environment; and FIG. 38c shows the hierarcy structure of the operational environment after further addition of child parts. In FIG. 38, the operational environments are represented by rectangular boxes, while the parts are represented by rounded boxes. FIG. 39 is a diagram showing the screen images corresponding to the hierarcy structures of FIG. 38.

First, the operational environment office 554 only having a trash box 556 is read into the operational environment constructing block by means of the operational environment constructing means 500. The resulting screen image is shown at the top in FIG. 39. The hierarcy structure of the operational environment is shown in FIG. 38a.

Next, the operational environment, desktop 555, having the parts: scissors 557 and paper 558 as children or siblings thereof, is read into office 554 as shown at the middle in FIG. 39. As a result, the desktop 555 is mounted to the office 554 as shown in FIG. 38b. The sibling parts of the desktop 555, namely, scissors 557 and paper 558 are thus automatically mounted to the office 554 via the desktop 555.

Further, by placing pencil 559 upon the desktop 555 as shown at the bottom in FIG. 39, the pencil is mounted to the desktop 555 as shown in FIG. 38c.

Figure 40:
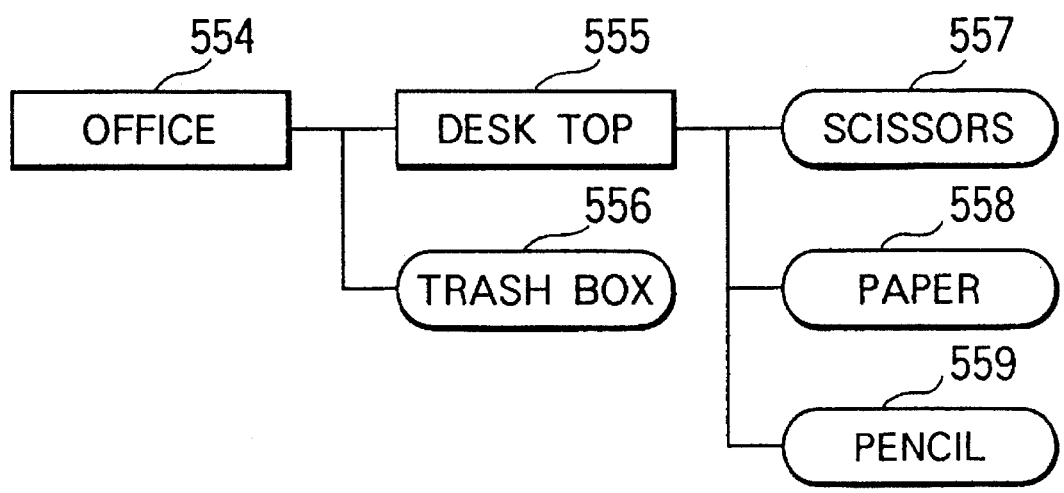
Figure 40:
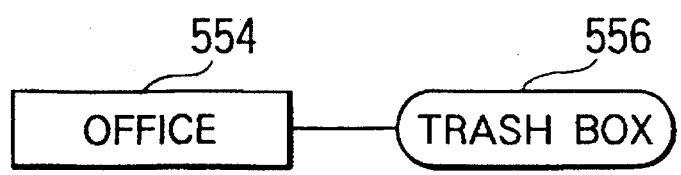
Figure 41:
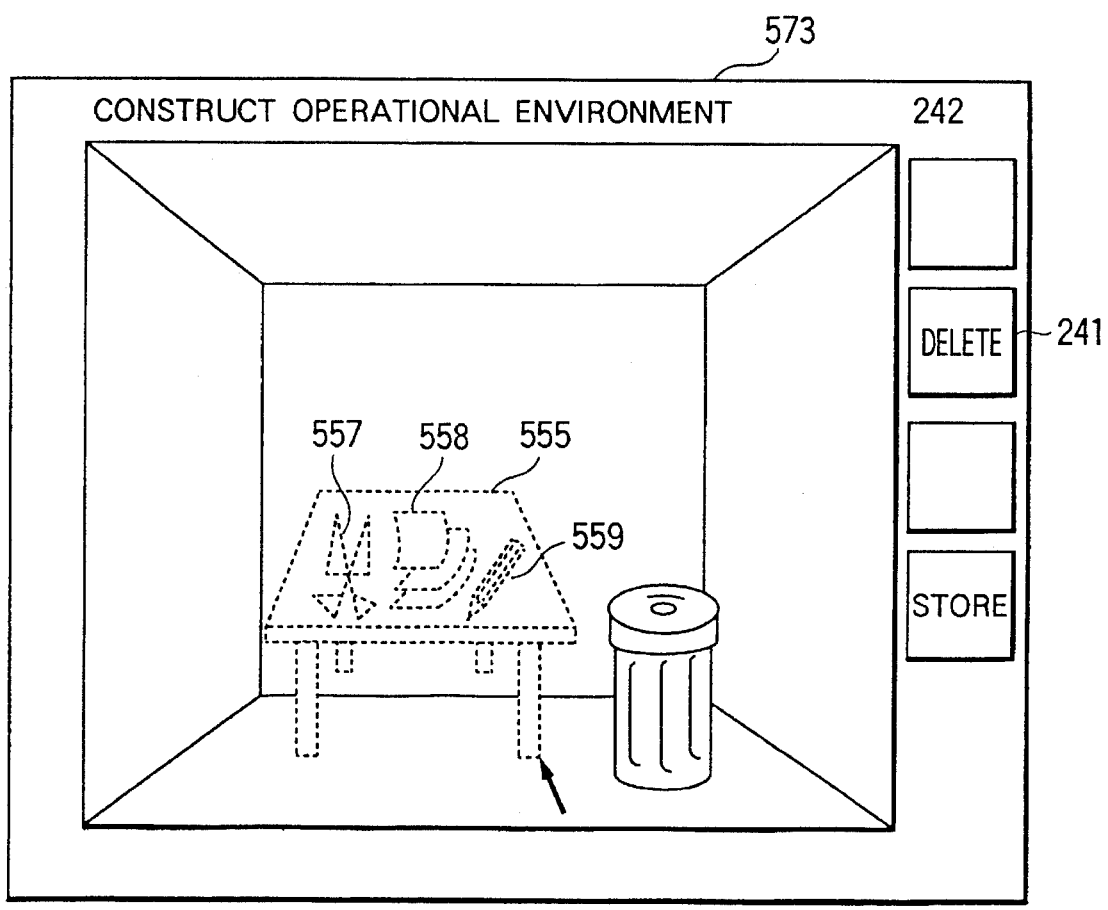
FIG. 41 is a diagram showing the screen images corresponding to the hierarcy structures of FIG. 38.

Next, the process of removing the operational environments and parts from the hierarcy structure is described by reference to FIGS. 40 and 41. FIG. 40 is a diagram showing hierarcy structures of operational environments, wherein FIG. 40a shows the hierarcy structure of the operational environment before a child operational environment is deleted; and FIG. 40b shows the hierarcy structure of the operational environment after the deletion of a child operational environment. FIG. 41 is a diagram showing the screen images corresponding to the hierarcy structures of FIG. 38.

As shown in FIG. 40a, before the deletion procedure, the operational environment office 554 at the root of the hierarcy tree structure has a child operational environment desktop 555 and a child part trash box 556. Further, the operational environment desktop 555 has child parts, scissors 557, paper 558, and pencil 559. First, the office 554 having the hierarcy structure of FIG. 40a is read into the operational environment constructing window 573 of FIG. 41. Then, by selecting the parts deleting icon 241 on the operational environment constructing window 573 and then designating (i.e., pointing by a mouse cursor) the desktop 555, the desktop 555 is deleted from office 554. Upon deletion of the desktop 555, the child parts thereof, scissors 557, paper 558, and pencil 559, are deleted together therewith.

SEVENTH EMBODIMENT

FIGS. 42 through 59 are diagrams for explaining the operational environment using means 15. According to this seventh embodiment, the operational environment using means 15 includes: a means for storing the operation history of the user; a means for storing the information on the user; a means for analysing the intention of the user; a means for automatically adapting the operational environment to the user; a means for storing the task information; a means for generating the movement of the parts; a means for executing the functions utilised by the user; and a means for managing the operational environment.

Figure 42:
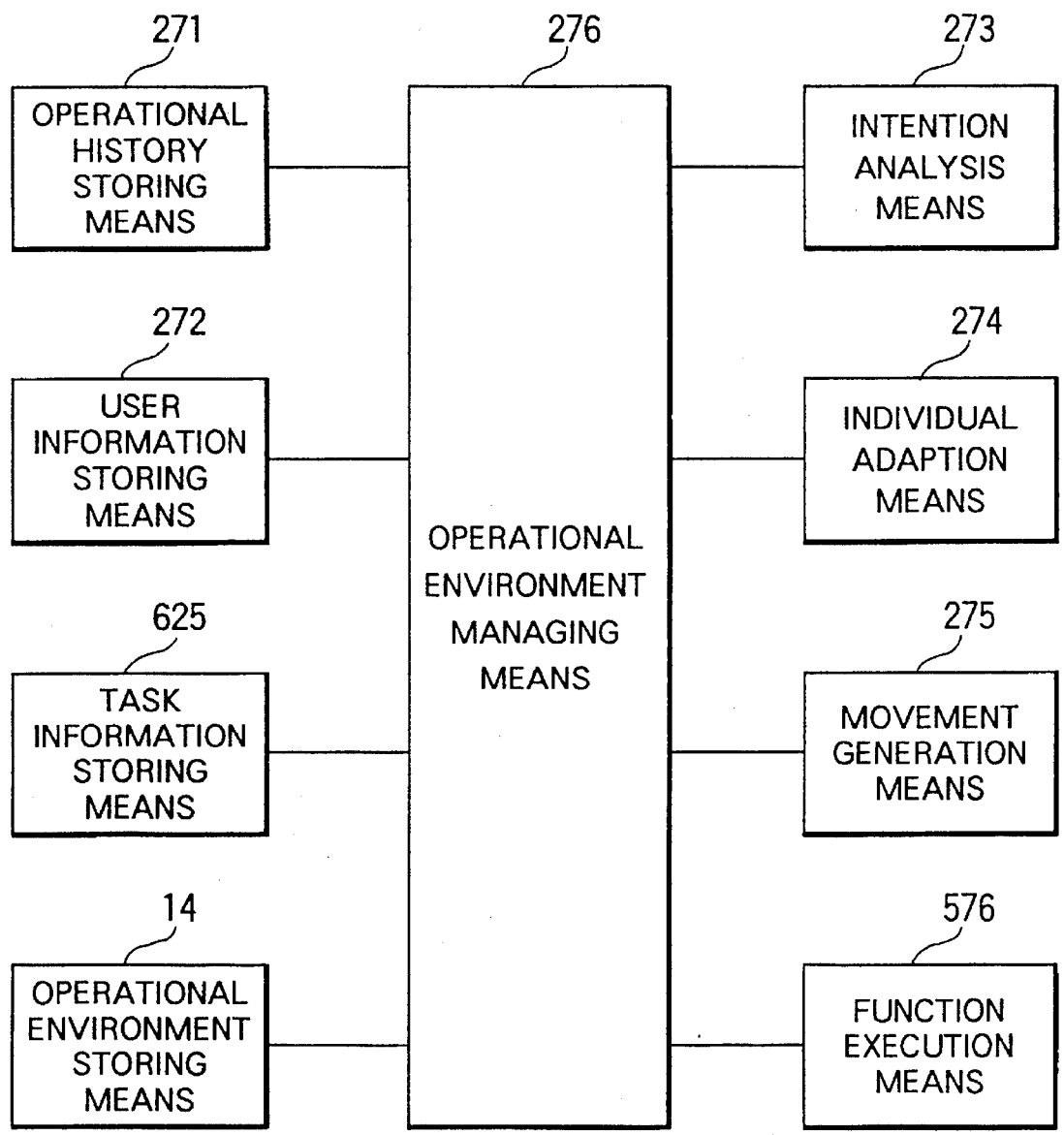
FIG. 42 is a block diagram showing the structure of the operational environment using means 15.

FIG. 42 is a block diagram showing the structure of the operational environment using means 15. Operation history storing means 271 stores the operation history of the user. User information storing means stores the information on the user. Task information storing means 625 stores the task information, i.e., the meanings and the procedures of the tasks of application programs. Intention analysis means 273 analyzes the intention of the user. Individual adaptation means 274 automatically adapts the operational environment to the individual user. A movement generation means 275 generates the movements of the parts within the operational environment. A function execution means 576 executes the functions of applications. The operational environment storing means 14, located outside operational environment using means 15, stores the operational environments. A operational environment managing means 276 correlates the functions of applications to the parts of the operational environment, controls the respective means within the operational environment using means 15, and thereby manages the operational environment.

Figure 43:
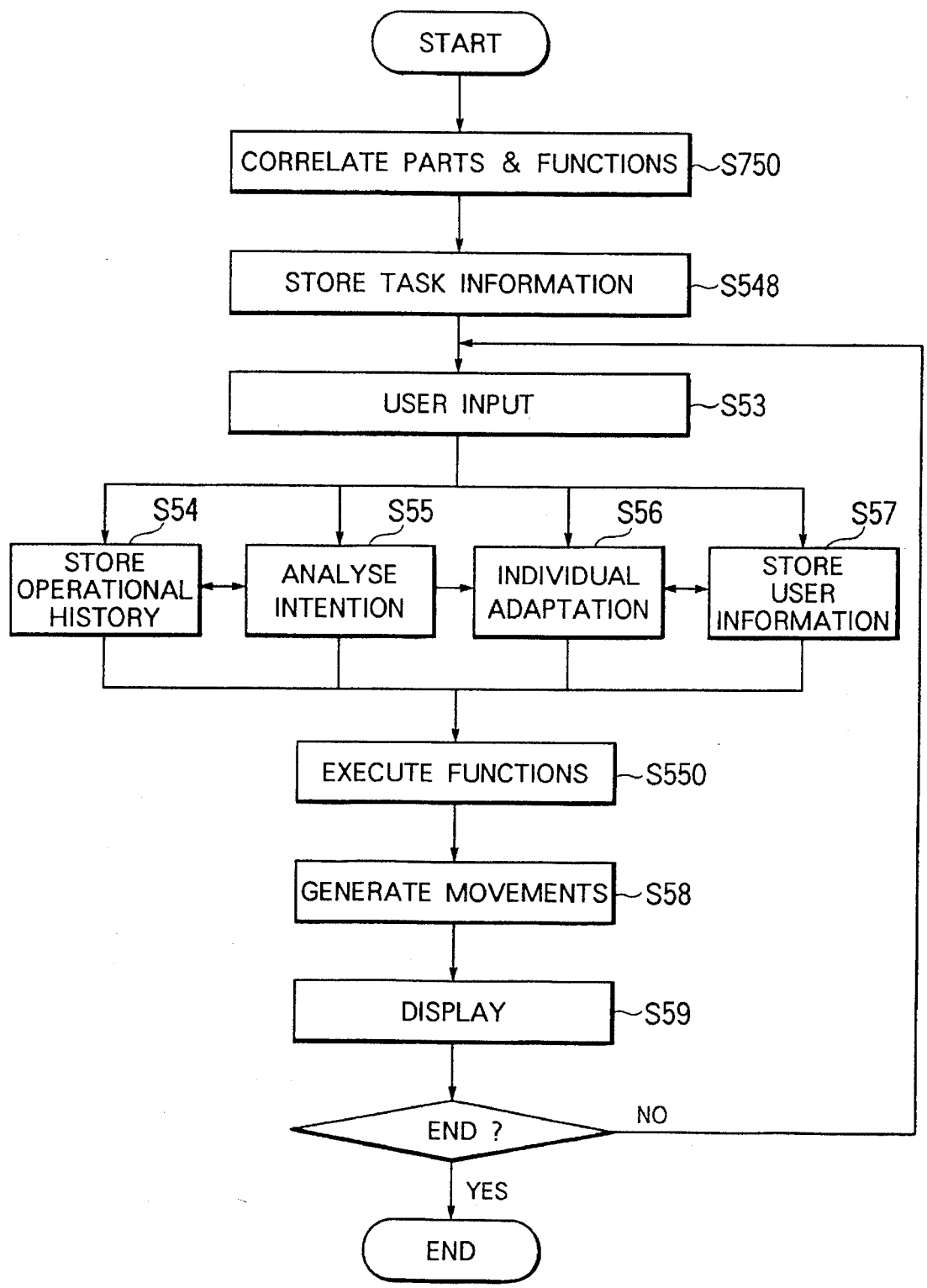
FIG. 43 is a flowchart showing the details of the operational environment utilization step step S10 of FIG. 4 according to the seventh embodiment.

FIG. 43 is a flowchart showing the details of the operational environment utilization step step S10 of FIG. 4 according to the seventh embodiment. First at step S750, correspondences are established between the parts and the realized functions in the operational environment. Namely, the parts are correlated to the realized functions of an application in the operational environment. At the next step S548, the information oil the meanings and procedures of the tasks performed by the user of the operational environment is stored. At step S53, the input information of the user of the operational environment is read (loaded) into the operational environment managing means 276.

After step S53, the execution proceeds to steps S54, S55, S56, and S57. At step S54, the input information of the user loaded in at step S53 is stored in the operation history storing means 271. At step S55, the input of the user read in at step S53 is analyzed and the intention of the user is inferred. At step S56, the functions are adapted to the intention of the individual user analyzed at step S55. At step S57, the input information of the user read in at step 253, the intention of the user analyzed at step S55, and the individual information adapted to the user at step S56 are stored in the user information storing means 272.

After the steps S54, S55, S56, and S57, the execution proceeds to step S550, where the functions of the application inferred at step S55 and adapted to the user at step S56 are executed. Next at step S58, the function of the application inferred at step S55 and the function of the application adapted to the user at step S56 are transformed into an animation or a moving image. At step S59, the animation or a moving image generated at step S58 is displayed. Finally, it is judged whether or not the operational environment utilization is terminated or not. If the judgment is affirmative, the procedure is terminated. Otherwise, the execution returns to step S53 to repeat the steps S53 through step S59.

Next the correlation step step S750 is described in detail by reference to FIGS. 44 through 47.

Figure 44:
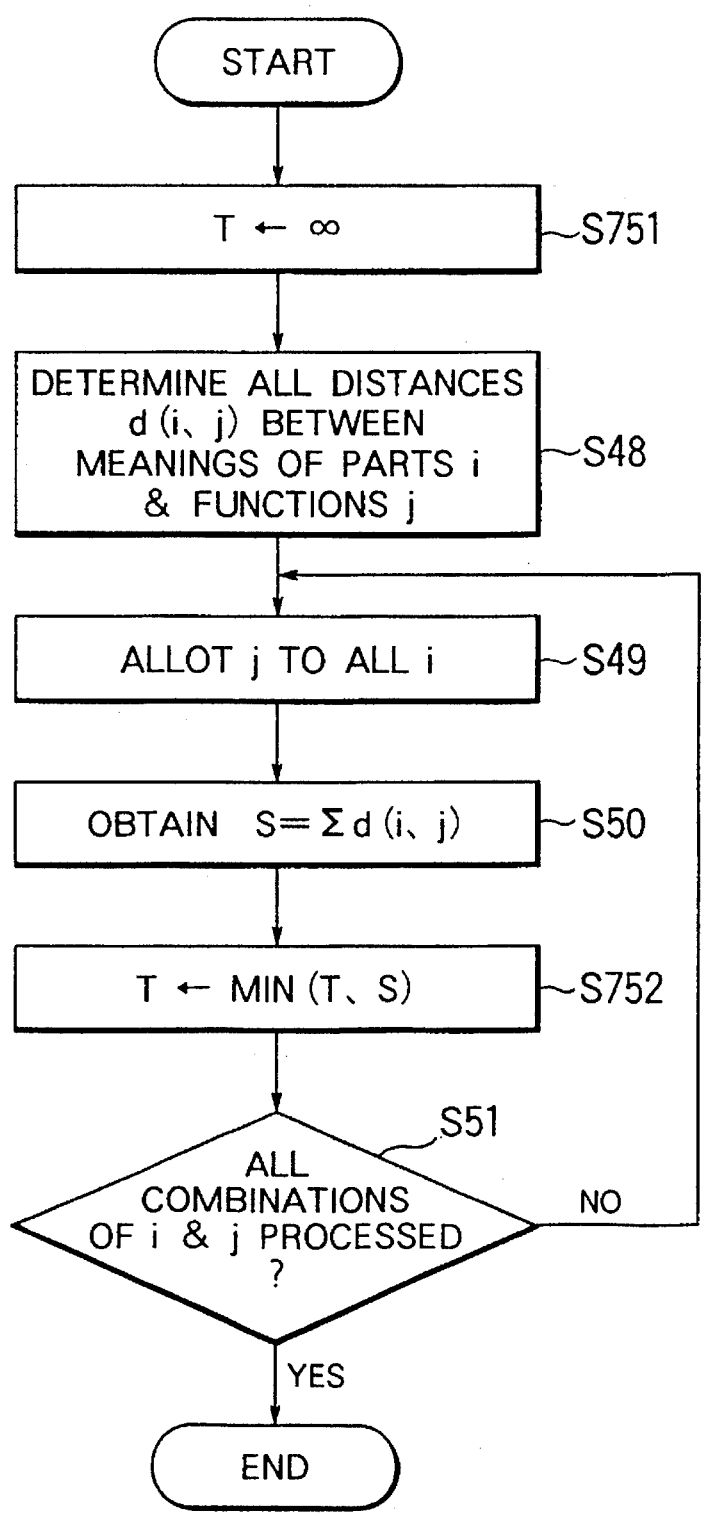
FIG. 44 is a flowchart showing the details of the correlation step S750 of FIG. 43.

FIG. 44 is a flowchart showing the details of the correlation step S750 of FIG. 43. At step S751, the infinity (∞) is assigned to the variable T. Next at step S48, the distances: d(i, j) between parts i and realized functions j are determined for all combinations of parts i and the realized functions j. Next at step S49, realized functions j are allotted to all the parts i, one realized function being allotted to each one of the part. At step S50, the sum S=Σd(i, j) of the distances d(i, j) between the parts i and the realized function j is calcualted, where i and j ranges over all the values of i and j allotted at step S49. Next at step S752, the smaller of the two values T and S, namely, movement information (T, S), is assigned to be variable T. Next at step S51, it is judged whether or net all the combinations between the parts i and the realized function j have been processed. If the judgement is negative, the execution returns to step S49 to repeat the steps S49 through S51. Finally, when the judgment is affirmative at step S51, namely, when all the combinations of the parts and functions are processed, the procedure is terminated. As a result of the procedure of FIG. 44, the combination of the parts i and realized function j for minimizing the sum S=Σd(i, j) of the distances d(i, j) therebetween is obtained. This combination for minimizing the sum of the distances establishes correlation or correspondence between teh parts i and the realized function j. Thus, the correlation between the operational environment and application is established.

Next, the procedure of FIG. 44 is described in detail by reference to FIGS. 44 through 47.

FIG. 45 is an enlarged diagram showing a portion of the semantic hierarcy structure of the meanings of parts and the realized functions as shown in FIG. 29. A portion of the tree structure of FIG. 29 is shown enlarged for clarity. The realized function write 540 has, for example, a child realized function write with brush 166, which in its turn has a child part brush 165.

The distance d(i, j) between a part i and a realized function j is determined by the number of links or branches which must be traversed to reach from the part i to the realized function j. Thus, the distance between the part brush 165 and the realized function write 540 is two (2), since, in order to reach to write 540 from brush 165, two links or branches, namely, the branch between brush 165 and write with brush 166 and the branch between write with brush 166 and write 540; must be traversed.

FIG. 46a is a table showing the correlation or correspondence between the functions of an application and the parts. It is assumed that the application program includes three functions: write 251, delete 251, and calculate 253. FIG. 46a shows that to functions of application: write 251, delete 251, and calculate 253, there correspond the parts: fountain pen 254, eraser 255, and electronic calculator 256, respectively, of the operational environment.

FIG. 46b is a table showing the correspondence between combinations of the functions of application and the parts (shown at the left column) and the sum of distances corresponding thereto (shown at the right column). The numbers enclosed in parentheses after part/function pair are the distances therebetween. For example, the distance between write and fountain pen in the first line 259 of the table is two (2), as determined from the semantic hierarcy tree of FIG. 45. Thus, to the combination 259 consisting of: write-fountain pen, delete-eraser, and calculate-calculator, the respective distances d(i, j) are: two (2), three (3), and two (2), respectively. Hence the sum of distances S=Σd(i, j) is equal to seven (7) as shown at 260. Similarly, to the combination 261 consisting of: write-eraser, delete-calculator, and calculate-fountain pen, the respective distances d(i, j) are: four (4), four (4), and four (4), respectively. Hence the sum of distances S=Σd(i, j) is equal to twelve (12) as shown at 262.

The number of the combinations of three realized functions and three parts is six (6), as illustrated in FIG. 45b. The procedure of FIG. 44 calculates the sum S of the distances d(i, j) for all the six combinations, compares the values of the sum S for six combinations, and then determines the combination which minimizes the value of the sum S. According to the definition of the distances between the parts and the functions, the combination of the parts and the functions having the closest semantic relations therebetween minimizes the sum S of the distances. For example, in the case shown in FIG. 46b, the combination 259 at the first line: write-fountain pen (2), delete-eraser (3), and calculate-calculator (2), with a total distance of seven (7), is the minimizing combination. This means that this combination or correlation between the parts and the functions is optimal and the most appropriate.

FIG. 47 is a diagram showing the distances between the parts and the functions of an application. In FIG. 47, the distance between the fountan pen 626 and write 625 is represented by d(fountain pen, write) 710, where i=fountain pen and j=write. Likewsise, the distance between the fountan pen 626 and delete 627 is represented by d(fountain pen, delete) 711. The distance between the eraser 628 and write 625 is represented by d(eraser, write) 712. The distances are determined as described above by reference to the semantic hierarcy structure of FIG. 45 or FIG. 29. In FIG. 47 the numbers of the parts and the functions are three. Thus, each one of the parts may be paired with one of three realized functions, and each one of the realized functions may be paired with one of three parts. At step S48 in FIG. 44, all the distances, as represented by connecting lines in FIG. 47, are determined. Thus the total number of distances to be determined is nine (9) for the case shown in FIG. 47.

Next, the desciption of the procedure of FIG. 44 is expatiated upon by reference to the specific example shown in FIGS. 46a, 46b, and 47.

At step S751, the infinity (∞) is assigned to the variable T. Next at step S48, the distances d(i, j) between parts i and realized functions j are determined for all combinations of parts i and the realized functions j. This step has already been described above by reference to FIG. 47, etc. Thus, a total of nine distance are determined as shown in FIG. 47. For example, the distance d(fountain pen, write) 710 between fountain pen 626 and write 625, is determined as two by reference to the hierarcy tree of FIG. 45. The distance d(fouuntain pen, delete) 711 between fountain pen 626 and delete 627, or the distance d(eraser, write) 712 between eraser 628 and write 625, are determined by reference to the hierarcy structure shown in FIG. 29. (The distances as determined by the hierarcy structure represented in FIG. 29 are different from those shown in FIG. 46*b*. For explanation's sake, however, the distances shown in FIG. 46*b* are assumed to be correct in what follows.)

Next at step S49, realized functions j are allotted to all the parts i, one realized function being allotted to each one of the parts. Namely, one of the combinations of the parts and the realized functions, as represented by each line of the table of FIG. 46*b* is selected. For example, the combination 259: write-fountain pen, delete-eraser, and calculate-calculator, is chosen.

At step S50, the sum $S=\Sigma d(i, j)$ of the distances $d(i, j)$ between the parts i and the realized function j is calculated, where i and j ranges over all the values of i and j allotted at step S49. Namely, in the case where the combination. 259 is selected at step S49, the sum is taken over the part/function pairs of: write-fountain pen, delete-eraser, and calculate-calculator, the corresponding distances being two, three, and two, respectively. Thus, the sum S is calculated as seven (7). On the other hand, in the case where the combination 261 is selected at step S49, the sum is taken over the part/function pairs of: write-eraser, delete-calculator, and calculate-fountain pen, where the respective distances are all equal to four. Hence the sum of distances is equal to twelve.

Next at step S752, the smaller of the two values T and S, namely, movement information(T, S), is assigned to the variable T. Thus, in the first execution cycle, the value of S as obtained at the preceding step S50 is assigned to the variable T, since T is assigned an infinity at the preceding step S751. In the subsequent execution cycles the smaller of the values of T and S are assigned to T. For example, if T and S are currently assigned seven (7) and twelve (12), respectively, T is assigned seven (7). Thus, T holds the smallest of the values of the sum S that have hitherto been calculated.

Next at step S51, it is judged whether or not all the combinations between the parts i and the realized function j have been processed. If the judgement is negative, the execution returns to step S49 to repeat the steps S49 through S51. Namely, in the case shown in FIG. 46*b*, it is judged whether or not all the lines of the table have been processed. When all the combinations have been processed via the steps of S49 through S752, the variable T holds the minimum, in this case, seven (7), of the sum S of the distances d(i, j), and the minimizing combination 259 of the parts and the functions is selected. An optimal correlation between the parts and the realized functions of the application: write-fountain pen, delete-eraser, and calculate-calculator, is thereby established.

In the case of the procedure of FIG. 44, the process of correlating the parts and realized functions after the step S48 is effected in accordance with the method by which the combination of the parts and realized functions minimizing the sum of the distances between the parts and realized functions is determined. Alternatively, however, the correlation may be established as follows. First a part i is fixed, and a realized function which minimizes the distance d(i, j) therebetween is selected. Then, a second part i is fixed, and a realized function is selected from among the remaining realized functions, which minimizes the distance d(i, j) therebetween. The process is continued until all the parts are correlated to the realized functions.

As described above, the distances between the parts and the realized functions of an application are determined on the basis of the semantic hierarcy structure as shown in FIG. 29. Further, the parts and the realized functions are correlated to each other in such a way that the sum of the semantic distances therebetween is minimized. Thus, the functions are correlated to and represented by the parts which are semantically and intuitively closely related thereto. Thus an easy-to-use operational environment is provided for the user. Further, the correlation is established automatically, thereby saving user's time and labor in settin up the operational environment.

Figure 48:
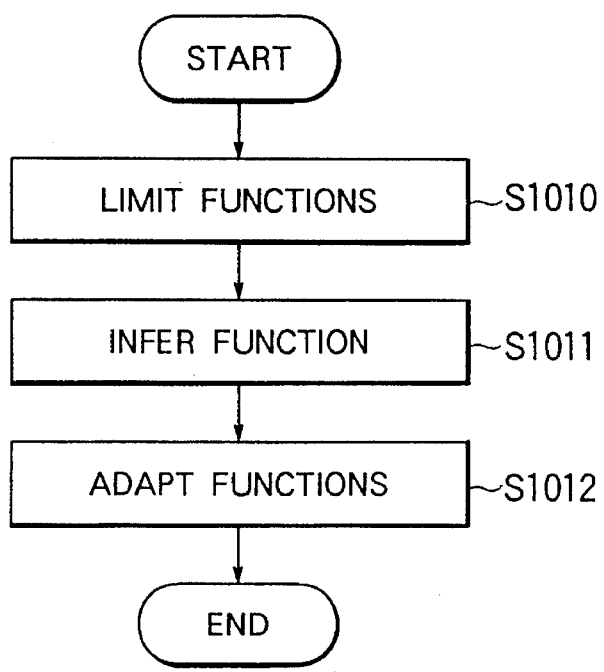
FIG. 48 is a flowchart showing the procedure corresponding to the intention analysis and the individual adaptation steps S55 and S56 of FIG. 43.

FIG. 48 is a flowchart showing the procedure corresponding to the intention analysis and the individual adaptation steps S55 and S56 of FIG. 43. At step S1010, the range of the functions desired by the user is inferred and limited. At step S1011, the function which the user now intends to use inferred. At step S1012, the functions are adapted to the level of the user. The step S1010 corresponds to the intention analysis step S55; the steps S1011 and S1012 correspond to the individual analysis step S56.

Figure 49:
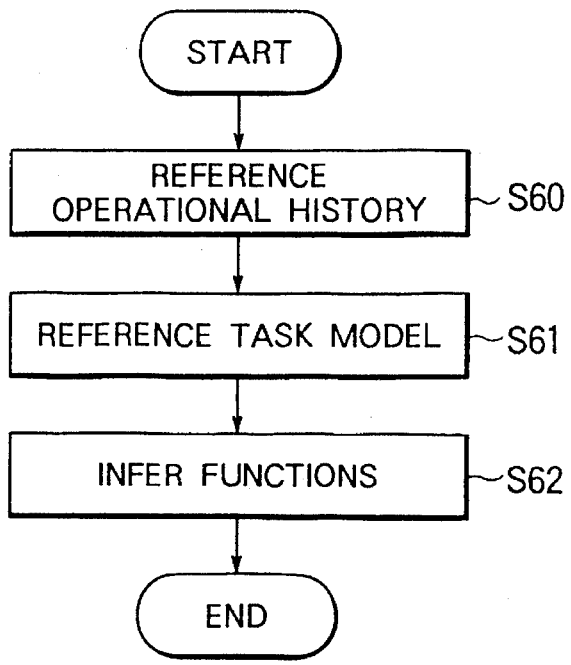
FIG. 49 is a flowchart showing the procedure corresponding to the function determining setp step S1010 of FIG. 48.

FIG. 49 is a flowchart showing the procedure corresponding to the function determining setp step S1010 of FIG. 48. First at step S60, the operation history of the user is referenced in the operation history storing means. Next at step S61, the task model is referenced. Further at step S62, the functions and the parts which the user is going to use are inferred.

Next, the function limiting step step S1010 is described by reference to FIGS. 50 through 52. FIG. 50 is a table showing the operation history of the user stored in the operation history storing means 271. The first column shows the order of operation hystory. The operation history is stored in a stack, the last item being at the top of the stack. The middle or the second column specifies the kind of operation, and the right or the third column specifies the kind of object part. Thus, to the order number 4 at reference numeral 280 there correspond the operation drag 281 and the object part scissors 282. To the order number 3 at reference numeral 283 there correspond the operation to type 284 and the object part keyboard 285. To the order number 2 at reference numeral 286 there correspond the operation click 287 and the object part paper 288. To the order number 1 at reference numeral 289 there correspond the operation click 290 and the object part pen 291. The order number represents the input order of the user.

FIG. 51 is a table showing the tabular information, the task model, on the basis of which the functions and the tasks desired by the user are inferred from the inputs (operations) and the parts used by the user. The first column 292 specifies the task; the second column 293 specifies the functions corresponding to the task; and the third column 294 specifies the parts corresponding to the respective functions. Thus, to the task prepare documents 259 there correspond two functions: 1) description 296 and 2) cut and paste 300. Further, to the function: 1) description 296 there correspond three parts: keyboard 297, pen 298, and paper 299. To the function: 2) cut and paste 300 there correspond two parts: scissors 301 and paper 302. FIG. 51 gives information only on an exemplary case. Generally, the task model gives information upon the relationship between the tasks, the functions, and the parts.

Next, the procedure of FIG. 49 is described by reference to FIGS. 50 and 51.

At step S80 the operation history of the user is referenced in the operation hystory storing means. Thus, the information in the operation history as shown in FIG. 50 is referenced, and the history of operations and the object parts corresponding thereto are retrieved.

Next at step S61, the task model, as shown in FIG. 51, is referenced. Thus, for the No. 1 operation click 290 having pen 291 as object, the part: pen 298 in the part column 294 of the task model of FIG. 51 and the function 1) description 296 corresponding thereto are referenced. Similarly, the other object parts corresponding to the operations contained in the operation history are referenced in the task model, and the corresponding functions (and possibly the task, where there are a plurality of tasks in the table of FIG. 51) are referenced.

Further at step S62, the functions and the parts (and possibly the task) which the user has used recently and thus exhibit a high probability of subsequent use are inferred. For example, since the object parts corresponding to the operations in the operation history of FIG. 50 include: keyboard 285, paper 288, and pen 291, it is inferred with a high probability from the task model of FIG. 51 that the function 1) description 296 corresponding to the task prepare documents 259 is being executed and are going to be executed. Further, the presence of the object part scissors 282 corresponding to the operation drag 281 in FIG. 50 indicate a probability that the function 2) cut and paste 300 corresponding to the task prepare documents 259 is going to be executed.

Figure 52:
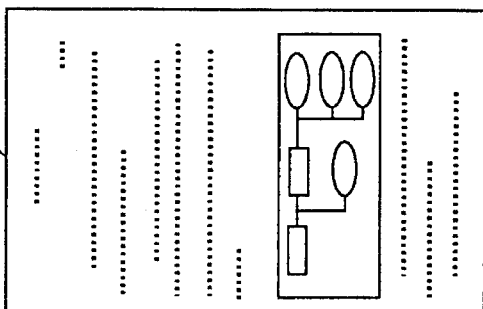
FIG. 52 shows the operational environment use window in which the user is executing the task of document preparation.

FIG. 52 shows the operational environment use window in which the user is executing the task of document preparation. The operational environment use window 578 of the operational environment using means 15 include an operational environment display block 233, within which the parts such as: pencil 851, notebook 850 and scissors 580 are displayed. The notebook 850 is opened in a document block 579, in which the document is under preparation. The user operates the pencil 851 and notebook 850 to prepare the document in the block 579. The scissors 580 are dragged to execute the cut and paste function. The intention analysis means references the operation history and the task model as described above, and infers the next operation the user is going to perform. Thus, the intention analysis means infers, for example, that the next operation of the user is the cut and paste of the document.

As described above the task model (see FIG. 51) may include information on the relationship between a plurality of of tasks and the functions and the parts corresponding thereto. Then, on the basis of the operation history and the task model, the task currently executed by the user may be inferred, and on the basis of the inferred task, the functions 293 and the parts 294 are inferred and the parts and the functions corresponding thereto are determined and limited. Thus, even if the information input by the user is scanty, it is possible to provide the functions which is desired by the user.

Figure 53:
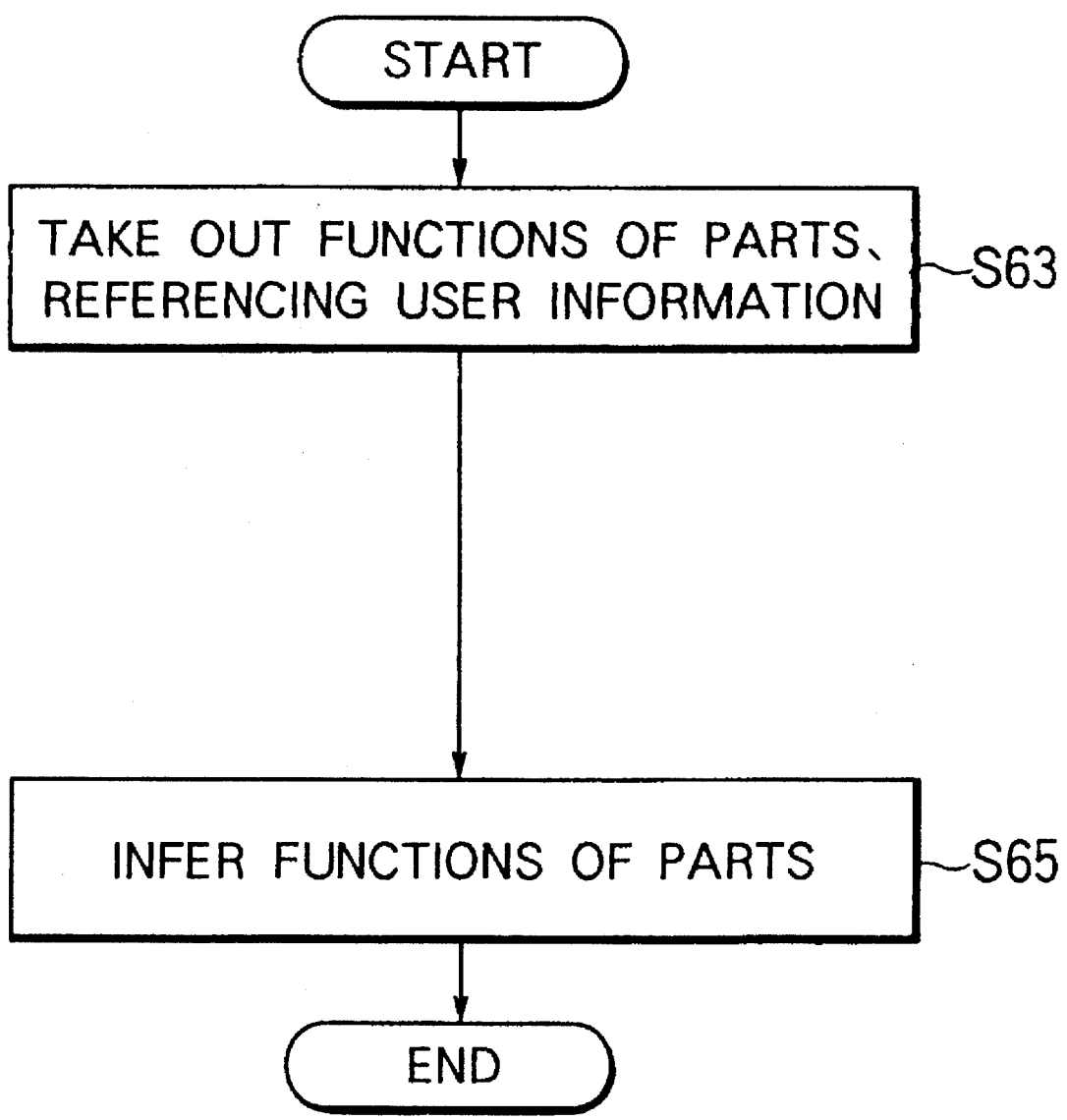
FIG. 53 is a flowchart showing the step S1011 of FIG. 48 in greater detail.

Next, the function inferring step step S1011 of FIG. 48 is described by reference to FIGS. 53 through 55. FIG. 53 is a flowchart showing the step S1011 of FIG. 48 in greater detail. At step S63, the user information is referenced and the functions of the parts contained therein are taken out. Next at step S65, the functions of the parts are inferred therein.

Next, the procedure of FIG. 53 is described by reference to FIGS. 54 and 55. FIG. 54 is a table containing the user information. The common information portion 640 contains information upon: the average response speed 318, which is divided into three levels 319: more than 10 seconds, more than 5 seconds, and less than 5 seconds, corresponding to three levels of users 319*a*: beginner, intermeddiate user, and advanced user; the keyboard typing speed 320, which is divided into three levels 321: slow, average, and rapid, corresponding to three levels of users 321*a*: beginner, intermeddiate user, and advanced user; and the correction rate 322, which is divided into three levels 323: more than 10%, more than 5%, and less than 5%, corresponding to three levels of users 323*a*: beginner, intermeddiate user, and advanced user. The common portion 640 contains general information upon the users. On the other hand, the portion A 641 and the portion B 642 contain information for the respective individual users. Thus, in the case of the user A 641, the average response speed 303 is 20 seconds 304; the order of designation followed by the user 305 is function-object 306; the keyboard typing speed 307 is slow 308; the correction rate 309 of the operations is 30%; and the function of the scissors 311 used by the user is thrust 312. The portion B 642 contains similar information upon the user B.

Figure 55:
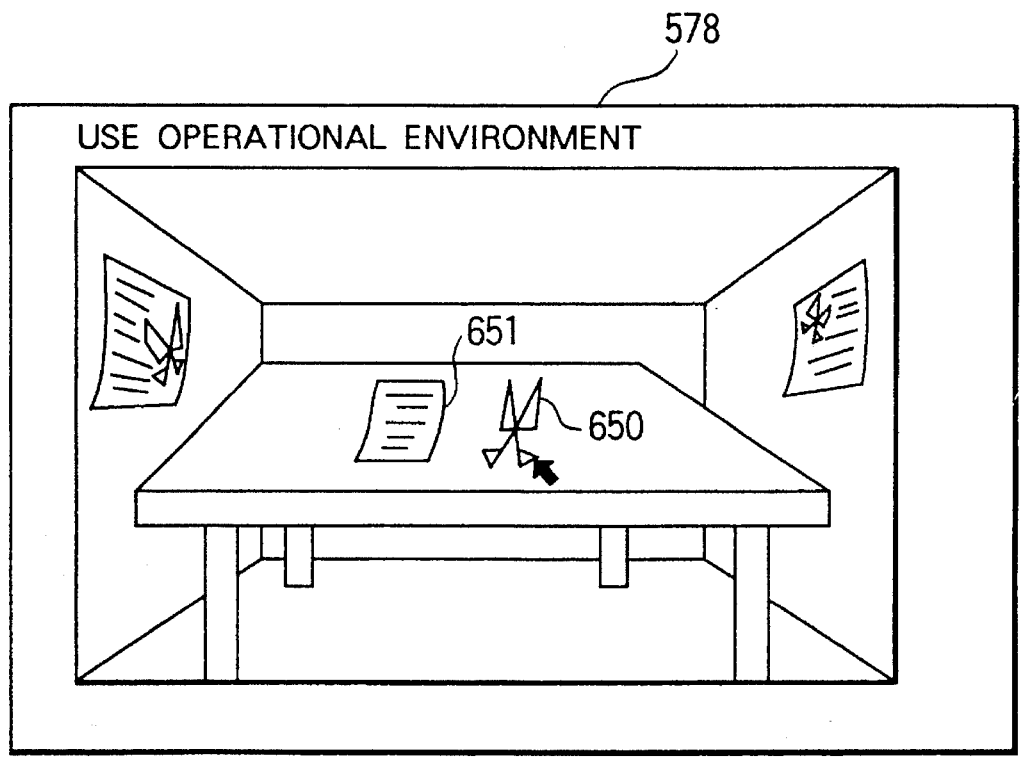
FIG. 55 shows the operational environment use window wherein the functions of parts are inferred.

FIG. 55 shows the operational environment use window wherein the functions of parts are inferred. The operational environment use window 578 contains: the scissors 650 dragged by the user; and paper 651 on which a document is already formed by the user A.

Next the procedure of FIG. 53 is described in detail by reference to FIGS. 54 and 55. It is assumed that user A is using the operational environment.

At step S63, the user information of FIG. 54 is referenced and the functions of the parts contained therein are retrieved. It is known from the user information of FIG. 54 that the average response speed 303 is 20 seconds 304, such that on the average, the user A requires 20 seconds after the prompt is displayed. Further, since the order of designation followed by the user 305 is function-object 306, user A has the habit of inputting the function first and the object of the function thereafter. Furthermore, since the keyboard typing speed 307 is slow 308, user A is determined to be at the beginner level at typing. In addition, it is determiend that the correction rate 309 of the operations is 30%. Further, since the function of the scissors 311 used by the user is thrust 312, it is determined that user A is using the scissors primarily to thrust. Thus, it is probable that user A will use scissors for thrusting. Consequently, the function thrust 312 of the part scissors is taken out and activated.

It is assumed that the user A drags scissors 650 (see FIG. 55) after making documents upon paper 651. Then the individual adaption means 274 references the function of scissors 311 for the user A in the user information as described above, and, at step S65, infers that the user is going to use scissors 650 for thrusting the paper 651.

Figure 56:
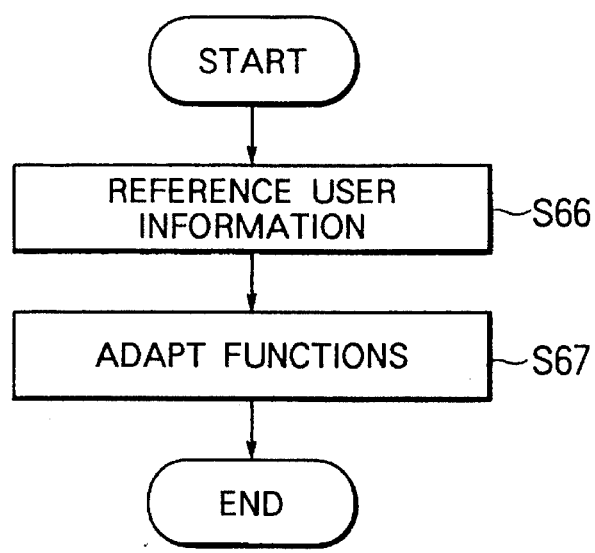
FIG. 56 is a flowchart showing the step S1012 of FIG. 48 in greater detail.

Next, the function modification or adaptation step S1012 is described by reference to FIGS. 56 through 59. FIG. 56 is a flowchart showing the step S1012 of FIG. 48 in greater detail. First at step S66, the user information is referenced. Next at step S67, the functions are modified on the basis of the user information referenced at step S66.

FIG. 57 is a table showing the correspondence between the modified items and the modification contents. The modified or adapted items include: the help guidance level 326, the finess of movement 328, and the speed of movement 330; to which correspond the modification adaptation contents: beginner level 327, refinement 329, and reduction 331, respectively.

The first line of the table shows that the content of the item: help guidance 326 is to be modified to the beginner level display. The second line shows that the content of the item: finess of movement 328 is to be refined 329. The third line shows that the content of the item: speed of movement 330 is to be to reduced 329.

FIG. 58 is a table showing the correspondence between the user levels and the display contents. For the beginner 583, the uses of the parts 584, the material of the object parts 585, and confirmation of the continuation of the operation 586 are all displayed. For the intermediate user 589, only the confirmation of the continuation of the operation 588 is displayed. For the advanced user 589, no display 590 is made.

For the beginner 583, the use of the parts and the conditions of the functions are better displayed to render the operational environment more friendly for the beginner. The intermediate user already knows the parts and conditions to a certain degree. Thus, for such user, the use of the part or the material thereof are not displayed. However, when a method of usage which is in disagreement with the current task takes place, the confirmation of continuation 588 is displayed. For the advanced user, no display is necessary, since he or she can make corrections withou help even if an error occurs.

Figure 59:
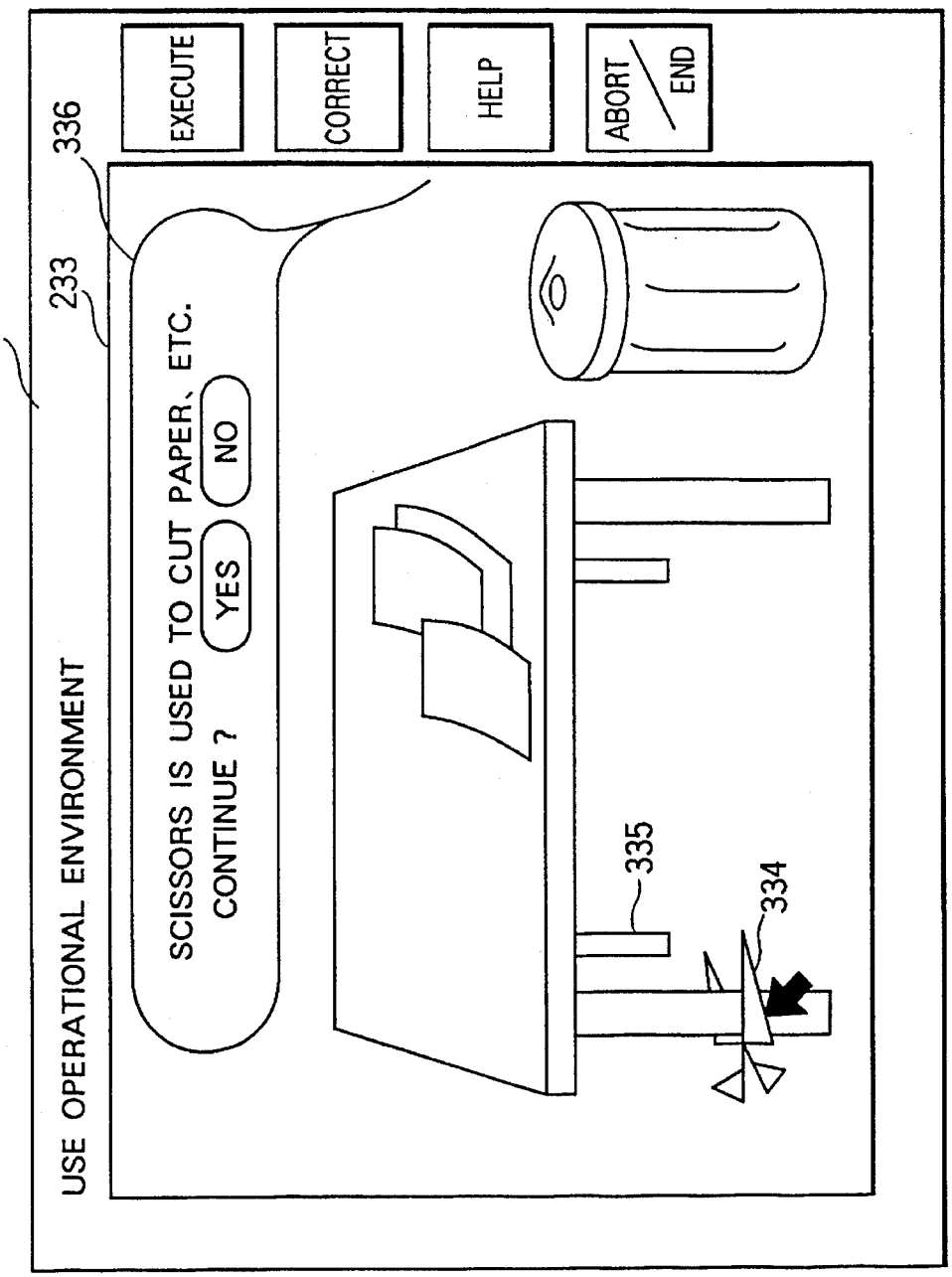
FIG. 59 shows the operational environment use window wherein a help message is displayed.

FIG. 59 shows the operational environment use window wherein a help message is displayed. The operational environment use window 578 includes the operational environment display block 233, in which the parts: scissors 334, desk 335, and the message 336, "Scissors are used to cut paper etc. Continue ? Yes, No" are displayed.

Next, the procedure of FIG. 56 is expatiated upon by reference to FIGS. 57 through 59. It is assumed as shown in FIG. 59 that the user, bringing the scissors 334 into contact with the desk 335, tries to cut a leg of the desk 335, but fails. Then, at step S66 the individual adaptation means 274 references the operation history and the user information of the current user, and infers that the user is a beginner. Thus, at step S67, the items at the left column of FIG. 57 are modified to the corresponding entries shown in the right column. The content of display, in particular, is modified to that corresponding to the beginner level as shogun in FIG. 58. Further, inferring that the user is ignorant of the material of the object of the cut function, and, referencing the use 584 of the part scissors 333, the material of the object part 585, and the confirmation of the continuation 586 in the table of FIG. 58, the screen automatically displays the message 336, "Scissors are used to cut paper etc. Continue ? Yes, No", to confirm the user's intention.

As described above, by inferring the level of the user on the basis of the user information, etc., the operational environment is automatically adapted to individual users, thereby providing an easy-to-use operational environment.

What is claimed is:

1. A visual interface device for generating a visual system using a computer, the computer having an input device for receiving information, a memory device for storing the information, a processing device for executing a task, and a screen device for displaying a plurality of graphics for a user, said visual interface device comprising:

part forming means for receiving first graphic and function information and second graphic and function information from the user using the input device, defining a first graphic and a second graphic, respectively, each graphic having a function;

part storing means for storing each graphic and function information received by said part forming means in the memory device of the computer;

operational environment constructing means for receiving the first and second graphic and function information from said part storing means, and generating relationship information according to the graphic and function information of each graphic, the relationship information defining a movement relationship between the first graphic and the second graphic;

operational environment storing means for storing said relationship information generated by said operational environment constructing means in the memory device;

operational environment using means for executing at least one task on the visual system, wherein the processing device accesses the first and second graphic and function information and relationship information in the memory device and displays the first graphic moving relative to the second graphic on the display device according to each task, the operational environment using means including operation history storing means for storing a history of operation of said operational environment, and intention analysis means for inferring an operation to be performed by the user according to the operation history; and a hierarchical structure of functions, wherein each function of the hierarchical structure can be further defined into a plurality of more specific functions so that the function of each graphic is unique, wherein each graphic and function information includes semantic information that defines the function of each graphic, movement information that defines a movement operation of each graphic, and visual information that defines a graphical representation of each graphic, each graphical representation having a visual screen image including a plurality of pixels, and wherein said relationship information includes semantic relation information defining a semantic relationship between the first and second graphics defined by said part forming means, movement relation information defining the movement relationship, and visual relation information defining a visual relationship between the first and second graphics defined by said part forming means.

2. The visual interface device as claimed in claim 1, wherein said operational environment using means further comprises:

user information storing means for storing user information including a level and a habit of a user; and individual adaptation means for automatically adapting said operational environment according to the user information stored in said user information storing means.

3. The visual interface device as claimed in claim 2, wherein said operational environment using means further comprises:

movement generation means for generating movements of said parts in said operational environment according to at least one of information on said operational environment stored in said operational environment storing means, operation history of said user stored in said operation history storing means, and user information stored in said user information storing means.

4. The visual interface device as claimed in claim 3, wherein said operational environment using means further comprises:

operational environment managing means for selectively activating one of the intention analysis means, the individual adaptation means, and the movement generation means.

5. A visual interface device for generating a visual system on a computer having an input device and a display, the device comprising:

part forming means for forming a plurality of graphics, each graphic having graphic information entered through the input device of the computer;

operational environment constructing means for constructing an operational environment that includes the formed plurality of graphics, the operational environment constructing means including relational information forming means for forming relational information defining a part-to-part relationship between the first graphic and the second graphic and a part-to-environment relationship between the first graphic and the operational environment, the relational information including semantic information that defines semantic attributes of the first graphic and the second graphic, and movement information that defines movement attributes of the first graphic and the second graphic; and operational environment using means for displaying an operation of the operational environment on the display of the computer, wherein the operation includes a first graphic performing a function so that the first graphic displays a movement relative to a second graphic, wherein the operational environment using means includes operational history storing means for storing a history of functions performed by the graphics in the operational environment.

6. The device of claim 5, wherein the operation environment using means includes intention analysis means for inferring a next function to be performed by a graphic according to the operation history.

7. The device of claim 5, wherein the operation environment using means includes means for referencing a task model having user information; and individual adaptation means for adapting the operation of the operational environment using means according to the user information.

8. The device of claim 7, wherein the operation environment using means further includes movement generation means for generating movement of the first graphic according to the operation history and the user information.

9. A method for generating a visual system on a computer having an input device and a display, the method comprising the steps of:

(A) forming a plurality of graphics, each graphic having graphic information entered through the input device of the computer;

(B) constructing an operational environment that includes the formed plurality of graphics, the step of constructing including the step of forming relational information defining a part-to-part relationship between the first graphic and the second graphic and a part-to-environment relationship between the first graphic and the operational environment, wherein the step of forming relational information includes the steps of forming semantic information that defines semantic attributes of the first graphic and the second graphic, and forming movement information that defines movement attributes of the first graphic and the second graphic; and (C) displaying an operation of the operational environment on the display of the computer, wherein the operation includes a first graphic performing a function so that the first graphic displays a movement relative to a second graphic, and wherein the step of displaying includes the step of storing a history of functions performed by the graphics in the operational environment.

10. The method of claim 9, wherein step (C) includes the step of inferring a next function to be performed by a graphic according to the operation history.

11. The method of claim 9, wherein step (C) includes the steps of referencing a task model having user information; and adapting the operation displayed in step (C) according to the user information.

12. The method of claim 11, wherein step (C) further includes the step of generating movement of the first graphic according to the operation history and the user information.

\* \* \* \* \*